(12) United States Patent  
Silverbrook

(10) Patent No.: US 6,402,300 B1  
(45) Date of Patent: Jun. 11, 2002

(54) INK JET NOZZLE ASSEMBLY INCLUDING MENISCUS PINNING OF A FLUIDIC SEAL

(75) Inventor: Kia Silverbrook, Balmain (AU)

(73) Assignee: Silverbrook Research Pty. Ltd., Balman (AU)

( * ) Notice: Subject to any disclaimer, the term of this patent is extended or adjusted under 35 U.S.C. 154(b) by 0 days.

(21) Appl. No.: 09/798,716

(22) Filed: Mar. 2, 2001

Related U.S. Application Data

(63) Continuation-in-part of application No. 09/112,765, filed on Jul. 10, 1998, now Pat. No. 6,217,153.

(30) Foreign Application Priority Data

Jul. 15, 1997 (AU) ............................................... PO7991  
Jan. 19, 1998 (AU) ............................................... PO1398

(51) Int. Cl.[7] ................................................. B41J 2/04

(52) U.S. Cl. ....................................................... 347/54

(58) Field of Search ............................... 347/54, 68–72, 347/20, 55, 151, 120, 154, 103, 123, 111, 159, 127, 128, 131, 125, 158; 399/271, 290, 292, 293, 294, 295

(56) References Cited

U.S. PATENT DOCUMENTS 5,447,442 A 9/1995 Swart  
5,684,519 A 11/1997 Matoba et al.

FOREIGN PATENT DOCUMENTS

EP 0416540 A2 3/1991  
JP 404001051 A 1/1992

*Primary Examiner*—Raquel Yvette Gordon

(57) ABSTRACT

An ink jet nozzle assembly includes a nozzle chamber having an inlet receiving fluid from a reservoir and a nozzle through which ink is ejected. The chamber includes a fixed portion, a movable portion and a clearance space. Relative movement between the fixed portion and the movable portion in an ejection phase reduces an effective volume of the chamber. Alternative relative movement in a refill phase enlarges the effective volume of the chamber. The clearance space contains an air-ink interface, surface tension in ink across a meniscus at the interface forms a fluidic seal between the chamber and the atmosphere. The clearance space, nozzle and the ink being dimensioned relative to one another such that ink is ejected preferentially from the chamber through the nozzle in droplet form in the ejection phase, and ink is alternately drawn preferentially into the chamber from the reservoir through the inlet in the refill phase without the fluidic seal breaking.

15 Claims, 45 Drawing Sheets

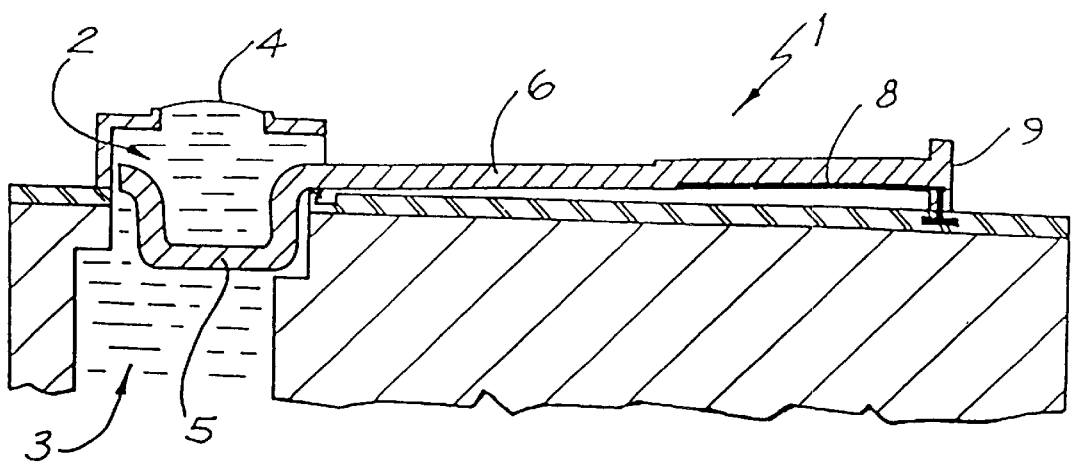
FIG. 1
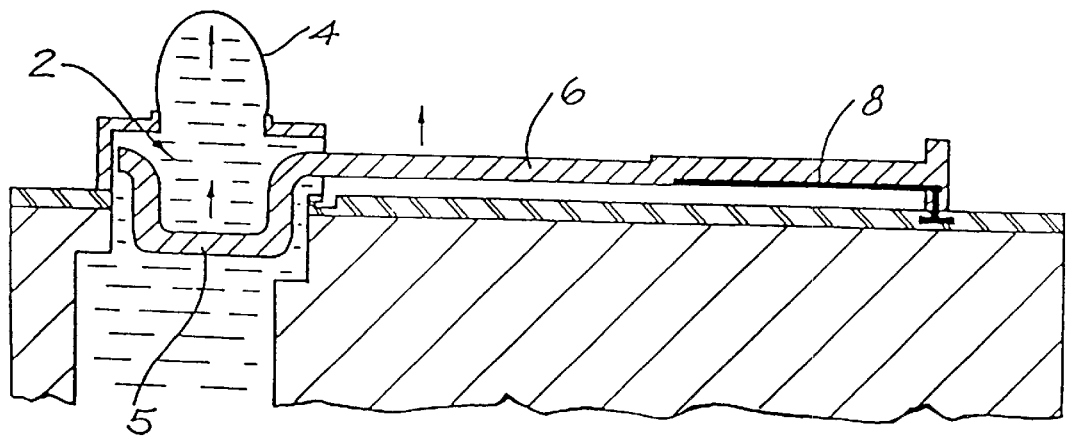
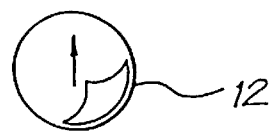
FIG. 2
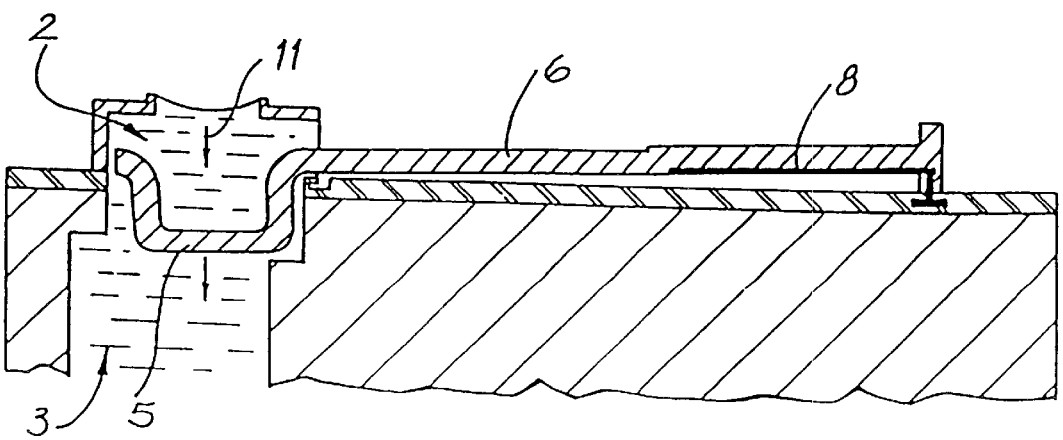
FIG. 3

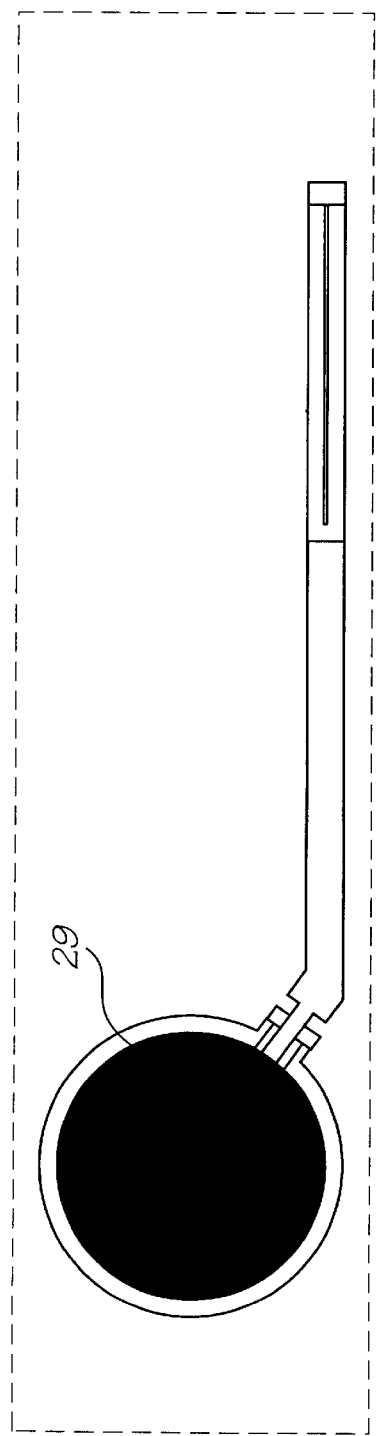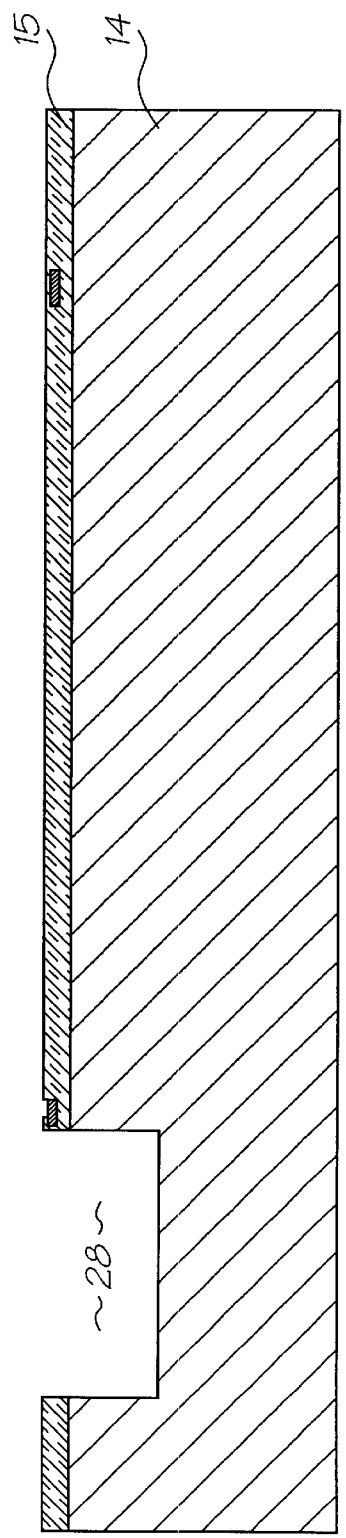

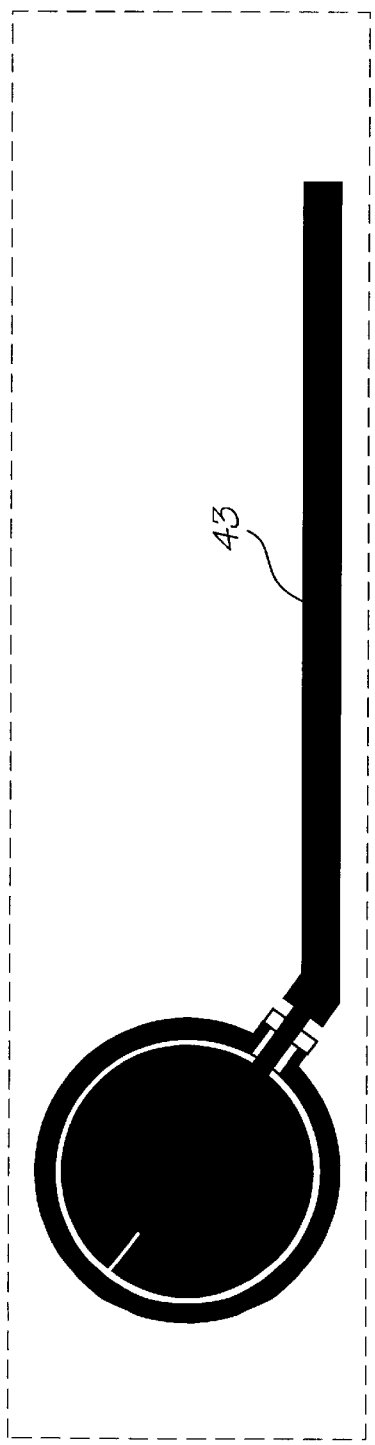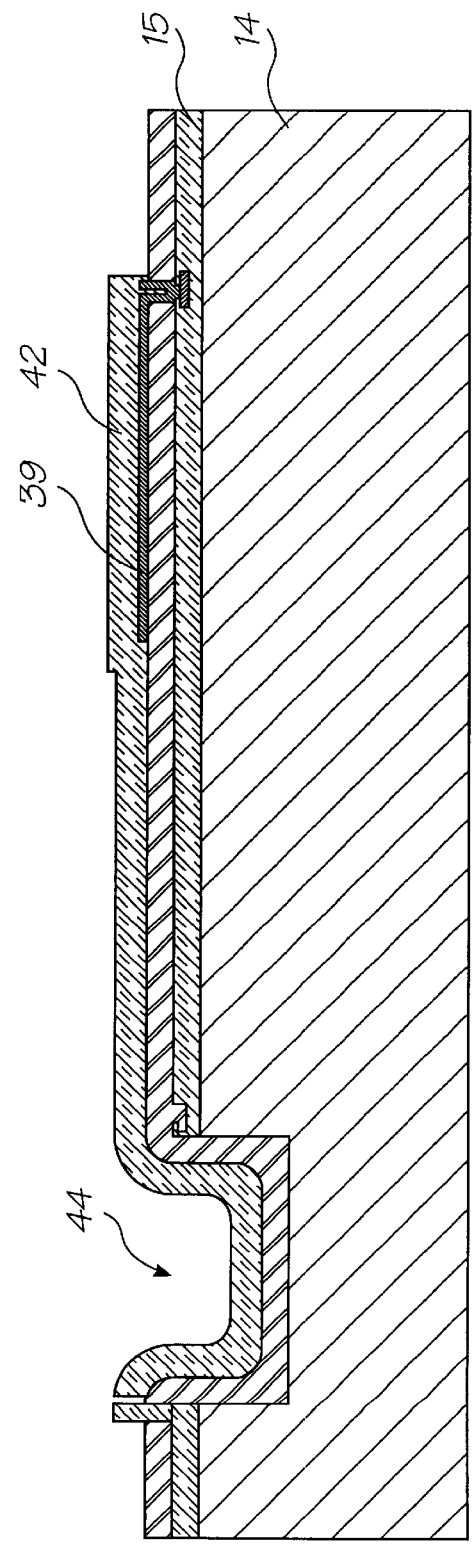

US 6,402,300 B1

INK JET NOZZLE ASSEMBLY INCLUDING MENISCUS PINNING OF A FLUIDIC SEAL

This is a C-I-P of application Ser. No. 09/112,765 filed on Jul. 10, 1998 now U.S. Pat. No. 6,217,153

FIELD OF THE INVENTION

The field of the invention relates to the field of inkjet printing devices and in particular, discloses a single bend actuator cupped paddle inkjet printing device.

BACKGROUND OF THE INVENTION

Many different types of printing have been invented, a large number of which are presently in use. The known forms of printing have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207 –220 (1988).

Ink Jet printers themselves come in many different types. The utilisation of a continuous stream ink in ink jet printing appears to date back to at least 1929 wherein U.S. Pat. No. 1,941,001 by Hansell discloses a simple form of continuous stream electrostatic ink jet printing.

U.S. Pat. No. 3,596,275 by Sweet also discloses a process of a continuous ink jet printing including the step wherein the ink jet stream is modulated by a high frequency electrostatic field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclose ink jet printing techniques rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

When creating a large number of inkjet nozzles which together form a printhead, it is necessary or desirable to ensure that the printhead is of a compact form so as to ensure that the printhead takes up as small a space as possible. Further, it is desirable that any construction of a printhead is as simple as possible and preferably, the number of steps in construction are extremely low, therefore ensuring simplicity of manufacture. Further, preferably each ink ejection nozzle is of a standard size and the ink forces associates with the ejection are regular across the nozzle.

Further, where the ink ejection mechanism is of a mechanical type attached to an actuator device, it is important to ensure that a substantial clearance is provided between an ink ejection nozzle and the surface of the paddle. Unless a large clearance is provided (of the order of 10 □m in the case of a 40 □m nozzle) a number of consequential problems may arise. For example, if a mechanical paddle ejection surface and nozzle chamber walls are too close, insufficient ink will be acted on by the paddle actuator so as to form a drop to be ejected. Further, high pressures and drag is likely to occur where movement of a paddle occurs close to nozzle chamber walls. Further, if the paddle is too close to the nozzle, there is a danger that an unwanted meniscus shape may occur after ejection of an ink drop with the ink meniscus surface attaching to the surface of the paddle.

Further, should the ink ejection mechanism be formed on a silicon wafer type device utilizing standard wafer processing techniques, it is desirable to minimize the thickness of any layer of material when forming the system. Due to differential thermal expansions, it is desirable to ensure each layer is of minimal thickness so as to reduce the likelihood of faults occurring during the fabrication of a printhead system due to thermal stress. Hence, it is desirable to construct a printhead system utilizing thin layers in the construction process.

SUMMARY OF THE INVENTION

There is disclosed herein an ink jet nozzle assembly including a nozzle chamber containing ink to be ejected and a fluidic seal comprising a meniscus formed by said ink between two solid surfaces of said assembly that move relative to one another when the assembly is activated in use, and wherein at least one of said surfaces has a thin lip adjacent said fluidic seal to hinder wicking of said ink along said at least one surface.

Preferably said lip is less than or equal to about 1 $\mu$m thick.

There is further disclosed herein an ink jet nozzle assembly including:
- a nozzle chamber having an inlet in fluid communication with an ink reservoir and a nozzle in fluid communication with a surrounding atmosphere;
- the chamber including a fixed portion, a movable portion and a clearance space therebetween, relative movement between the fixed portion and the movable portion in an ejection phase reducing an effective volume of the chamber, and alternate relative movement in a refill phase enlarging the effective volume of the chamber;

the clearance space containing an ink/air interface, surface tension in ink across a meniscus at the interface forming a fluidic seal between the chamber and the atmosphere; wherein:

the clearance space, the nozzle and the inlet are dimensioned relative to one another such that ink is ejected preferentially form the chamber through the nozzle in droplet form in the ejection phase, and ink is alternately drawn preferentially into the chamber from the reservoir through the inlet in the refill phase without said fluidic seal breaking.

Preferably the chamber incorporates a rim extending outwardly adjacent at least a portion of the fluidic seal and is disposed to minimise wicking of ink from the chamber across the seal.

Preferably the movable portion includes the nozzle and the fixed portion is mounted on a substrate.

Preferably the fixed portion includes the nozzle mounted on a substrate and the movable portion includes an actuator.

Preferably a largest distance between the fixed portion and the movable portion across the clearance space is less than approximately 5 µm.

Preferably said distance is less than approximately 3 µm.

Preferably said distance is less than approximately 1 µm.

Preferably said rim extends substantially around a periphery of the fluid seal, immediately adjacent the clearance space.

Preferably a lower section of the rim includes a ledge portion overhanging a recess adapted to collect any residual ink wicking across the seal.

Preferably an outwardly protruding lip extends around the nozzle to minimise wicking of ink across an outer surface of the nozzle chamber.

Preferably at least one surface adjacent the clearance space includes an hydrophobic coating to enhance performance of the fluidic seal.

Preferably the hydrophobic coating is formed substantially from polytetrafluoroethylene (PTFE).

Preferably the ink jet nozzle assembly is manufactured using micro-electro-mechanical-systems (MEMS) techniques.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 1–3 are schematic illustrations of the operational principles of the preferred embodiment;

FIGS. 6–15 illustrate the various manufacturing processing steps in the construction of the preferred embodiment;

DESCRIPTION OF PREFERRED AND OTHER EMBODIMENTS

Figure 4:
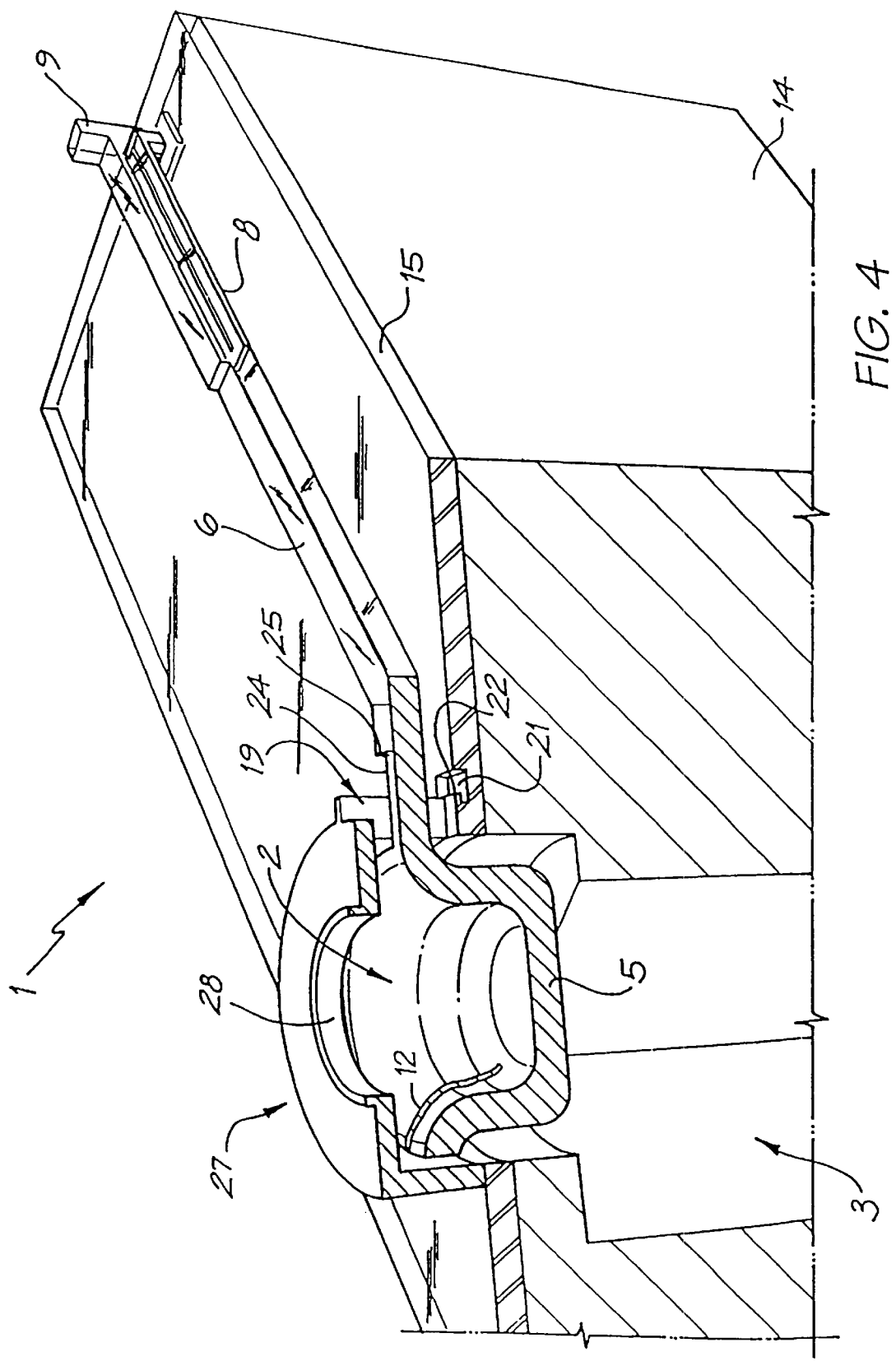
FIG. 4 illustrates a perspective view, partly in section of a single inkjet nozzle of the preferred embodiment.
Figure 5:
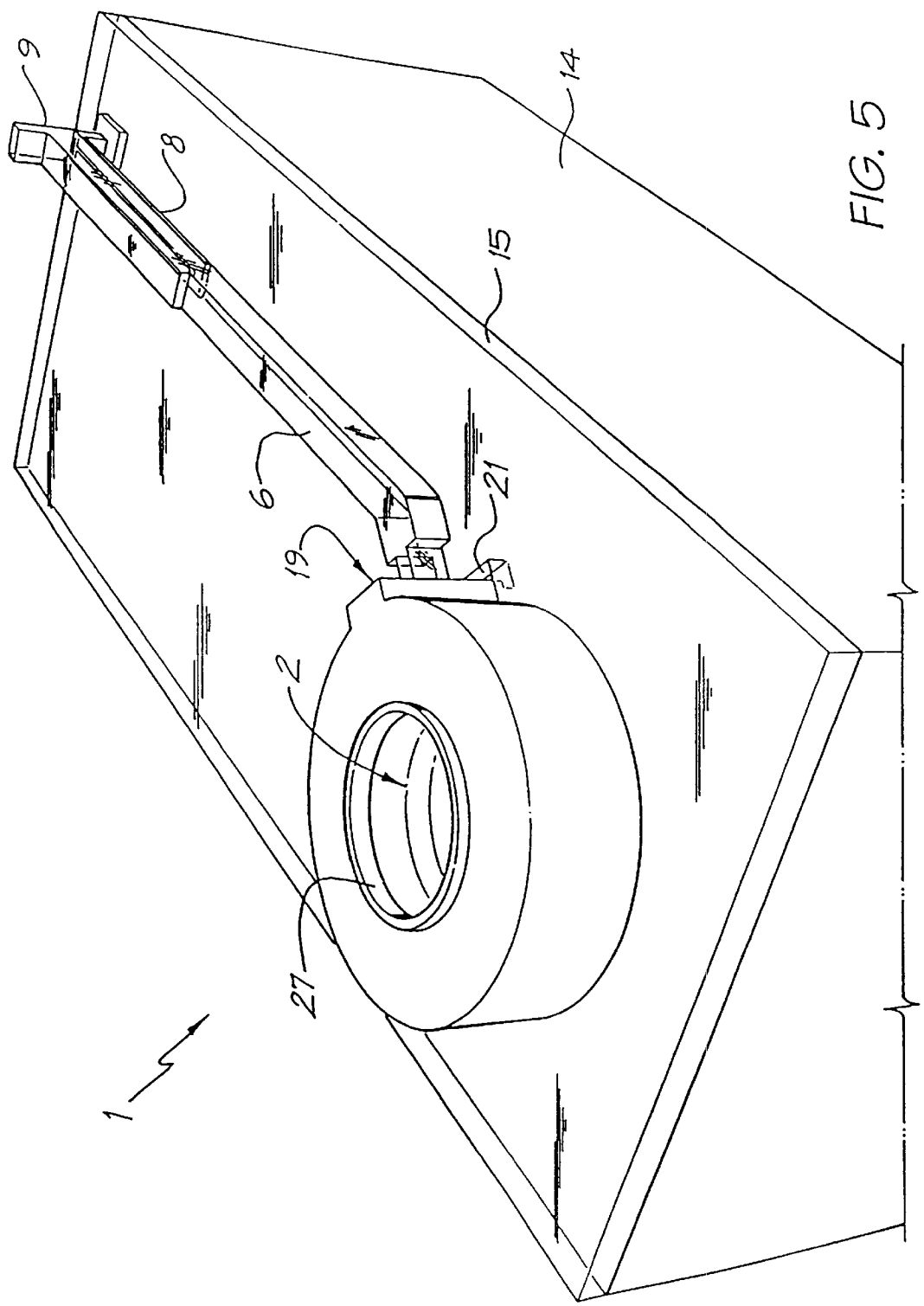
FIG. 5 is a side perspective view of a single ink jet nozzle of the preferred embodiment.

In the preferred embodiment, an inkjet printing system is provided having an ink ejection nozzle arrangement such that a paddle actuator type device is utilized to eject ink from a refillable nozzle chamber. As a result of the construction processes utilized, the paddle is generally of a "cupped" shape. The cup shape provides for the alleviation of a number of the aforementioned problems. The paddle is interconnected to a thermal actuator device which is thermally actuated by means of passing a current through a portion of the thermal actuator, so as to cause the ejection of ink therefrom. Further, the cupped paddle allows for a suitable construction process which does not require the formation of thick surface layers during the process of construction. This means that thermal stresses across a series of devices constructed on a single wafer are minimized.

Turning initially to FIGS. 1–3, there will now be explained the operational principles of the preferred embodiment. In FIG. 1 there is illustrated an inkjet nozzle arrangement 1 having a nozzle chamber 2 which is normally filled with ink from a supply channel 3 such that a meniscus 4 forms across the ink ejection aperture of the nozzle arrangement. Inside the nozzle arrangement, a cupped paddle actuator 5 is provided and interconnected to an actuator arm 6 which, when in a quiescent position, is bent downwards. The lower surface of the actuator arm 6 includes a heater element 8 which is constructed of material having a high "bend efficiency".

Preferably, the heater element has a high bend efficiency wherein the bend efficiency is defined as:

$$\text{bend efficiency} = \frac{\text{Young's Modulus} \times \text{(Coefficient of thermal Expansion)}}{\text{Density} \times \text{Specific Heat Capacity}}$$

A suitable material can be a copper nickel alloy of 60% copper and 40% nickel, hereinafter called (cupronickel) which can be formed below a glass layer so as to bend the glass layer.

In its quiescent position, the arm 6 is bent down by the element 8. When it is desired to eject a droplet of ink from the nozzle chamber 2, a current is passed through the actuator arm 8 by means of an interconnection provided by a post 9. The heater element 8 is heated and expands with a high bend efficiency thereby causing the arm 6 to move upwards as indicated in FIG. 2. The upward movement of the actuator arm 6 causes the cupped paddle 5 to also move up which results in a general increase in pressure within the nozzle chamber 2 in the area surrounding the meniscus 4. This results in a general outflow of ink and a bulging of the meniscus 4. Next, as indicated in FIG. 3, the heater element 8 is turned off which results in the general return of the arm 6 to its quiescent position which further results in a downward movement of the cupped paddle 5. This results in a general sucking back 11 of the ink within the nozzle chamber 2. The forward momentum of the ink surrounding the meniscus and the backward momentum of the ink results in a general necking of the meniscus and the formation of a drop 12 which proceeds to the surface of the page. Subsequently, the shape of the meniscus 4 results in a subsequent inflow of ink via the inlet channel 3 which results in a refilling of the nozzle chamber 2. Eventually, the state returns to that indicated by FIG. 1.

Turning now to FIG. 4, there is illustrated a side perspective view partly in section of one form of construction, a single nozzle arrangement 1 in greater detail. The nozzle arrangement 1 includes a nozzle chamber 2 which is normally filled with ink. Inside the nozzle chamber 2 is a paddle actuator 5 which divides the nozzle chamber from an ink refill supply channel 3 which supplies ink from a back surface of a silicon wafer 14.

Outside of the nozzle chamber 2 is located an actuator arm 6 which includes a glass core portion and an external cupronickel portion 8. The actuator arm 6 interconnects with the paddle 5 by means of a slot 19 located in one wall of the nozzle chamber 2. The slot 19 is of small dimensions such that surface tension characteristics retain the ink within the nozzle chamber 2. Preferably, the external portions of the arrangement 1 are further treated so as to be strongly hydrophobic. Additionally, a pit 21 is provided around the slot 19. The pit includes a ledge 22 with the pit and ledge interacting so as to minimize the opportunities for "wicking" along the actuator arm 6. Further, to assist of minimizing of wicking, the arm 6 includes a thinned portion 24 adjacent to the nozzle chamber 2 in addition to a right angled wall 25.

The surface of the paddle actuator 5 includes a slot 12. The slot 12 aids in allowing for the flow of ink from the back surface of paddle actuator 5 to a front surface. This is especially the case when initially the arrangement is filled with air and a liquid is injected into the refill channel 3. The dimensions of the slot are such that, during operation of the paddle for ejecting drops, minimal flow of fluid occurs through the slot 11.

The paddle actuator 5 is housed within the nozzle chamber and is actuated so as to eject ink from the nozzle 27 which in turn includes a rim 28. The rim 28 assists in minimizing wicking across the top of the nozzle chamber 2.

The cupronickel element 8 is interconnected through a post portion 9 to a lower CMOS layer 15 which provides for the electrical control of the actuator element.

Each nozzle arrangement 1, can be constructed as part of an array of nozzles on a silicon wafer device and can be constructed from the utilizing semiconductor processing techniques in addition to micro machining and micro fabrication process technology (MEMS) and a full familiarity with these technologies is hereinafter assumed.

For a general introduction to a micro-electro mechanical system (MEMS) reference is made to standard proceedings in this field including the proceeding of the SPIE (International Society for Optical Engineering) including volumes 2642 and 2882 which contain the proceedings of recent advances and conferences in this field.

Turning initially to FIG. 6a and 6b, in FIG. 6 b there is shown an initial processing step which utilizes a mask having a region as specified in FIG. 6a. The initial starting material is preferably a silicon wafer 14 having a standard 0.25 μm CMOS layer 15 which includes drive electronics (not shown), the structure of the drive on electronics being readily apparent to those skilled in the art of CMOS integrated circuit designs.

The first step in the construction of a single nozzle is to pattern and etch a pit 28 to a depth of 13 μm using the mask pattern having regions specified 29 as illustrated in FIG. 6a.

Figure 7A:
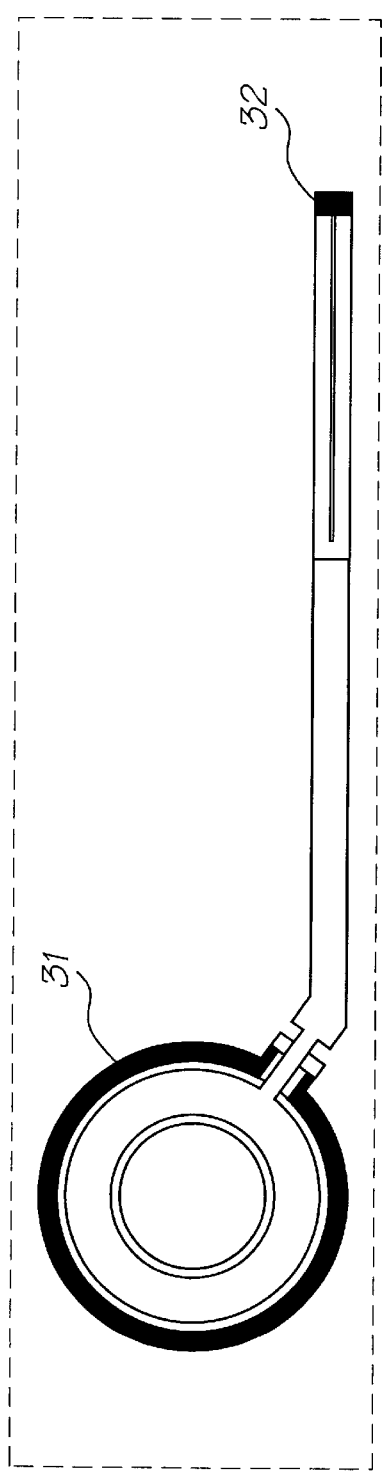
Figure 7B:
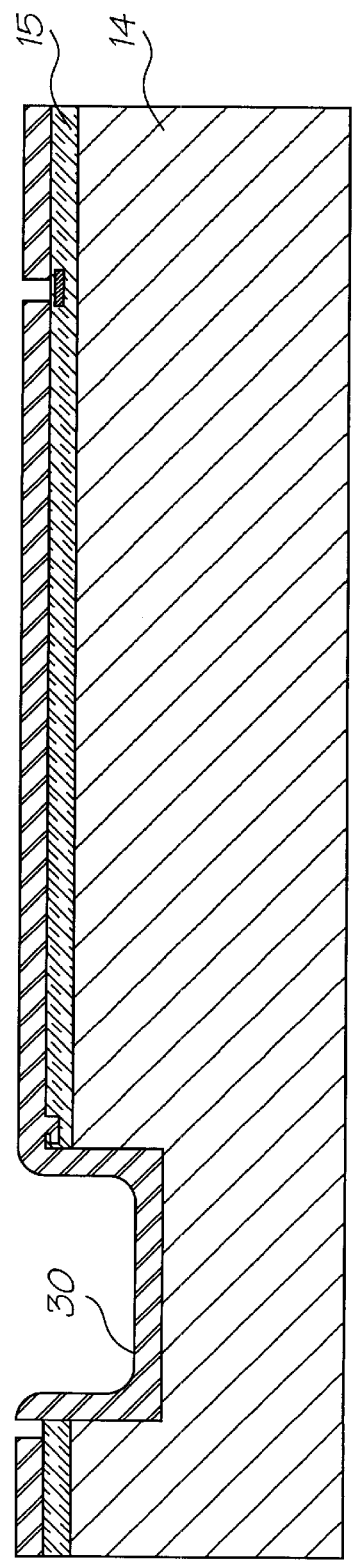

Next, as illustrated in FIG. 7b, a 3 μm layer of the sacrificial material 30 is deposited. The sacrificial material can comprise aluminium. The sacrificial material 30 is then etched utilizing a mask pattern having portions 31 and 32 as indicated at FIG. 7a.

Figure 8A:
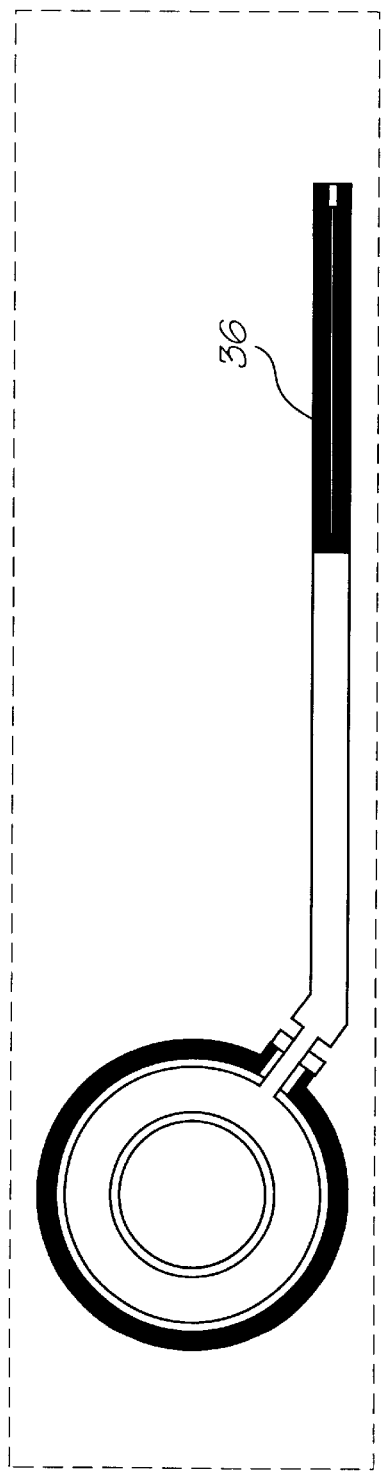
Figure 8B:
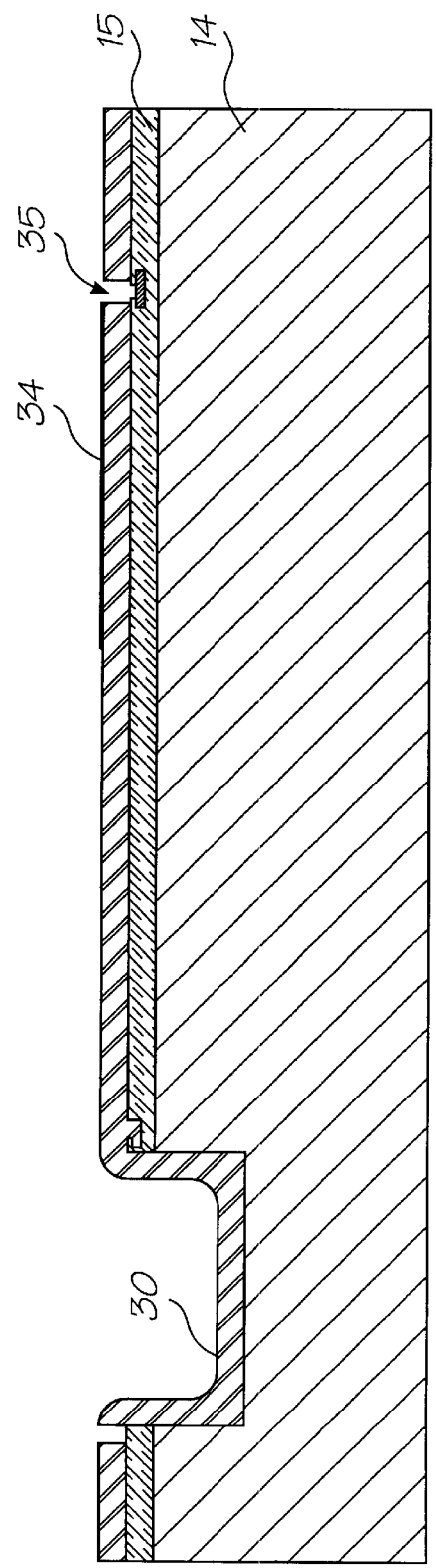

Next, as shown in FIG. 8b a very thin 0.1 μm layer of a corrosion barrier material (not shown) (for example, silicon nitride) is deposited and subsequently etched so as to form the heater element 35. The etch utilizes a third mask having mask regions specified 36 and 37 in FIG. 8a.

Figure 9A:
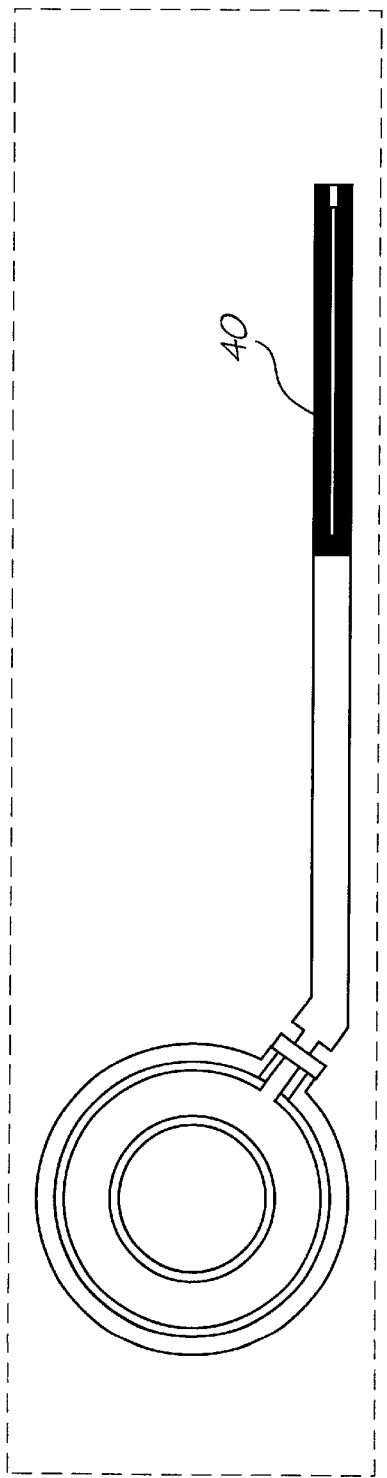
Figure 9B:
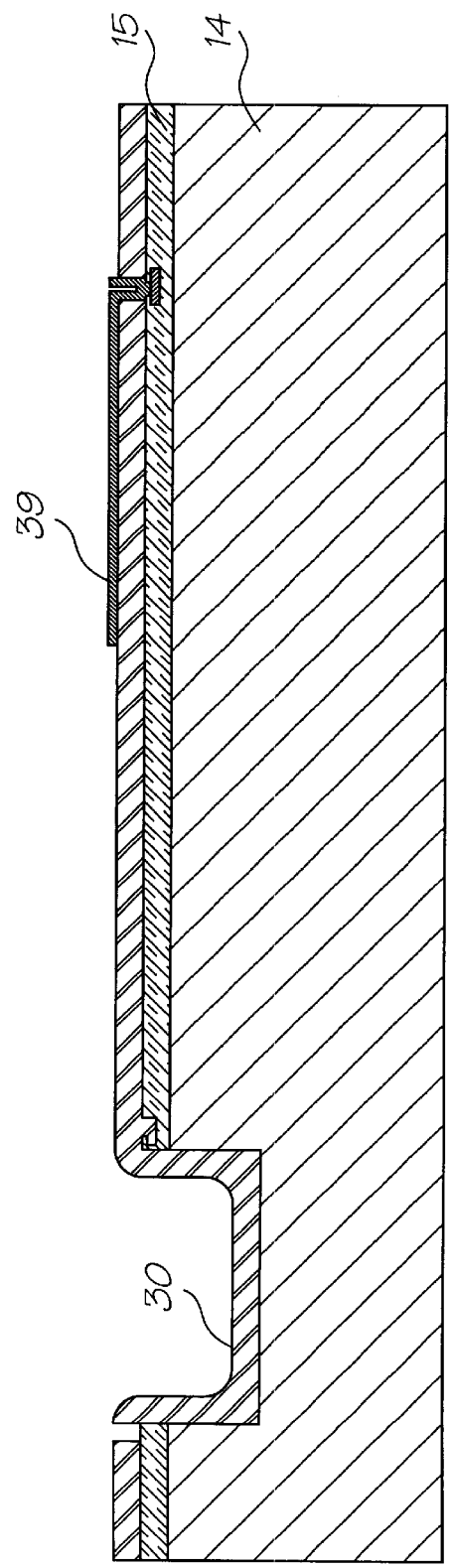

Next, as shown intended in FIG. 9b, a 1.1 μm layer of heater material 39 which can comprise a 60% copper 40% nickel alloy is deposited utilizing a mask having a resultant mask region 40 as illustrated in FIG. 9a.

Next, as 0.1 μm corrosion layer is deposited over the surface. The corrosion barrier can again comprise silicon nitride.

Next, as illustrated in FIG. 10b, a 3.4 μm layer of glass 42 is deposited. The glass and nitride can then be etched utilizing a mask as specified 43 in FIG. 10a. The glass layer 42 includes, as part of the deposition process, a portion 44 which is a result of the deposition process following the lower surface profile.

Figure 11A:
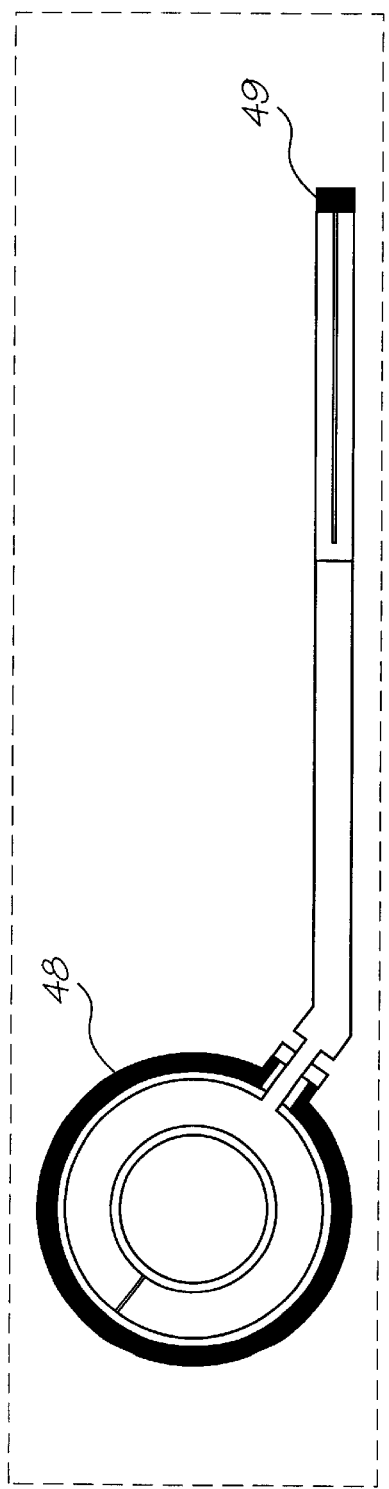
Figure 11B:
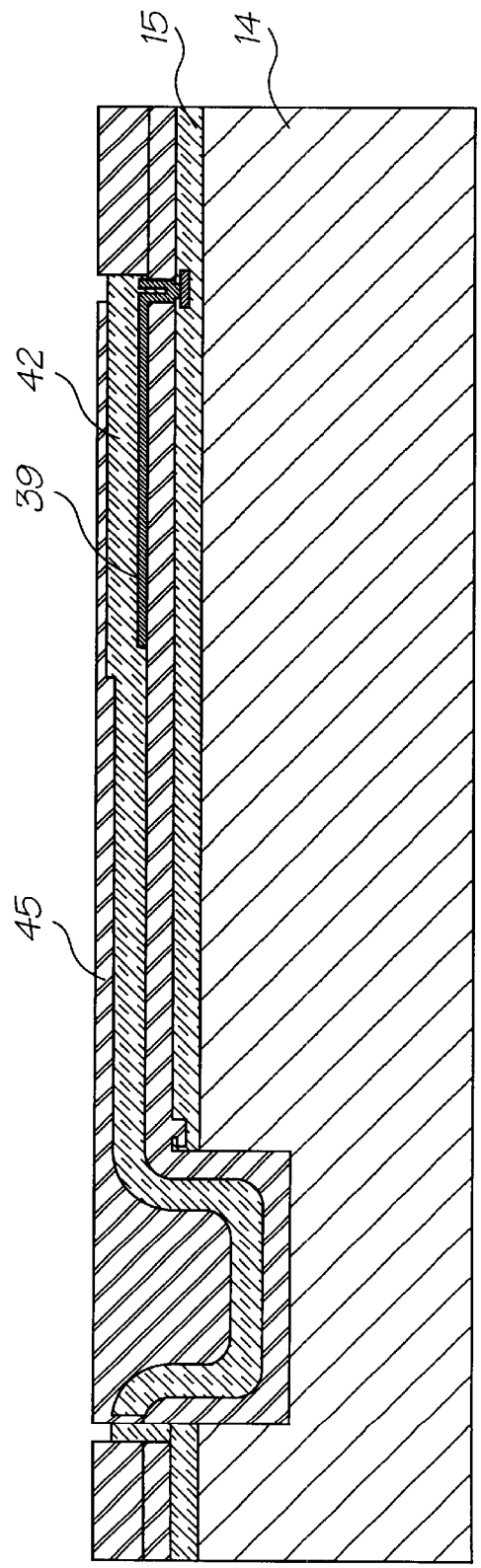

Next, a 6 μm layer of sacrificial material 45 such as aluminium is deposited as indicated in FIG. 11b. This layer is planarized to approximately 4 μm minimum thickness utilizing a Chemical Mechanical Planarization (CMP) process. Next, the sacrificial material layer is etched utilizing a mask having regions 48, 49 as illustrated in FIG. 11a so as to form portions of the nozzle wall and post.

Figure 12A:
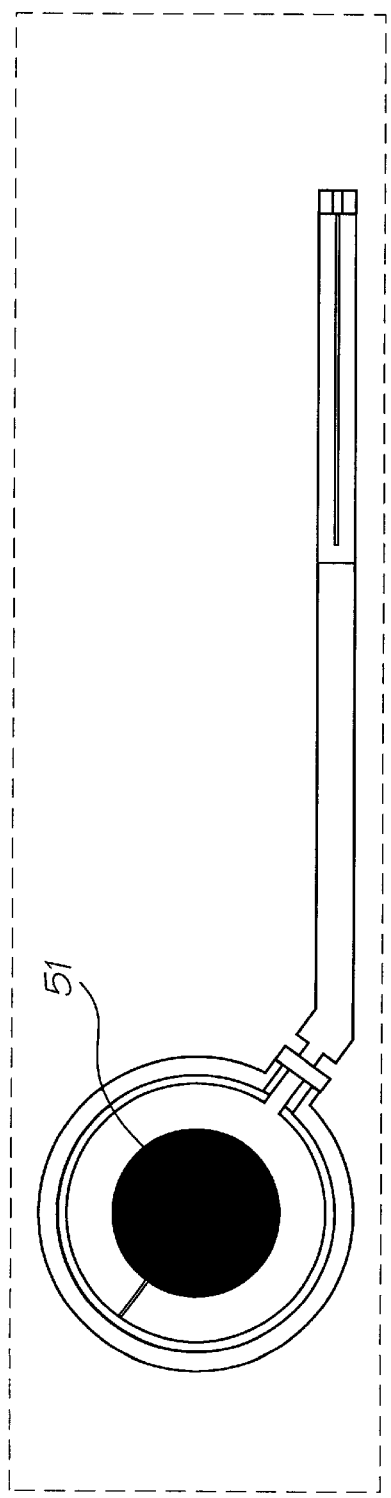
Figure 12B:
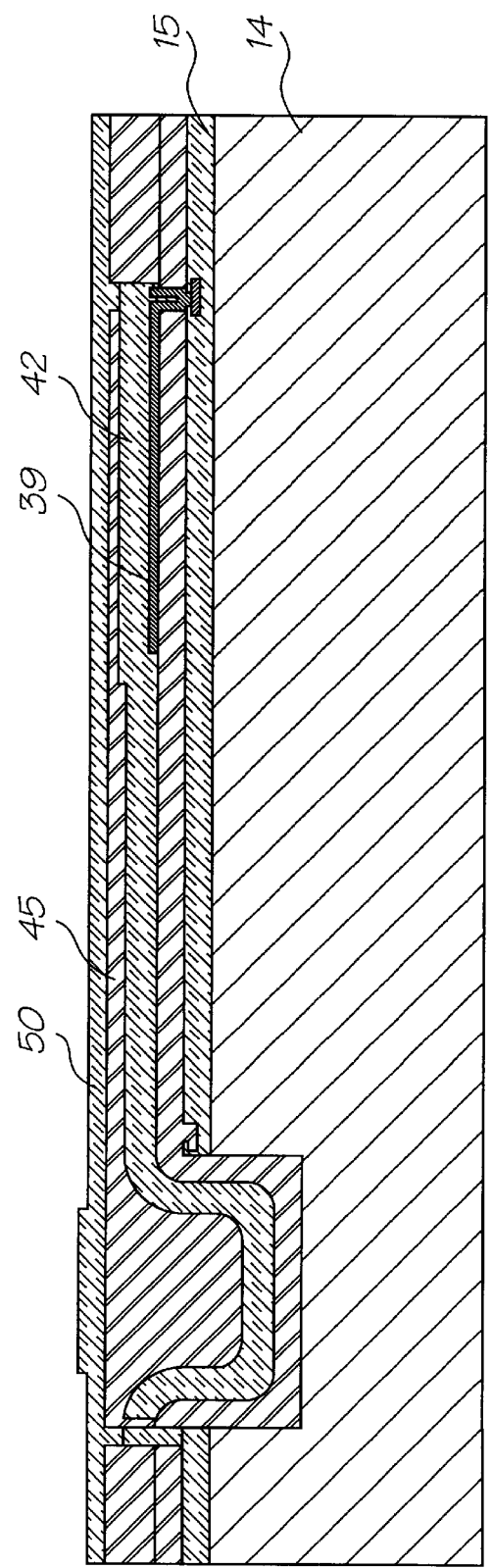

Next, as illustrated in FIG. 12b, a 3 μm layer of glass 50 is deposited. The 3 μm layer is patterned and etched to a depth of 1 μm using a mask having a region specified 51 as illustrated in FIG. 12b so as to form a nozzle rim.

Figure 13A:
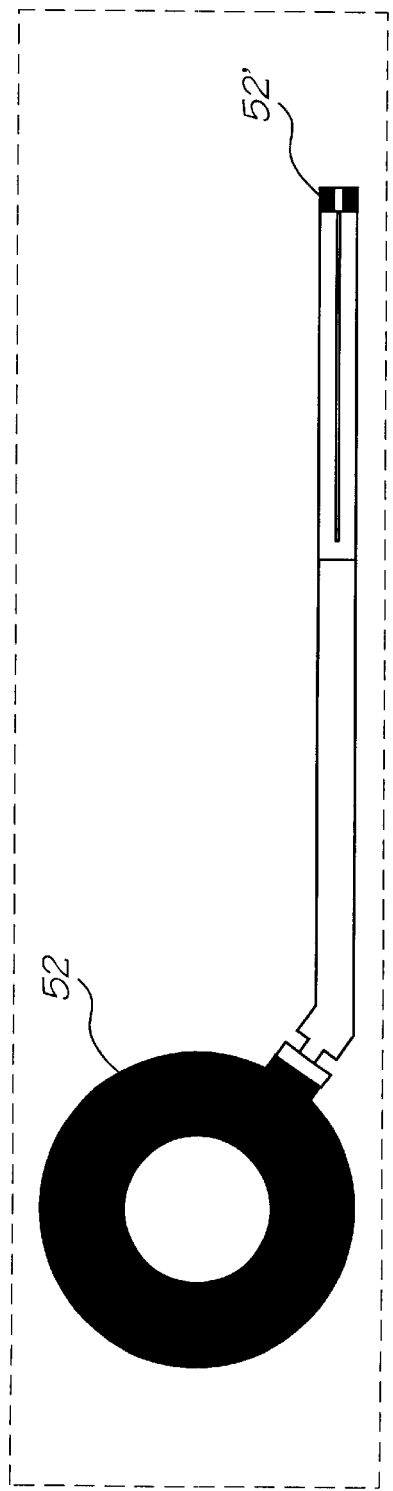
Figure 13B:
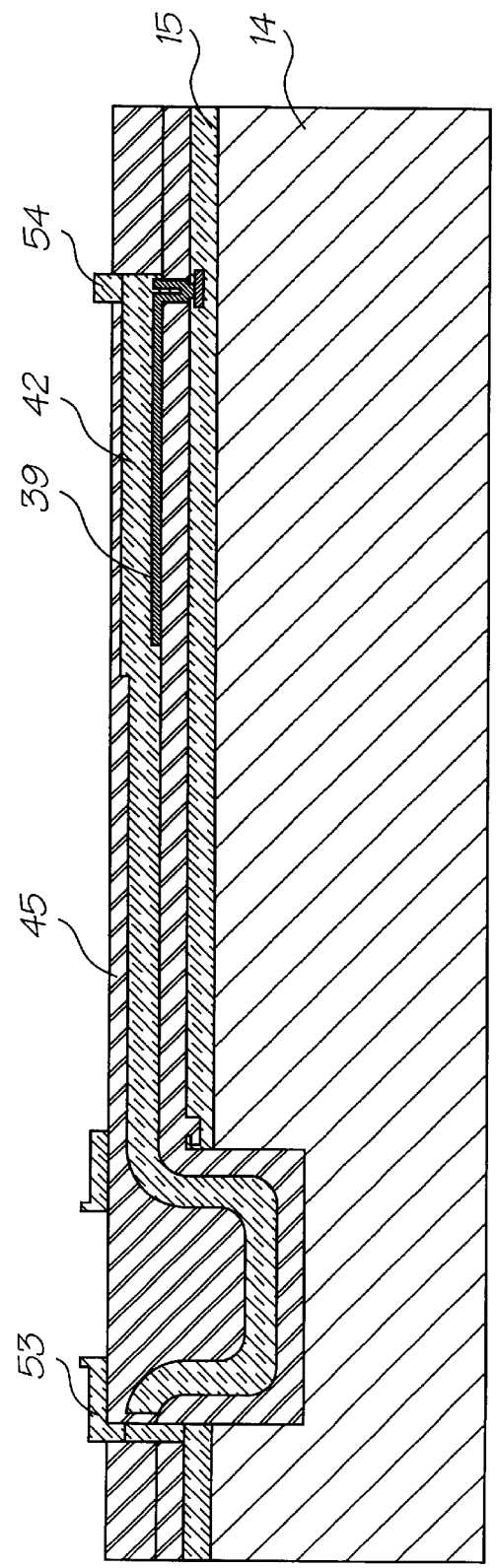

Next, as illustrated in FIG. 13b the glass layer is etched utilizing a further mask as illustrated in FIG. 12a which leaves glass portions eg. 53 to form the nozzle chamber wall and post portion 54.

Figure 14A:
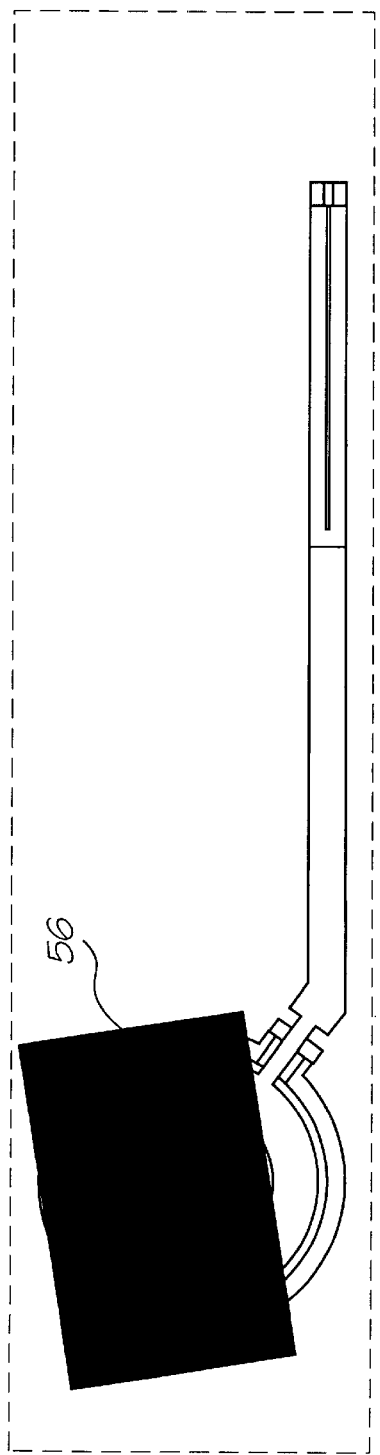
Figure 14B:
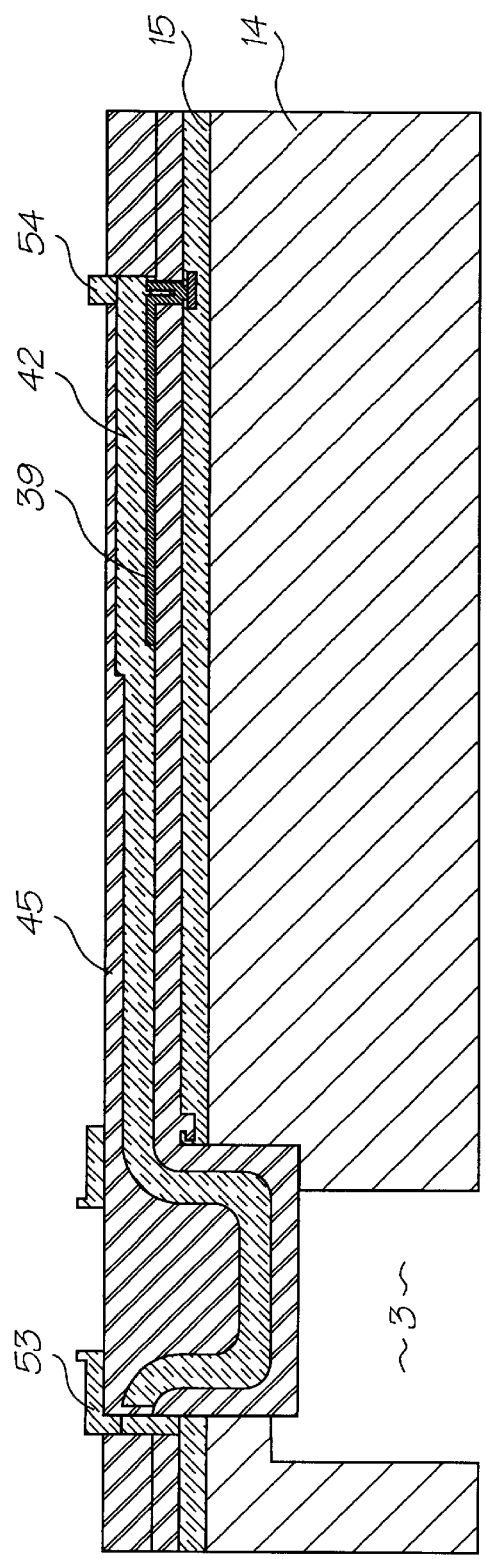

Next, as illustrated in FIG. 14b the backside of the wafer is patterned and etched so as to form an ink supply channel 3. The mask utilized can have regions 56 as specified in FIG. 14a. The etch through the backside of the wafer can preferably utilize a high quality deep anisotropic etching system such as that available from Silicon Technology Systems of the United Kingdom. Preferably, the etching process also results in the dicing of the wafer into its separate printheads at the same time.

Figure 15:
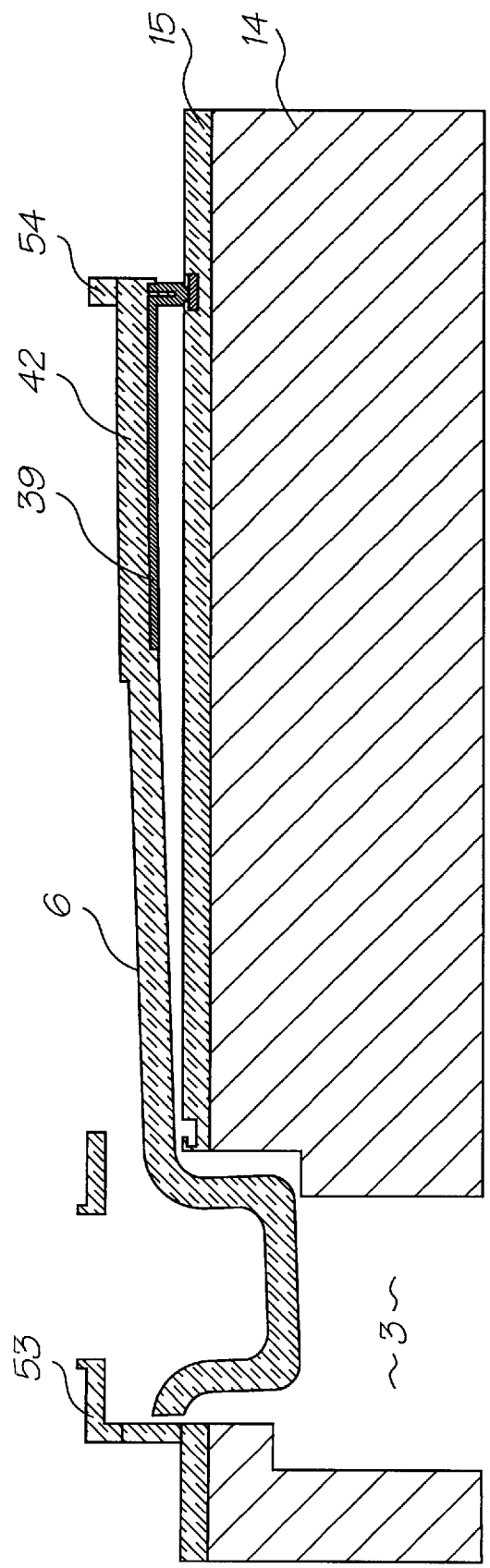

Next, as illustrated in FIG. 15, the sacrificial material can be etched away so as to release the actuator structure. Upon release, the actuator 6 bends downwards due to its release from thermal stresses built up during deposition. The printhead can then be cleaned and mounted in a moulded ink supply system for the supply of ink to the back surface of the wafer. A TAB film for suppling electric control to an edge of the printhead can then be bonded utilizing normal TAB bonding techniques. The surface area can then be hydrophobically treated and finally the ink supply channel and nozzle chamber filled with ink for testing.

Figure 16:
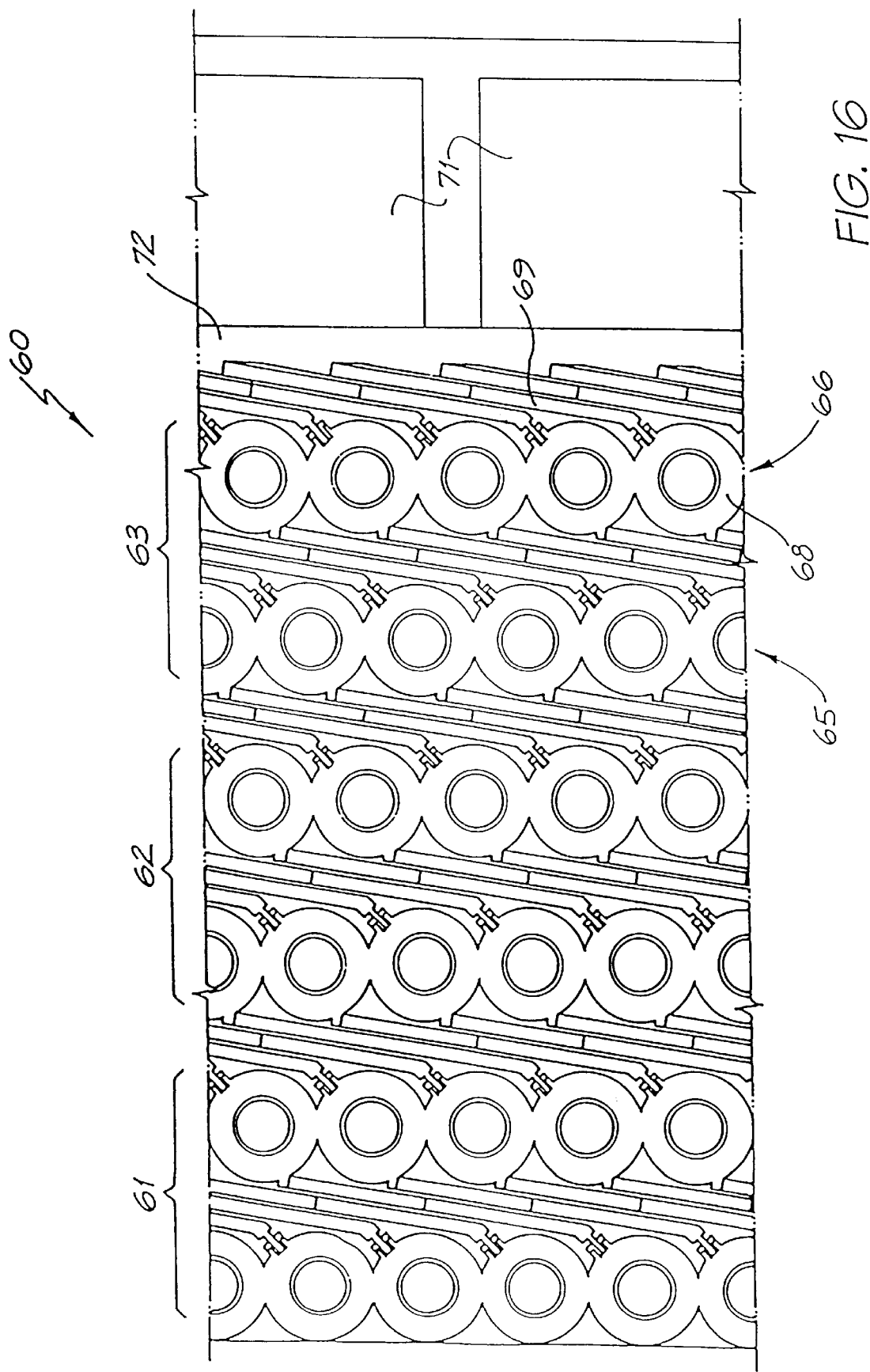
FIG. 16 illustrates a portion of an array view of a printhead having a large number of nozzles, each constructed in accordance with the principles of the present invention.

Hence, as illustrated in FIG. 16, a page width printhead having a repetitive structure 60 can be constructed for full color printing. FIG. 16 shows a portion of the final printhead structure and includes three separate groupings 61–63 with one grouping for each color and each grouping eg. 63 in turn consisting of two separate rows of inkjet nozzles 65, 66 which are spaced apart in an interleaved pattern. The nozzle 65, 66 are fired at predetermined times so as to form an output image as would be readily understood by those skilled in the art of construction of inkjet printhead. Each nozzle eg. 68 includes its own actuator arm 69 which, in order to form an extremely compact arrangement, is preferably formed so as to be generally bent with respect to the line perpendicular to the row of nozzles. Preferably, a three color arrangement is provided which has one of the groups 61–63 dedicated to cyan, magenta and another yellow color printing. Obviously, four color printing arrangements can be constructed if required.

Preferably, at one side a series of bond pads eg. 71 are formed along the side for the insertion of a tape automated bonding (TAB) strip which can be aligned by means of alignment rail eg. 72 which is constructed along one edge of the printhead specifically for this purpose.

Figure 17:
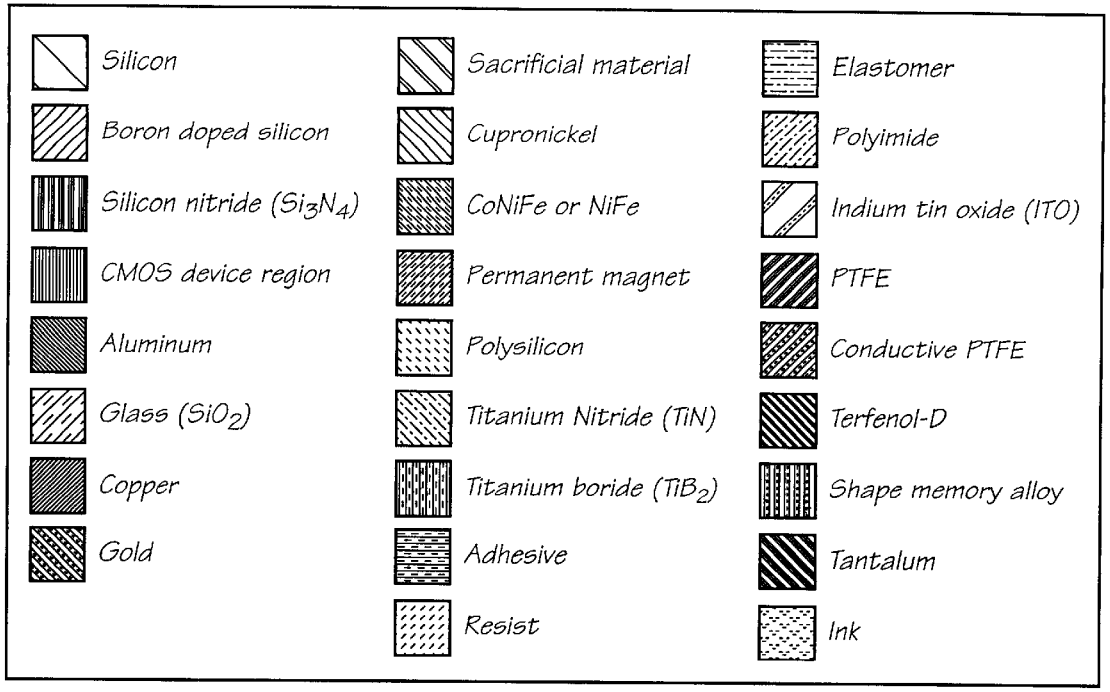
FIG. 17 provides a legend of the materials indicated in FIGS. 18 to 28.
Figure 18:
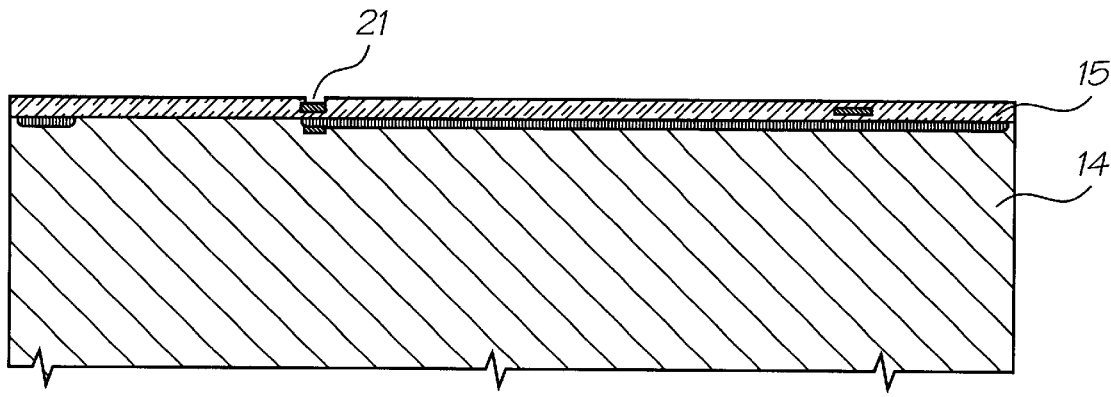
FIG. 18 to FIG. 28 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer 14, complete drive transistors, data distribution, and timing circuits using a 0.5 micron, one poly, 2 metal CMOS process 15. This step is shown in FIG. 18. For clarity, these diagrams may not be to scale, and may not represent a cross section though any single plane of the nozzle. FIG. 17 is a key to representations of various materials in these manufacturing diagrams, and those of other cross referenced ink jet configurations.

2. Etch oxide down to silicon or aluminum using Mask 1. This mask defines the pit underneath the paddle, as well as the edges of the printheads chip.

Figure 19:
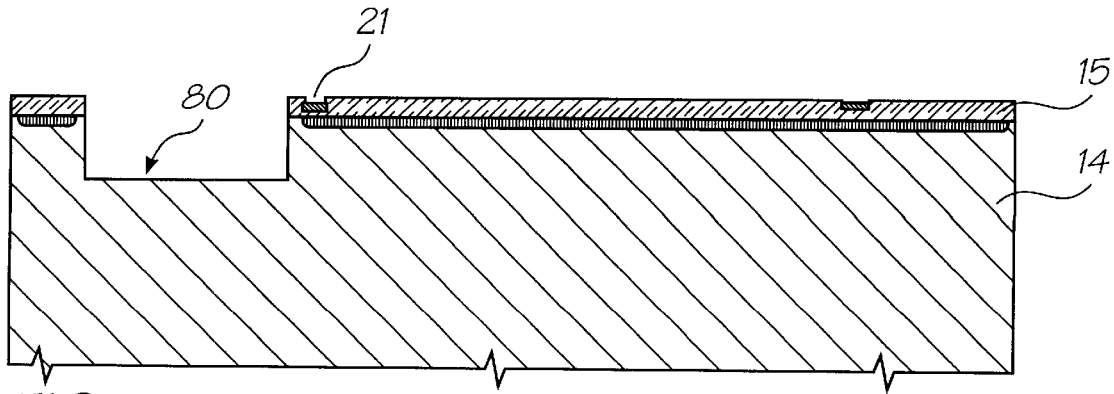

3. Etch silicon to a depth of 8 microns 80 using etched oxide as a mask. The sidewall slope of this etch is not critical (60 to 90 degrees is acceptable), so standard trench etchers can be used. This step is shown in FIG. 19.

4. Deposit 3 microns of sacrificial material 81 (e.g. aluminum or polyimide)

Figure 20:
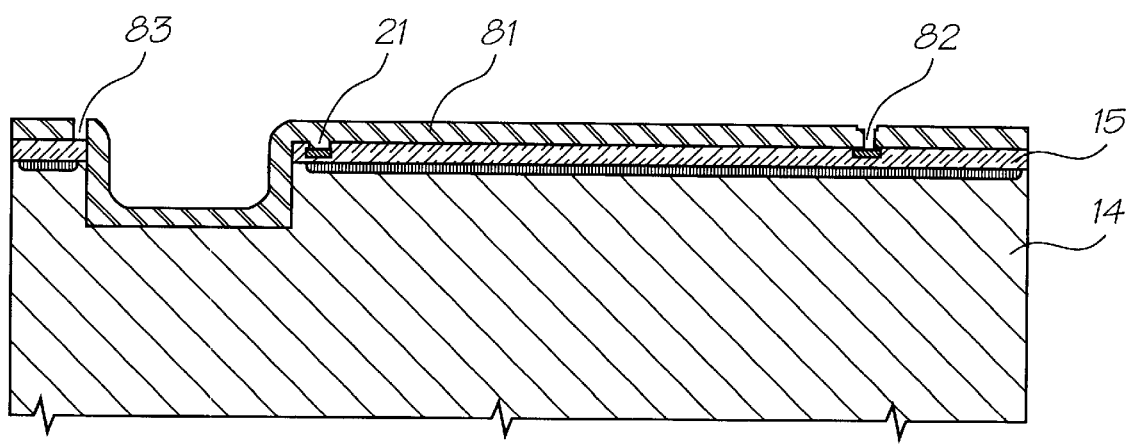

5. Etch the sacrificial layer using Mask 3, defining heater vias 82 and nozzle chamber walls 83. This step is shown in FIG. 20.

6. Deposit 0.2 microns of heater material 84, e.g. TiN.

Figure 21:
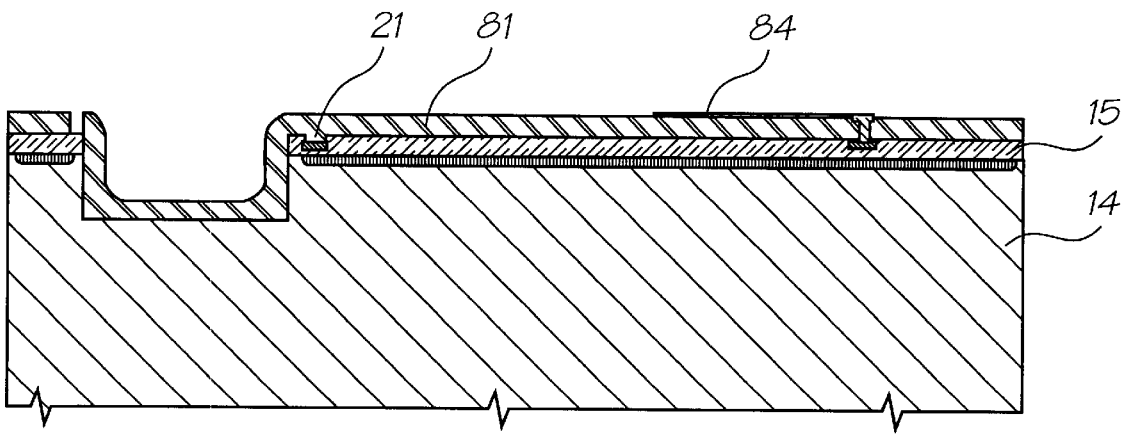

7. Etch the heater material using Mask 3, defining the heater shape. This step is shown in FIG. 21.

8. Wafer probe. All electrical connections are complete at this point, bond pads are accessible, and the chips are not yet separated.

9. Deposit 3 microns of PECVD glass 85.

Figure 22:
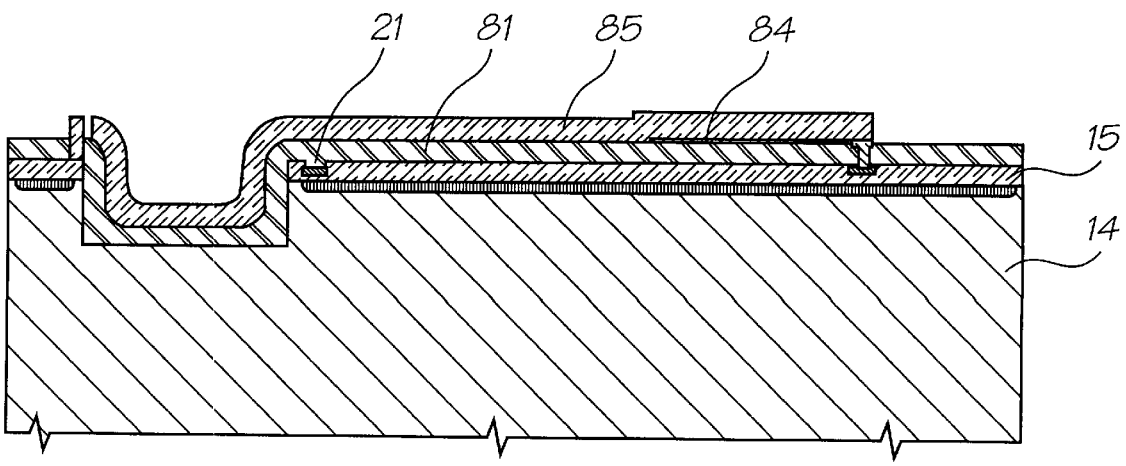

10. Etch glass layer using Mask 4. This mask defines the nozzle chamber wall, the paddle, and the actuator arm. This step is shown in FIG. 22.

11. Deposit 6 microns of sacrificial material 86.

Figure 23:
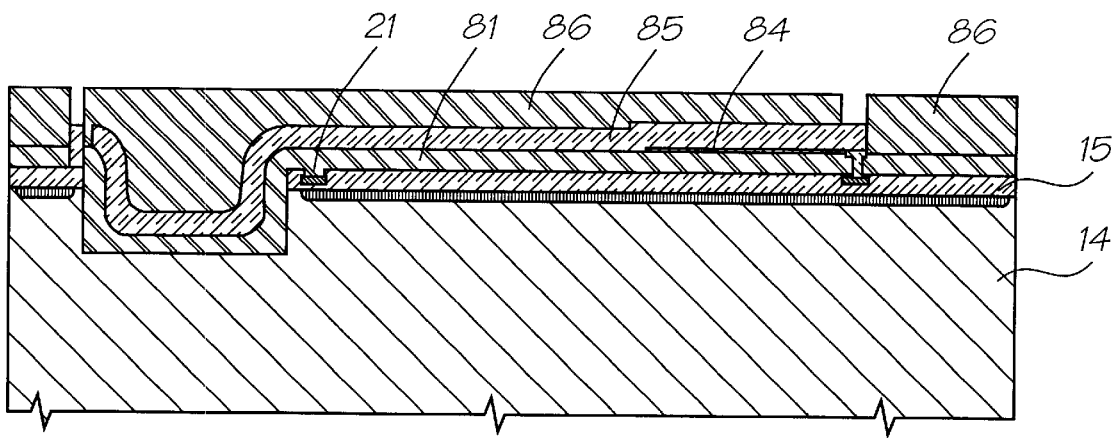

12. Etch the sacrificial material using Mask 5. This mask defines the nozzle chamber wall. This step is shown in FIG. 23.

13. Deposit 3 microns of PECVD glass 87.

Figure 24:
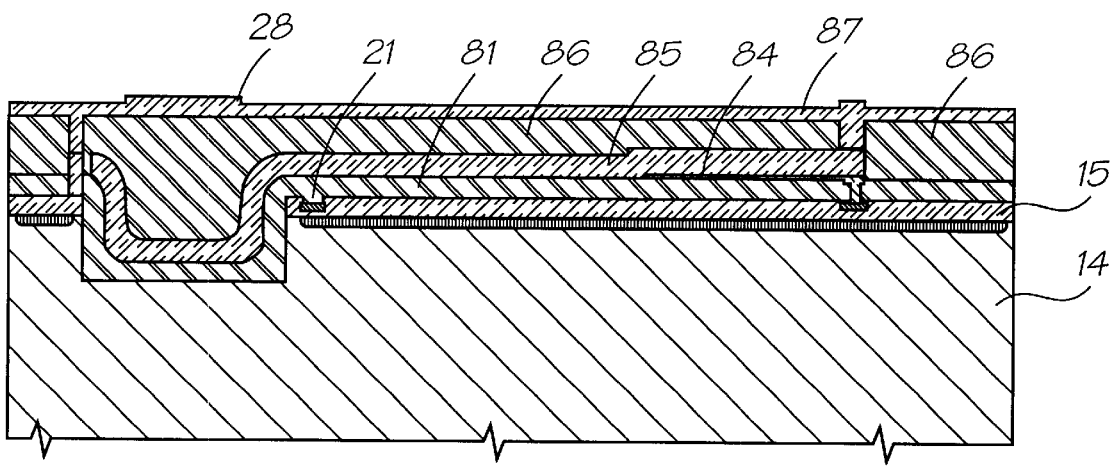

14. Etch to a depth of (approx.) 1 micron using Mask 6. This mask defines the nozzle rim 28.
This step is shown in FIG. 24.

Figure 25:
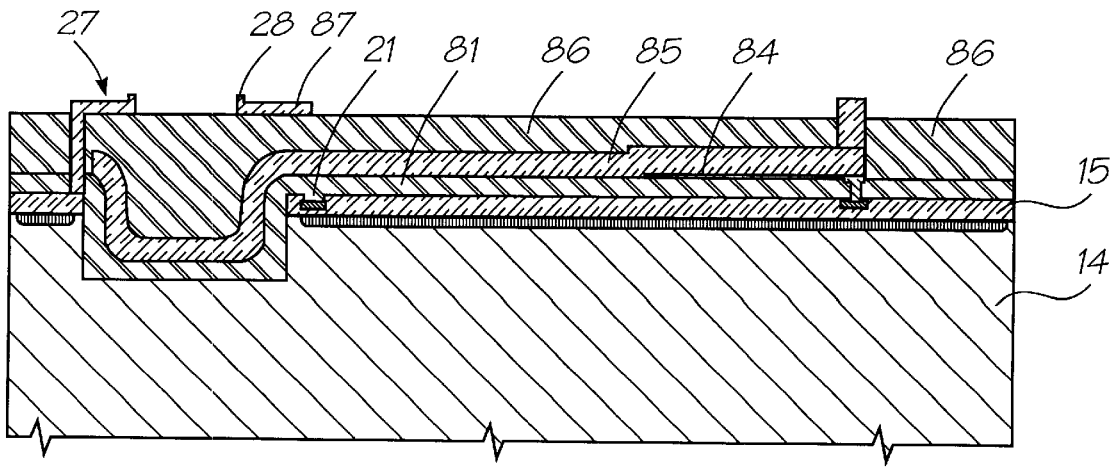

15. Etch down to the sacrificial layer using Mask 7. This mask defines the roof of the nozzle chamber, and the nozzle 27 itself. This step is shown in FIG. 25.

Figure 26:
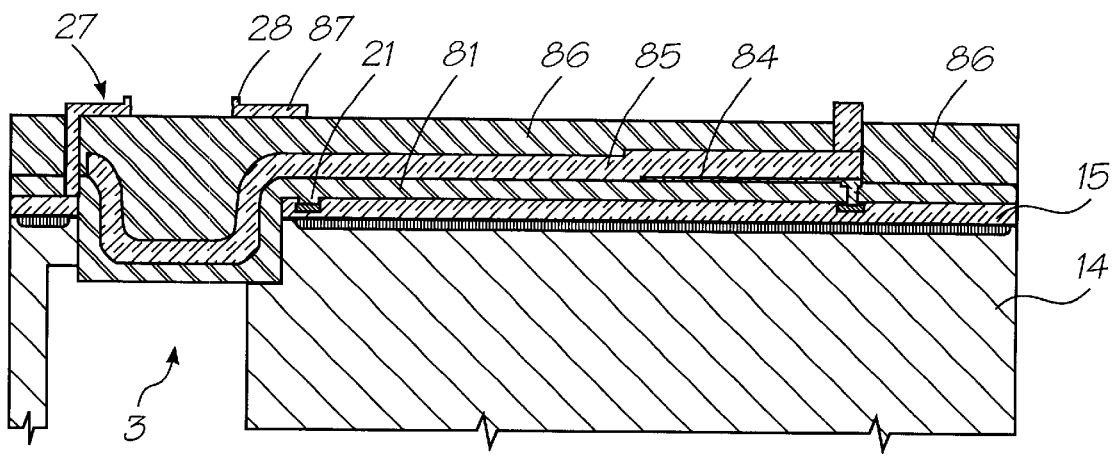

16. Back-etch completely through the silicon wafer (with, for example; an ASE Advanced Silicon Etcher from Surface Technology Systems) using Mask 8. This mask defines the ink inlets 3 which are etched through the wafer. The wafer is also diced by this etch. This step is shown in FIG. 26.

Figure 27:
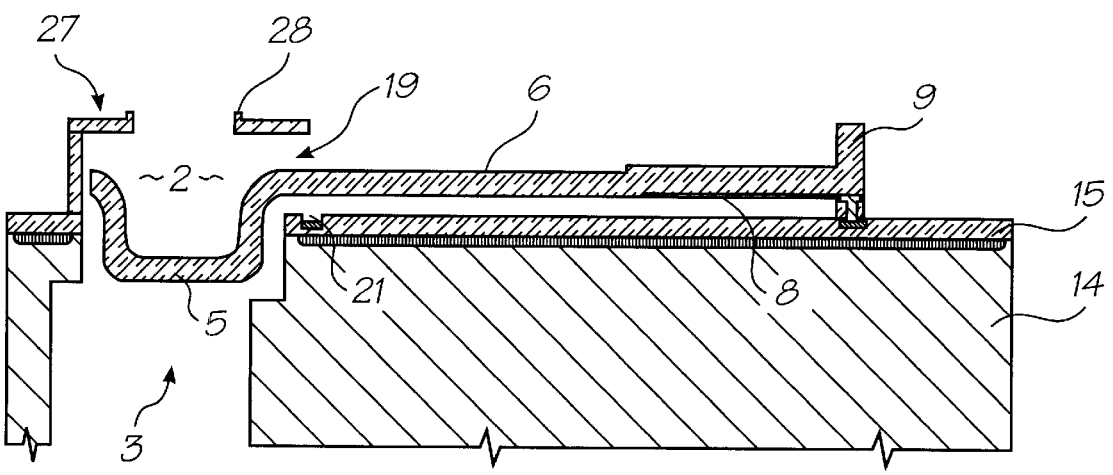

17. Etch the sacrificial material. The nozzle chambers are cleared, the actuators freed, and the chips are separated by this etch. This step is shown in FIG. 27.

18. Mount the printheads in their packaging, which may be a molded plastic former incorporating ink channels which supply the appropriate color ink to the ink inlets at the back of the wafer.

19. Connect the printheads to their interconnect systems. For a low profile connection with minimum disruption of airflow, TAB may be used. Wire bonding may also be used if the printer is to be operated with sufficient clearance to the paper.

20. Hydrophobize the front surface of the printheads.

Figure 28:
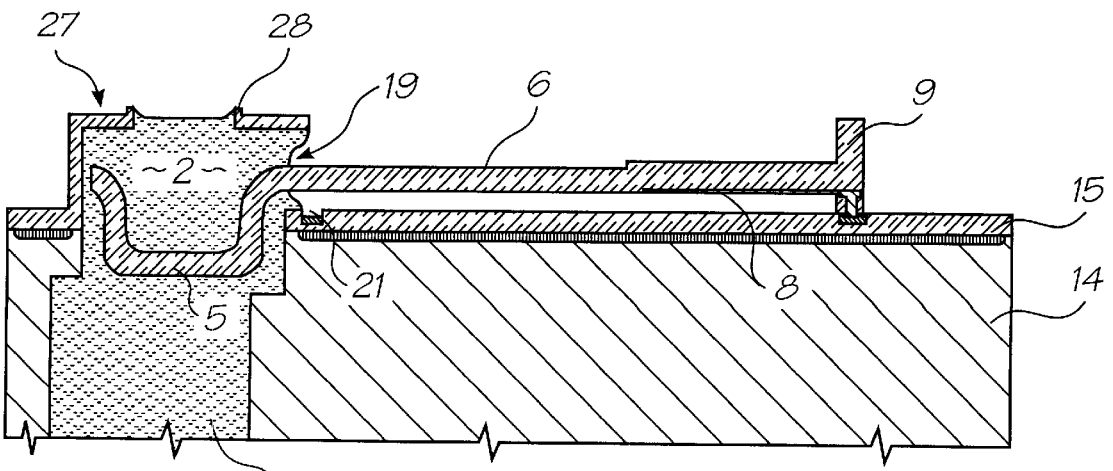

21. Fill the completed printheads with ink 88 and test them. A filled nozzle is shown in FIG. 28.

Figure 29:
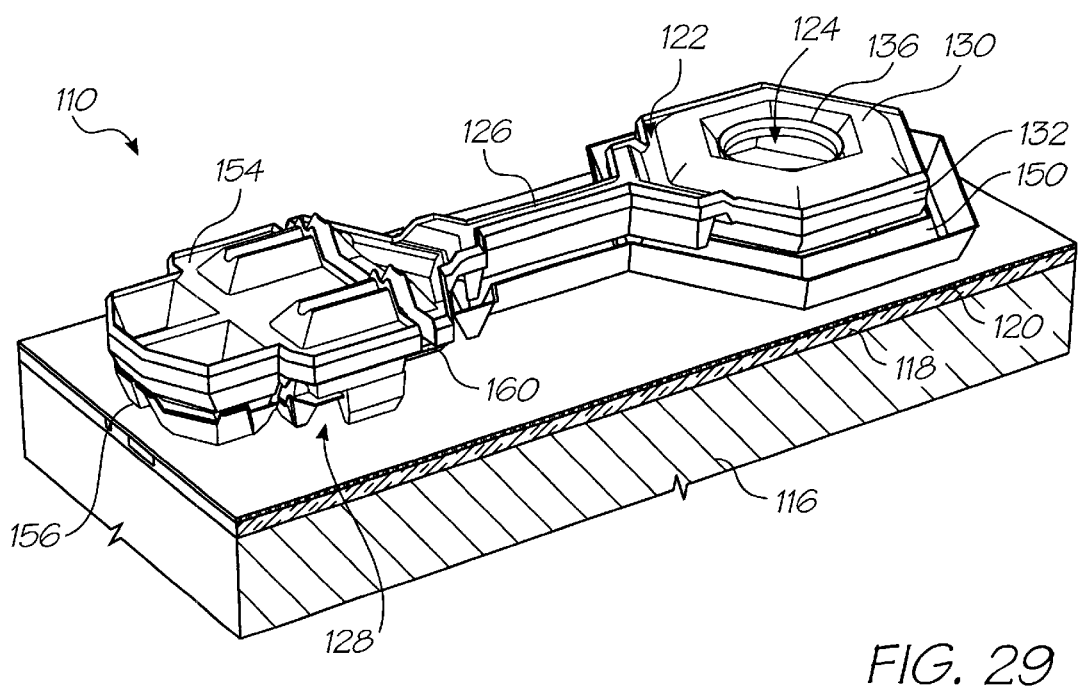
FIG. 29 shows a three dimensional, schematic view of a nozzle assembly for an ink jet printhead in accordance with the invention.

Referring now to FIG. 29 of the drawings, a nozzle assembly, in accordance with a further embodiment of the invention is designated generally by the reference numeral 110. An ink jet printhead has a plurality of nozzle assemblies 110 arranged in an array 114 (FIGS. 33 and 34) on a silicon substrate 116. The array 114 will be described in greater detail below.

The assembly 110 includes a silicon substrate or wafer 116 on which a dielectric layer 118 is deposited. A CMOS passivation layer 120 is deposited on the dielectric layer 118.

Each nozzle assembly 110 includes a nozzle 122 defining a nozzle opening 124, a connecting member in the form of a lever arm 126 and an actuator 128. The lever arm 126 connects the actuator 128 to the nozzle 122.

Figure 30:
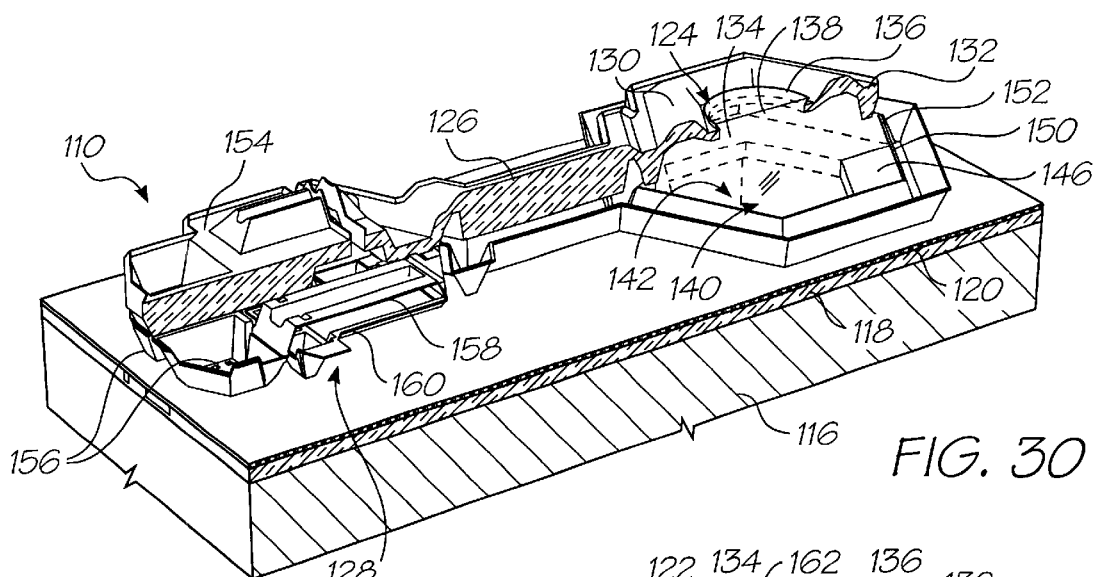
FIGS. 30 to 32 show a three dimensional, schematic illustration of an operation of the nozzle assembly of FIG. 29.
Figure 31:
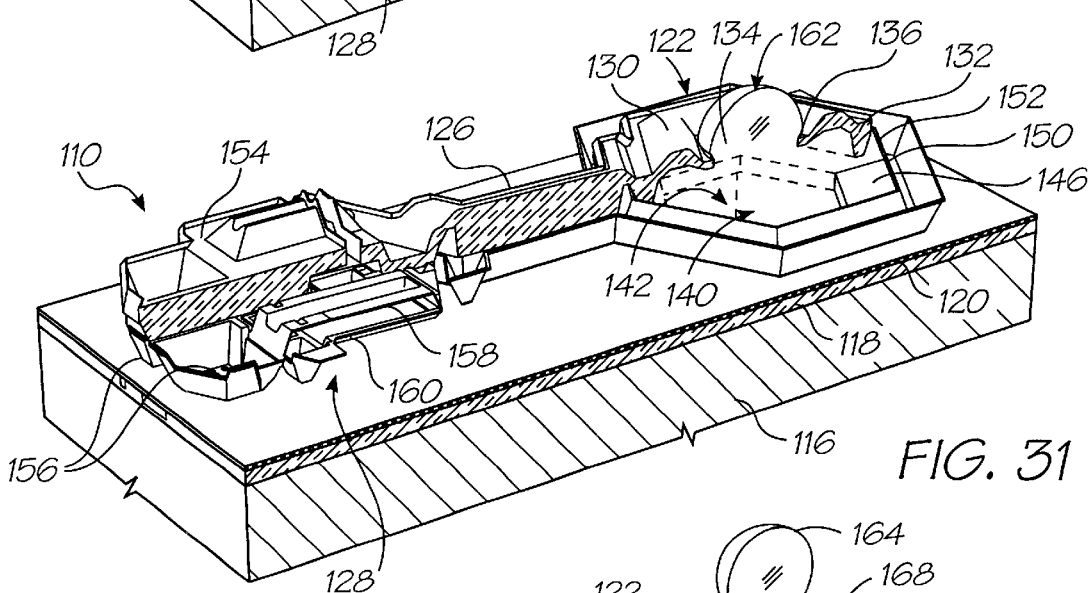
Figure 32:
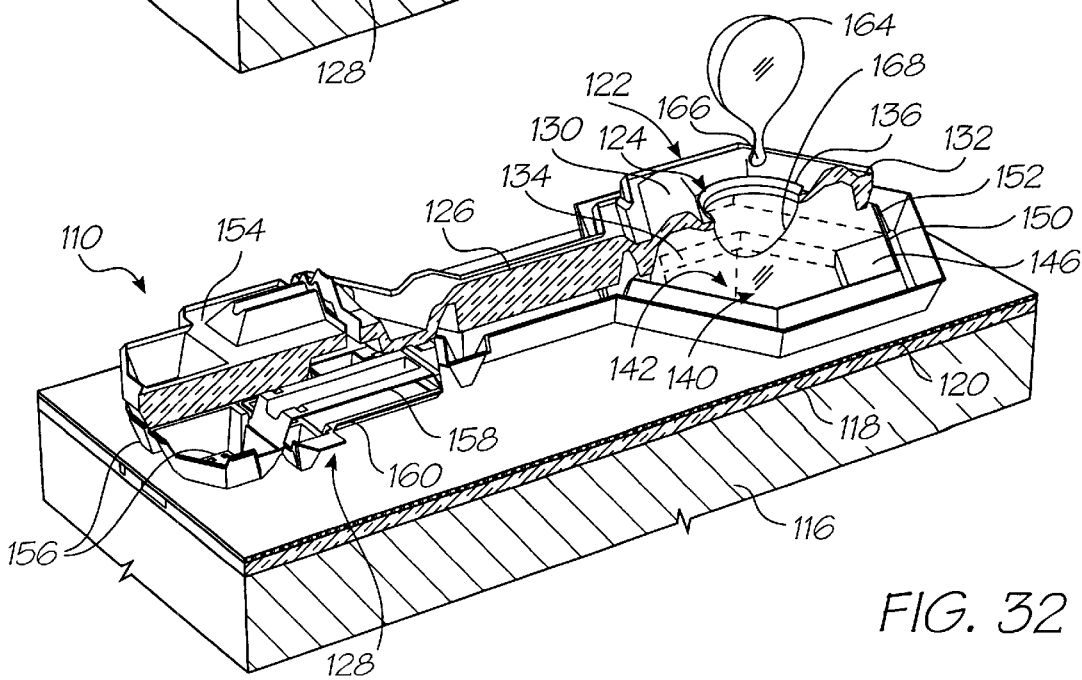

As shown in greater detail in FIGS. 30 to 32 of the drawings, the nozzle 122 comprises a crown portion 130 with a skirt portion 132 depending from the crown portion 130. The skirt portion 132 forms part of a peripheral wall of a nozzle chamber 134 (FIGS. 30 to 32 of the drawings). The nozzle opening 124 is in fluid communication with the nozzle chamber 134. It is to be noted that the nozzle opening 124 is surrounded by a raised rim 136 which "pins" a meniscus 138 (FIG. 30) of a body of ink 140 in the nozzle chamber 134.

An ink inlet aperture 142 (shown most clearly in FIG. 34) is defined in a floor 146 of the nozzle chamber 134. The aperture 142 is in fluid communication with an ink inlet channel 148 defined through the substrate 116.

A wall portion 150 bounds the aperture 142 and extends upwardly from the floor portion 146. The skirt portion 132, as indicated above, of the nozzle 122 defines a first part of a peripheral wall of the nozzle chamber 134 and the wall portion 150 defines a second part of the peripheral wall of the nozzle chamber 134.

The wall 150 has an inwardly directed lip 152 at its free end which serves as a fluidic seal which inhibits the escape of ink when the nozzle 122 is displaced, as will be described in greater detail below. It will be appreciated that, due to the viscosity of the ink 140 and the small dimensions of the spacing between the lip 152 and the skirt portion 132, the inwardly directed lip 152 and surface tension function as a seal for inhibiting the escape of ink from the nozzle chamber 134.

The actuator 128 is a thermal bend actuator and is connected to an anchor 154 extending upwardly from the substrate 116 or, more particularly, from the CMOS passivation layer 120. The anchor 154 is mounted on conductive pads 156 which form an electrical connection with the actuator 128.

The actuator 128 comprises a first, active beam 158 arranged above a second, passive beam 160. In a preferred embodiment, both beams 158 and 160 are of, or include, a conductive ceramic material such as titanium nitride (TiN).

Both beams 158 and 160 have their first ends anchored to the anchor 154 and their opposed ends connected to the arm 126. When a current is caused to flow through the active beam 158 thermal expansion of the beam 158 results. As the passive beam 160, through which there is no current flow, does not expand at the same rate, a bending moment is created causing the arm 126 and, hence, the nozzle 122 to be displaced downwardly towards the substrate 116 as shown in FIG. 31 of the drawings. This causes an ejection of ink through the nozzle opening 124 as shown at 162 in FIG. 31 of the drawings. When the source of heat is removed from the active beam 158, i.e. by stopping current flow, the nozzle 122 returns to its quiescent position as shown in FIG. 32 of the drawings. When the nozzle 122 returns to its quiescent position, an ink droplet 164 is formed as a result of the breaking of an ink droplet neck as illustrated at 166 in FIG. 32 of the drawings. The ink droplet 164 then travels on to the print media such as a sheet of paper. As a result of the formation of the ink droplet 164, a "negative" meniscus is formed as shown at 168 in FIG. 32 of the drawings. This "negative" meniscus 168 results in an inflow of ink 140 into the nozzle chamber 134 such that a new meniscus 138 (FIG. 30) is formed in readiness for the next ink drop ejection from the nozzle assembly 110.

Figure 33:
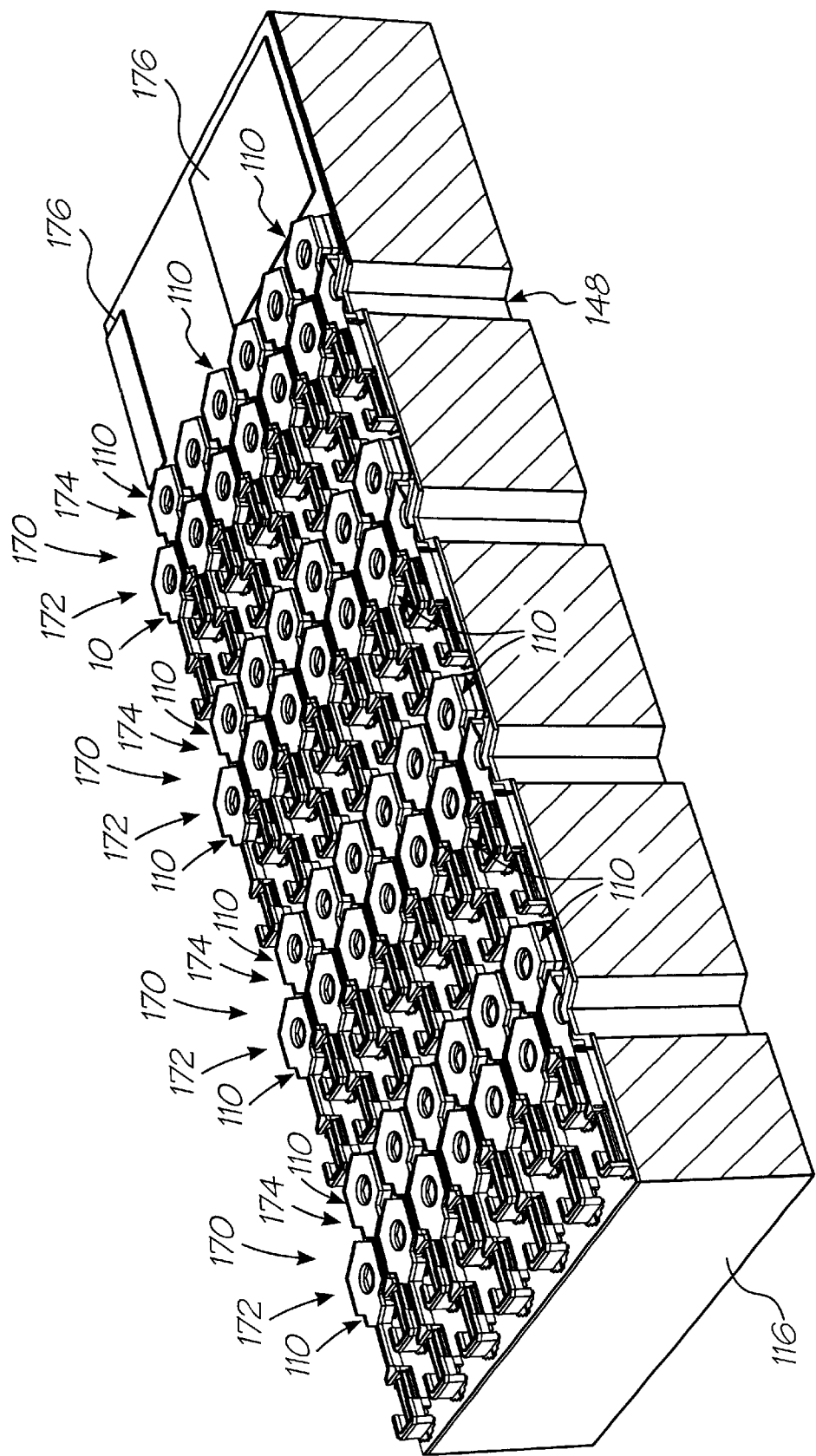
FIG. 33 shows a three dimensional view of a nozzle array constituting an ink jet printhead.
Figure 34:
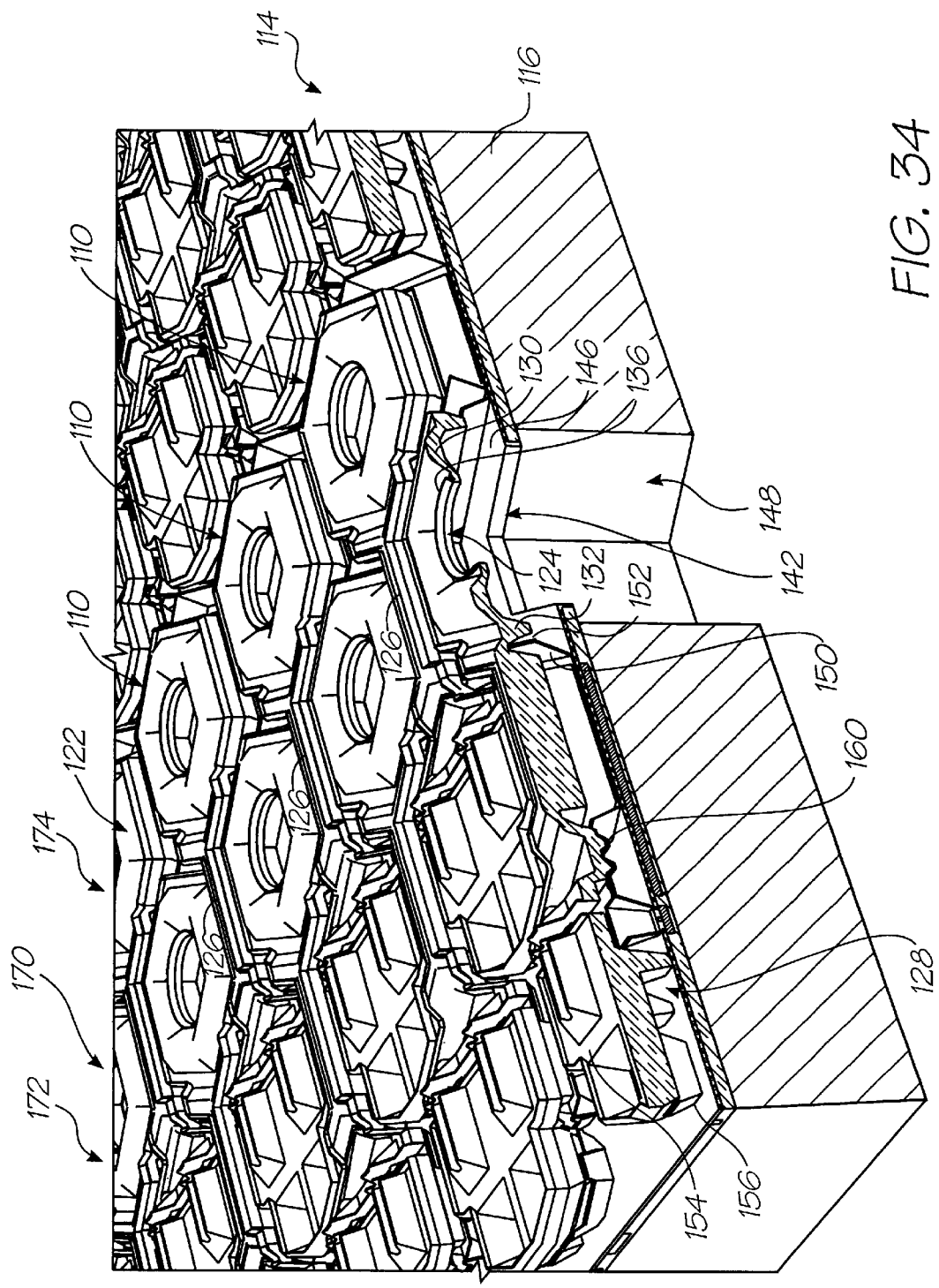
FIG. 34 shows, on an enlarged scale, part of the array of FIG. 33.

Referring now to FIGS. 33 and 34 of the drawings, the nozzle array 114 is described in greater detail. The array 114 is for a four color printhead. Accordingly, the array 114 includes four groups 170 of nozzle assemblies, one for each color. Each group 170 has its nozzle assemblies 110 arranged in two rows 172 and 174. One of the groups 170 is shown in greater detail in FIG. 34 of the drawings.

To facilitate close packing of the nozzle assemblies 110 in the rows 172 and 174, the nozzle assemblies 110 in the row 174 are offset or staggered with respect to the nozzle assemblies 110 in the row 172. Also, the nozzle assemblies 110 in the row 172 are spaced apart sufficiently far from each other to enable the lever arms 126 of the nozzle assemblies 110 in the row 174 to pass between adjacent nozzles 122 of the assemblies 110 in the row 172. It is to be noted that each nozzle assembly 110 is substantially dumbbell shaped so that the nozzles 122 in the row 172 nest between the nozzles 122 and the actuators 128 of adjacent nozzle assemblies 110 in the row 174.

Further, to facilitate close packing of the nozzles 122 in the rows 172 and 174, each nozzle 122 is substantially hexagonally shaped.

It will be appreciated by those skilled in the art that, when the nozzles 122 are displaced towards the substrate 116, in use, due to the nozzle opening 124 being at a slight angle with respect to the nozzle chamber 134 ink is ejected slightly off the perpendicular. It is an advantage of the arrangement shown in FIGS. 33 and 34 of the drawings that the actuators 128 of the nozzle assemblies 110 in the rows 172 and 174 extend in the same direction to one side of the rows 172 and 174. Hence, the ink droplets ejected from the nozzles 122 in the row 172 and the ink droplets ejected from the nozzles 122 in the row 174 are parallel to one another resulting in an improved print quality.

Also, as shown in FIG. 33 of the drawings, the substrate 116 has bond pads 176 arranged thereon which provide the electrical connections, via the pads 156, to the actuators 128 of the nozzle assemblies 110. These electrical connections are formed via the CMOS layer (not shown).

Figure 35:
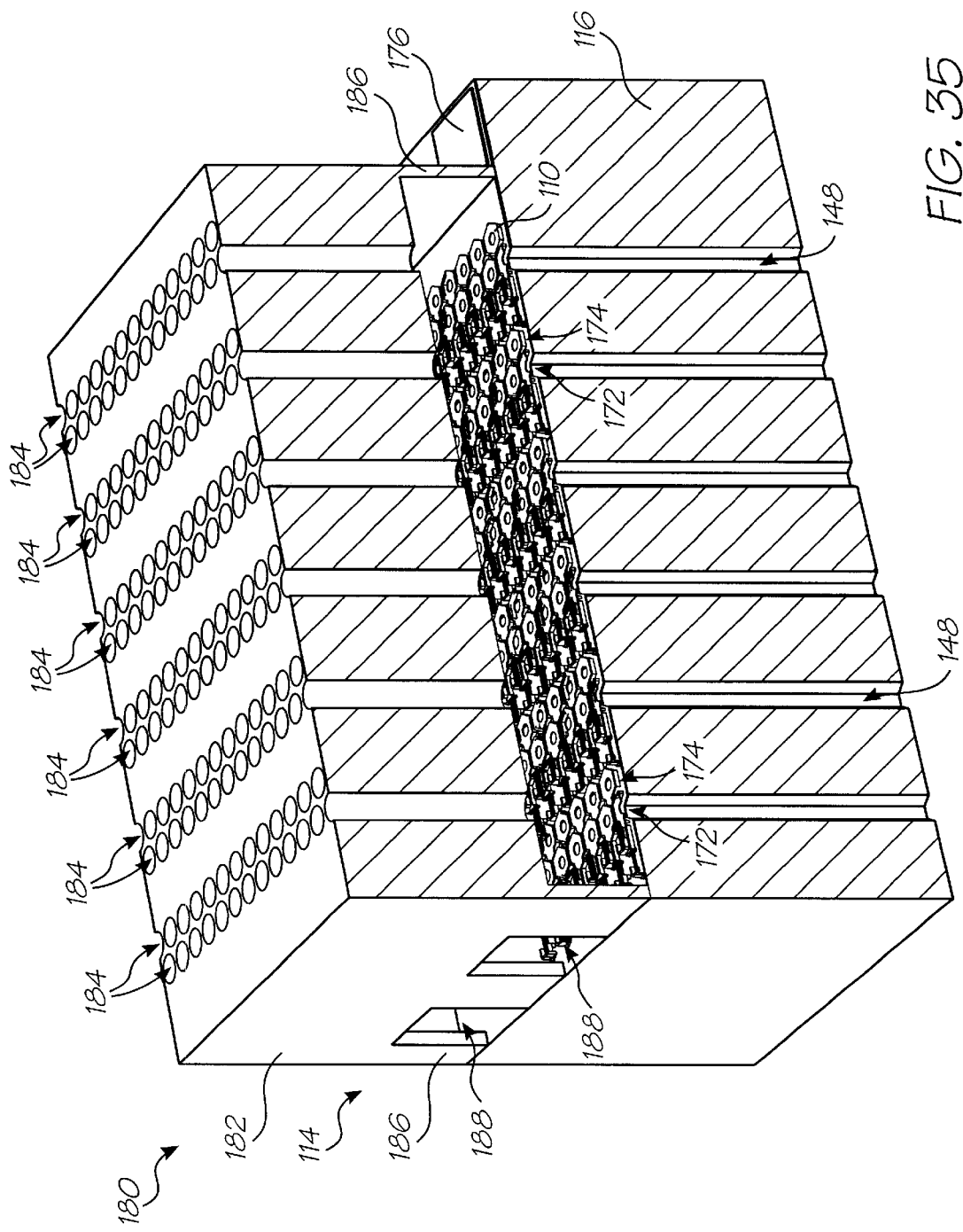
FIG. 35 shows a three dimensional view of an ink jet printhead including a nozzle guard.

Referring to FIG. 35 of the drawings, a development of the invention is shown. With reference to the previous drawings, like reference numerals refer to like parts, unless otherwise specified.

In this development, a nozzle guard 180 is mounted on the substrate 116 of the array 114. The nozzle guard 180 includes a body member 182 having a plurality of passages 184 defined therethrough. The passages 184 are in register with the nozzle openings 124 of the nozzle assemblies 110 of the array 114 such that, when ink is ejected from any one of the nozzle openings 124, the ink passes through the associated passage 184 before striking the print media.

The body member 182 is mounted in spaced relationship relative to the nozzle assemblies 110 by limbs or struts 186. One of the struts 186 has air inlet openings 188 defined therein.

In use, when the array 114 is in operation, air is charged through the inlet openings 188 to be forced through the passages 184 together with ink travelling through the passages 184.

The ink is not entrained in the air as the air is, charged through the passages 184 at a different velocity from that of the ink droplets 164. For example, the ink droplets 164 are ejected from the nozzles 122 at a velocity of approximately 3 m/s. The air is charged through the passages 184 at a velocity of approximately 1 m/s.

The purpose of the air is to maintain the passages 184 clear of foreign particles. A danger exists that these foreign particles, such as dust particles, could fall onto the nozzle assemblies 110 adversely affecting their operation. With the provision of the air inlet openings 88 in the nozzle guard 180 this problem is, to a large extent, obviated.

Referring now to FIGS. 36 to 38 of the drawings, a process for manufacturing the nozzle assemblies 110 is described.

Starting with the silicon substrate or wafer 116, the dielectric layer 118 is deposited on a surface of the wafer 116. The dielectric layer 118 is in the form of approximately 1.5 microns of CVD oxide. Resist is spun on to the layer 118 and the layer 118 is exposed to mask 200 and is subsequently developed.

After being developed, the layer 118 is plasma etched down to the silicon layer 116. The resist is then stripped and the layer 118 is cleaned. This step defines the ink inlet aperture 142.

Figure 36A:
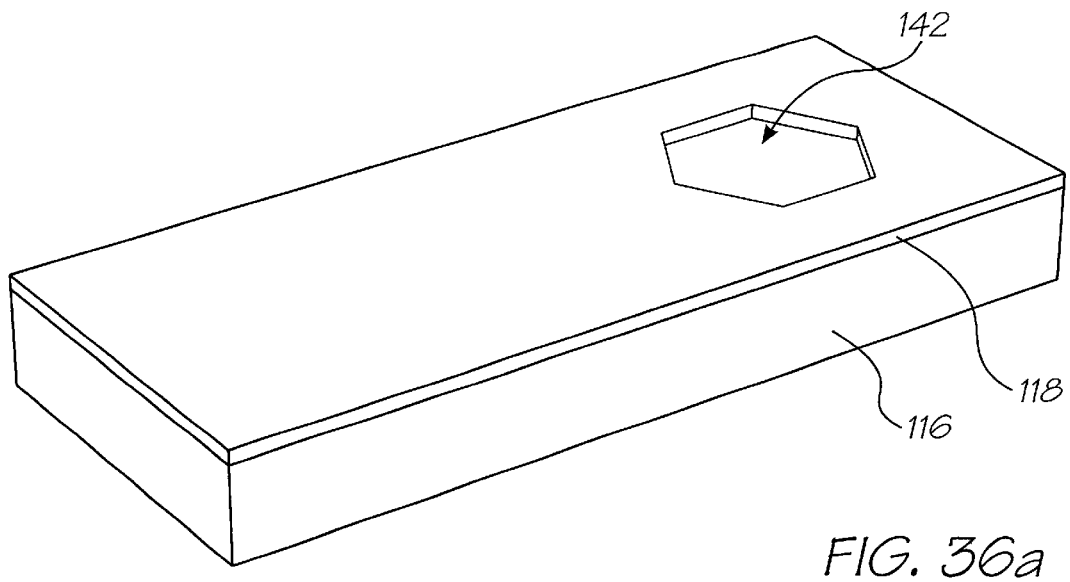
FIGS. 36a to 36r show three-dimensional views of steps in the manufacture of a nozzle assembly of an ink jet printhead.
Figure 37A:
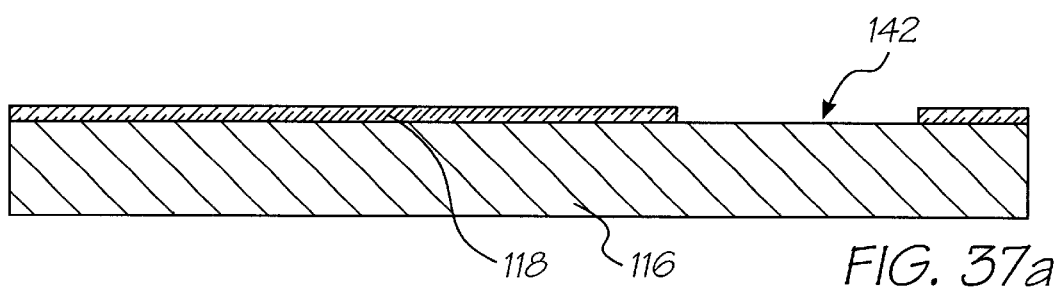
FIGS. 37a to 37r show sectional side views of the manufacturing steps.
Figure 38A:
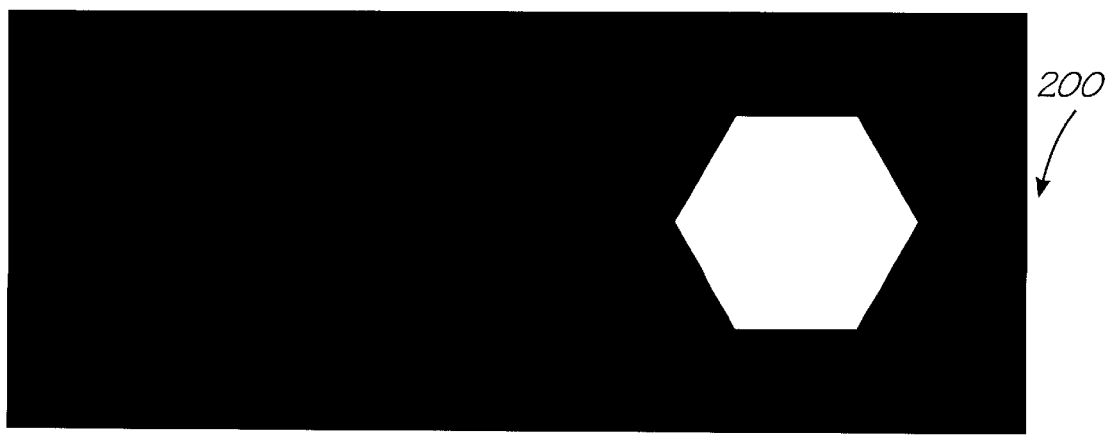
FIGS. 38a to 38k show layouts of masks used in various steps in the manufacturing process.
Figure 36B:
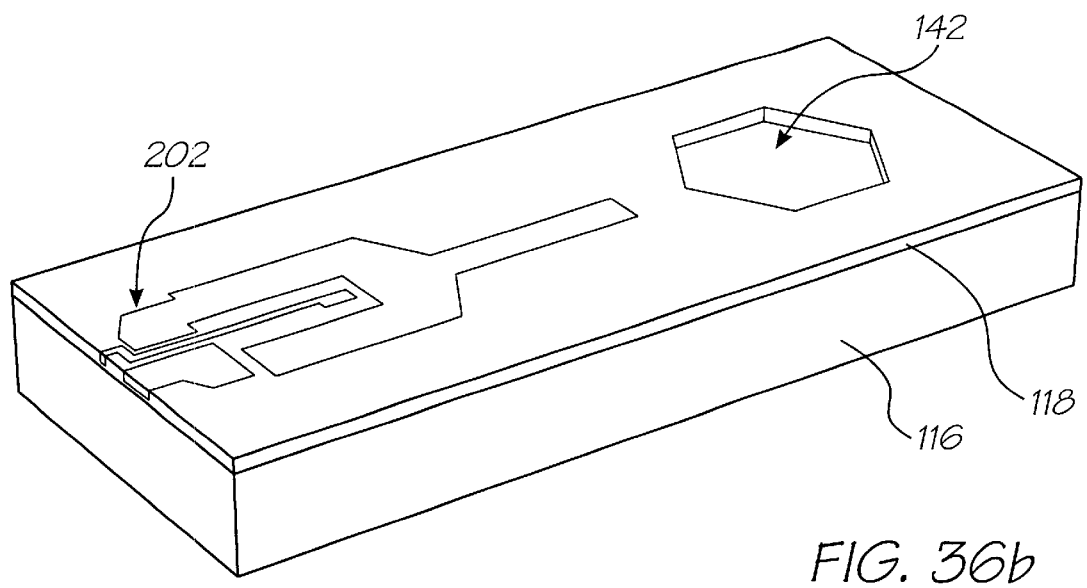
Figure 37B:
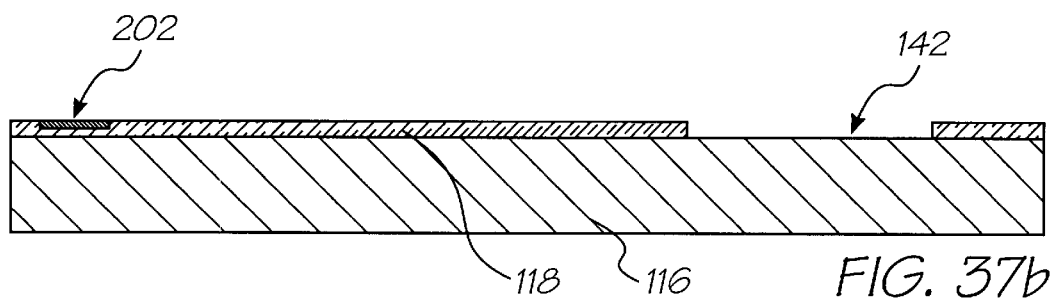
Figure 38B:
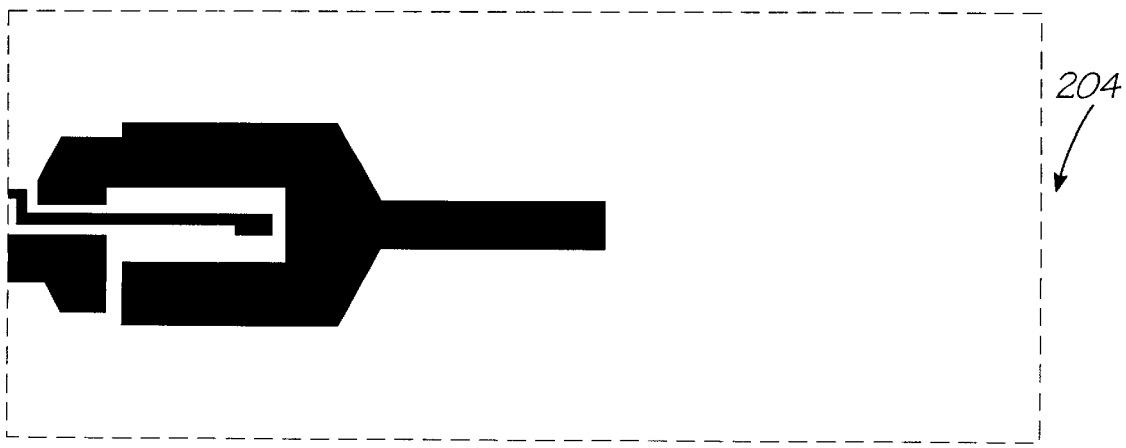
Figure 36C:
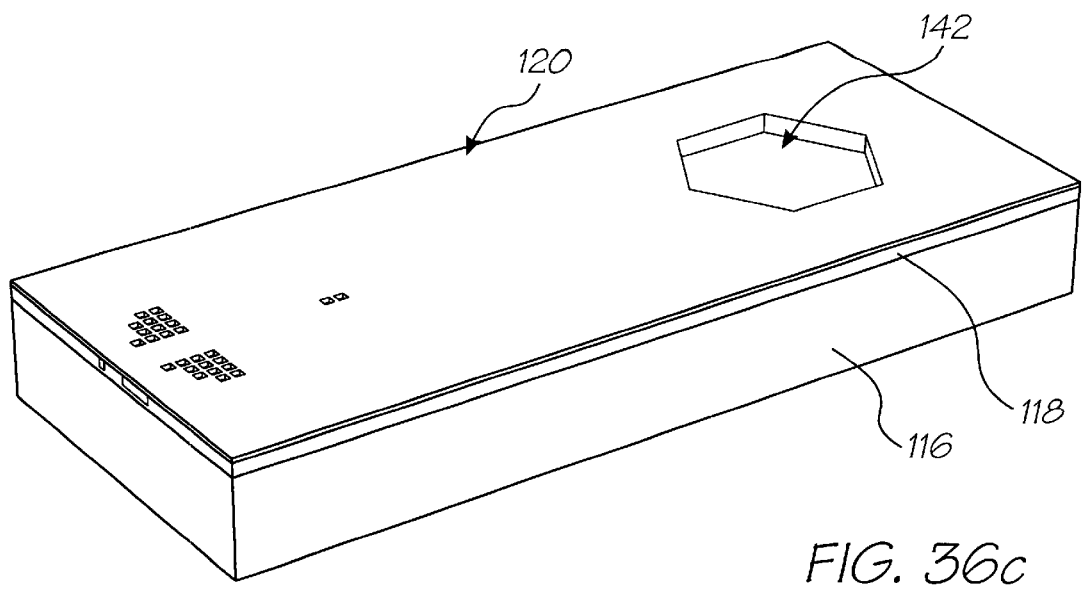
Figure 37C:
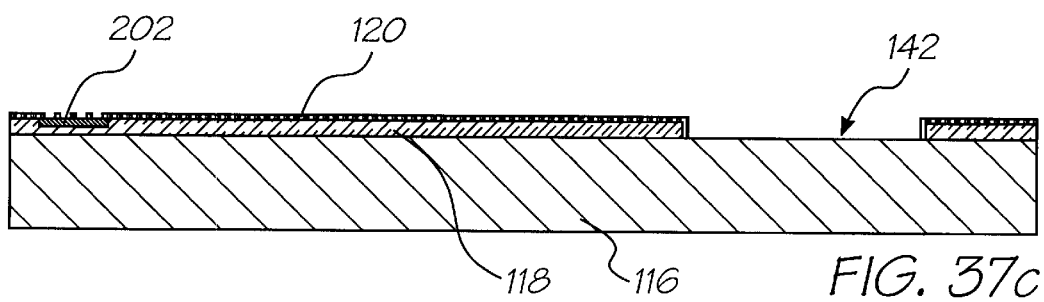
Figure 38C:
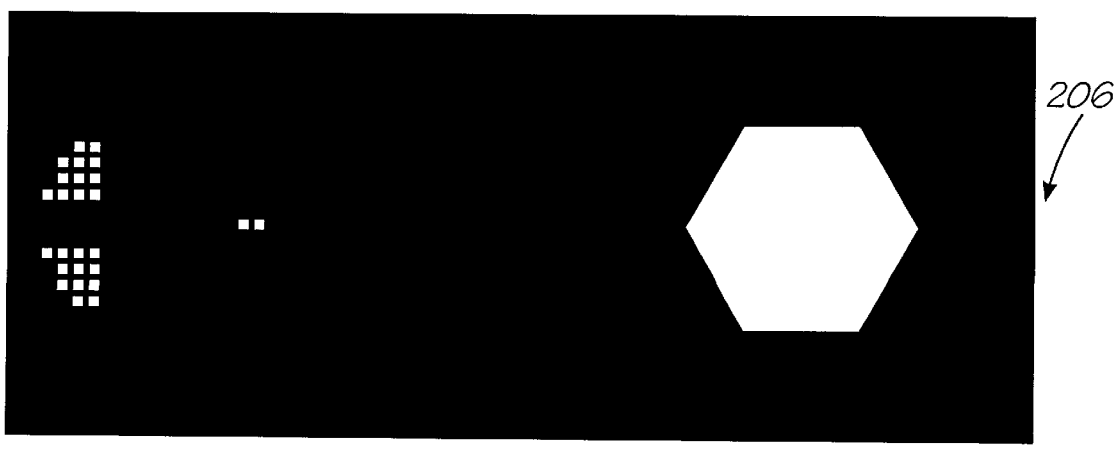
Figure 36D:
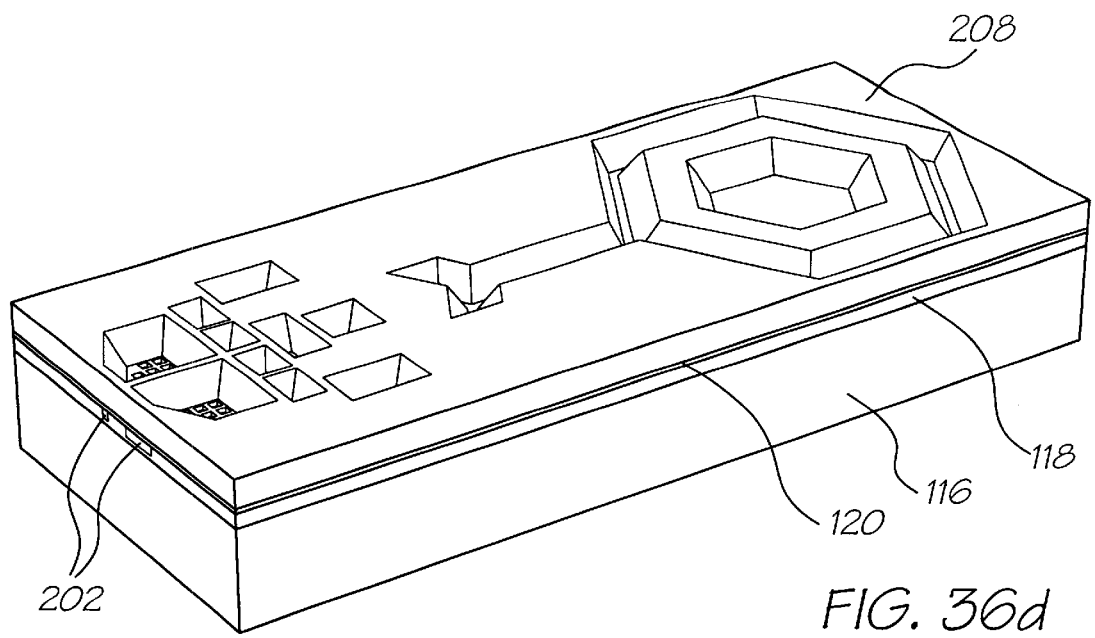
Figure 37D:
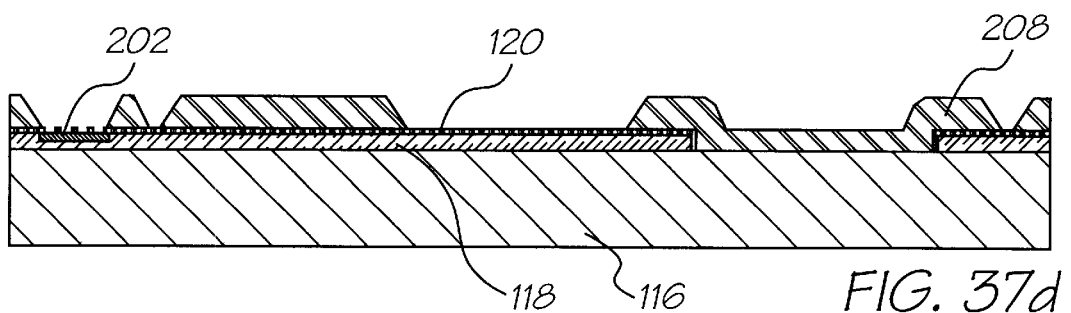
Figure 38D:
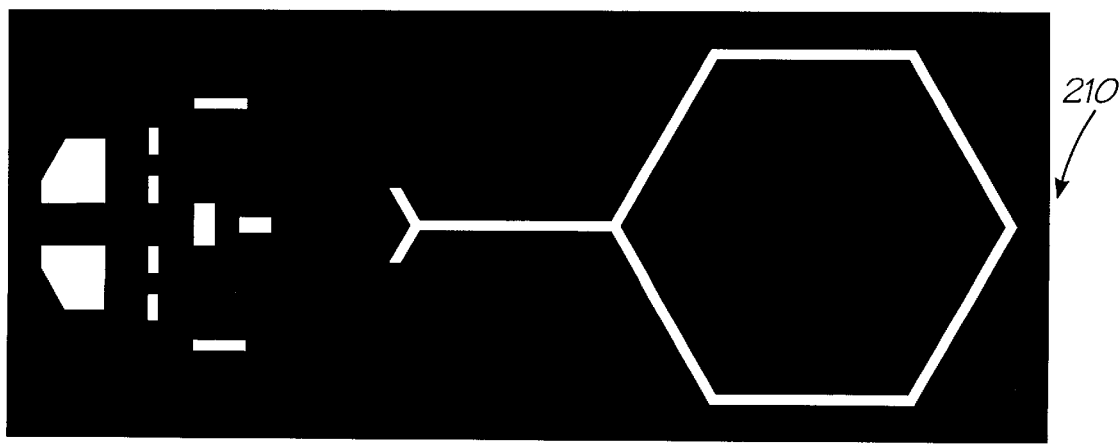

In FIG. 36b of the drawings, approximately 0.8 microns of aluminum 202 is deposited on the layer 118. Resist is spun on and the aluminum 202 is exposed to mask 204 and developed. The aluminum 202 is plasma etched down to the oxide layer 118, the resist is stripped and the device is cleaned. This step provides the bond pads and interconnects to the ink jet actuator 128. This interconnect is to an NMOS drive transistor and a power plane with connections made in the CMOS layer (not shown).

Approximately 0.5 microns of PECVD nitride is deposited as the CMOS passivation layer 120. Resist is spun on and the layer 120 is exposed to mask 206 whereafter it is developed. After development, the nitride is plasma etched down to the aluminum layer 202 and the silicon layer 116 in the region of the inlet aperture 142. The resist is stripped and the device cleaned.

A layer 208 of a sacrificial material is spun on to the layer 120. The layer 208 is 6 microns of photo-sensitive polyimide or approximately 4 $\mu$m of high temperature resist. The layer 208 is softbaked and is then exposed to mask 210 whereafter it is developed. The layer 208 is then hardbaked at 400° C. for one hour where the layer 208 is comprised of polyimide or at greater than 300° C. where the layer 208 is high temperature resist. It is to be noted in the drawings that the pattern-dependent distortion of the polyimide layer 208 caused by shrinkage is taken into account in the design of the mask 210.

Figure 36E:
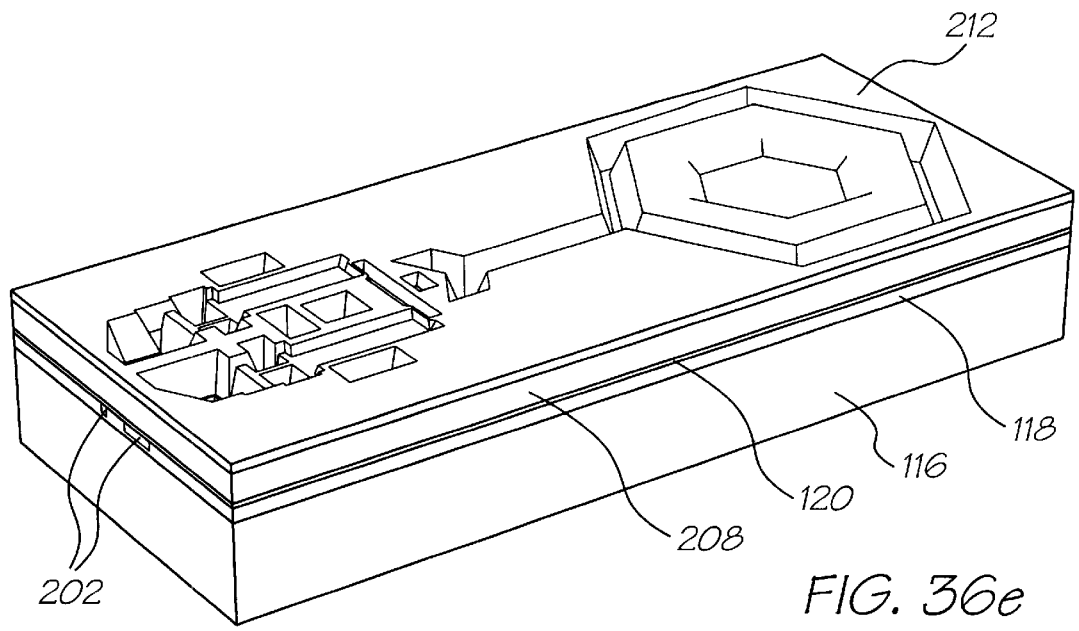
Figure 37E:
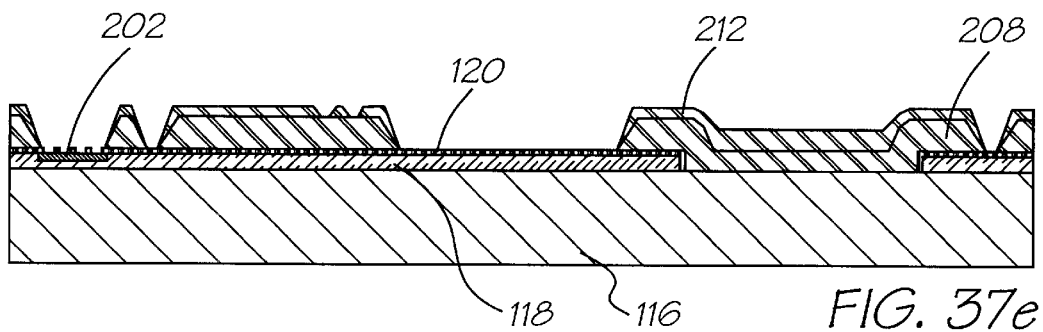
Figure 38E:
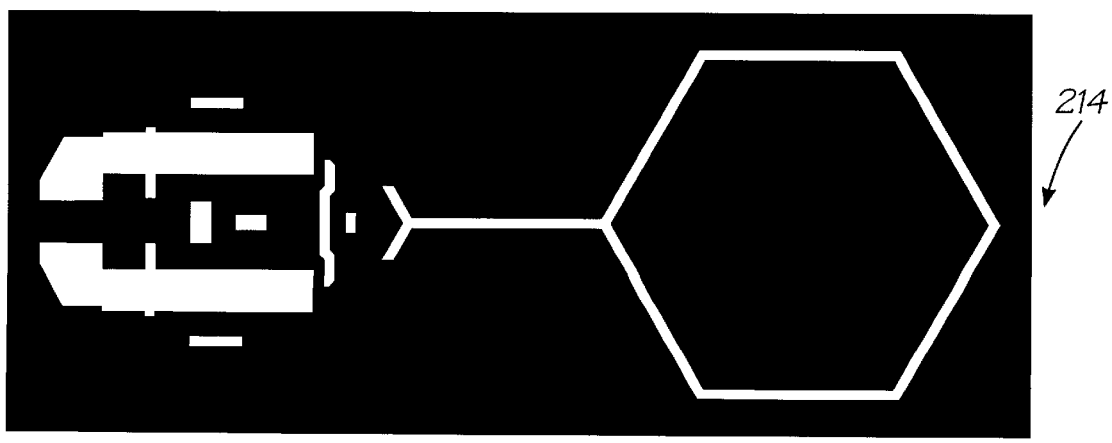
Figure 36F:
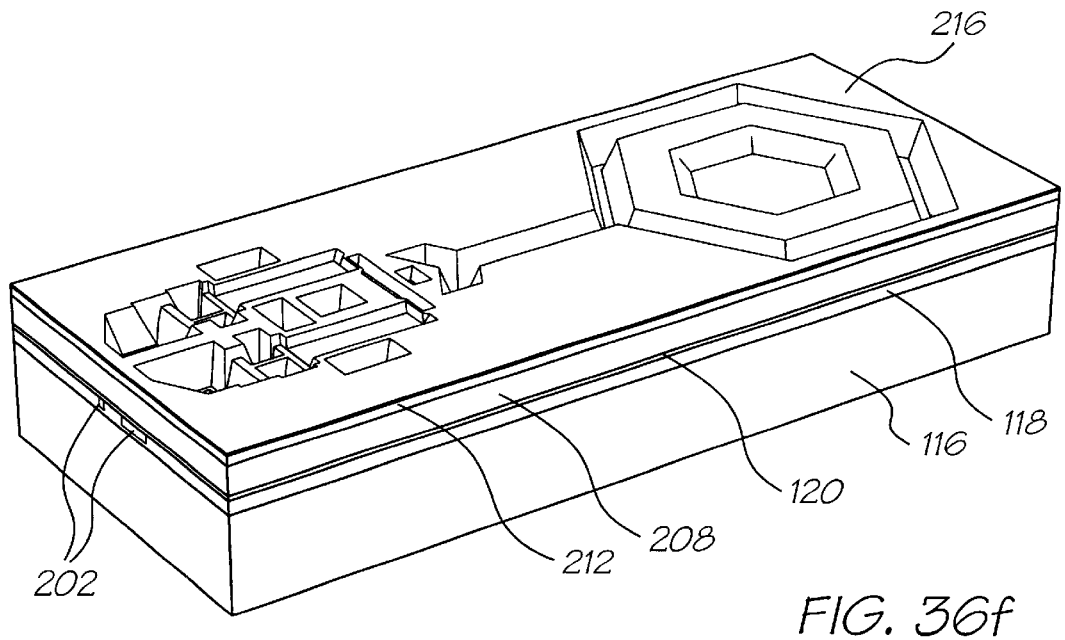
Figure 37F:
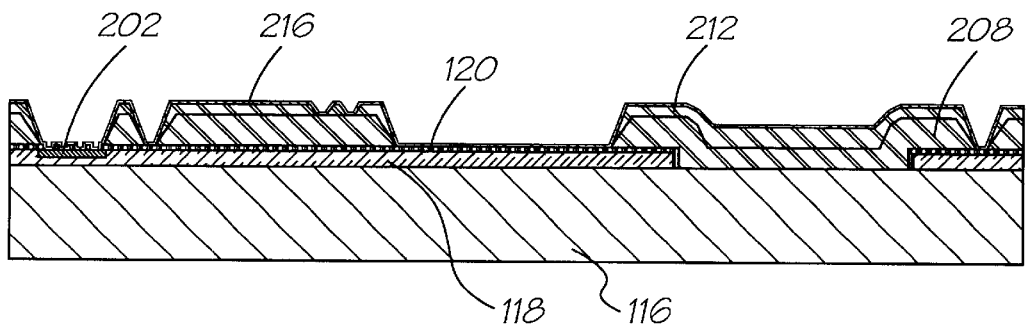
Figure 36G:
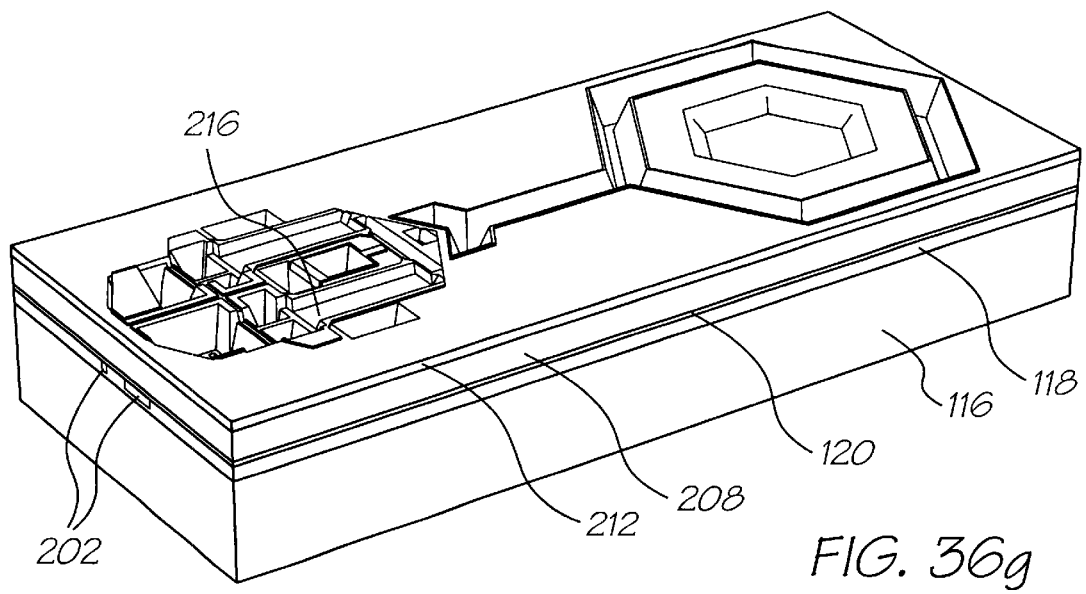
Figure 37G:
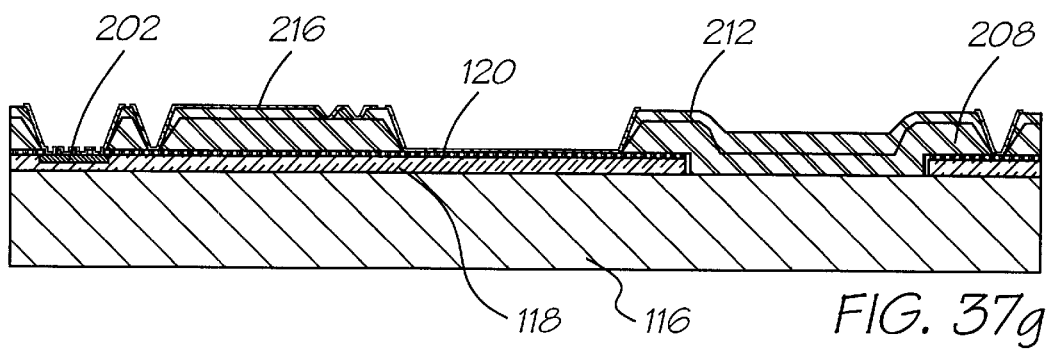
Figure 38F:
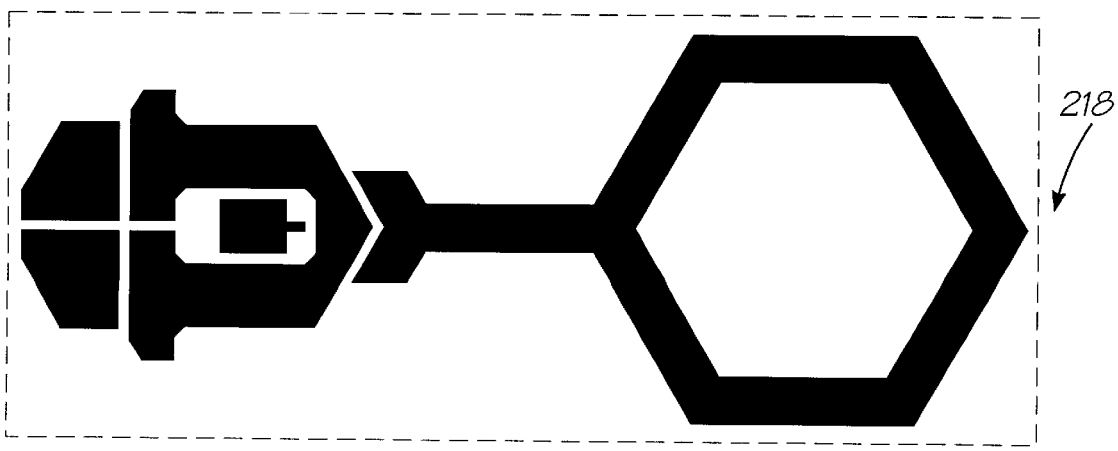
Figure 36H:
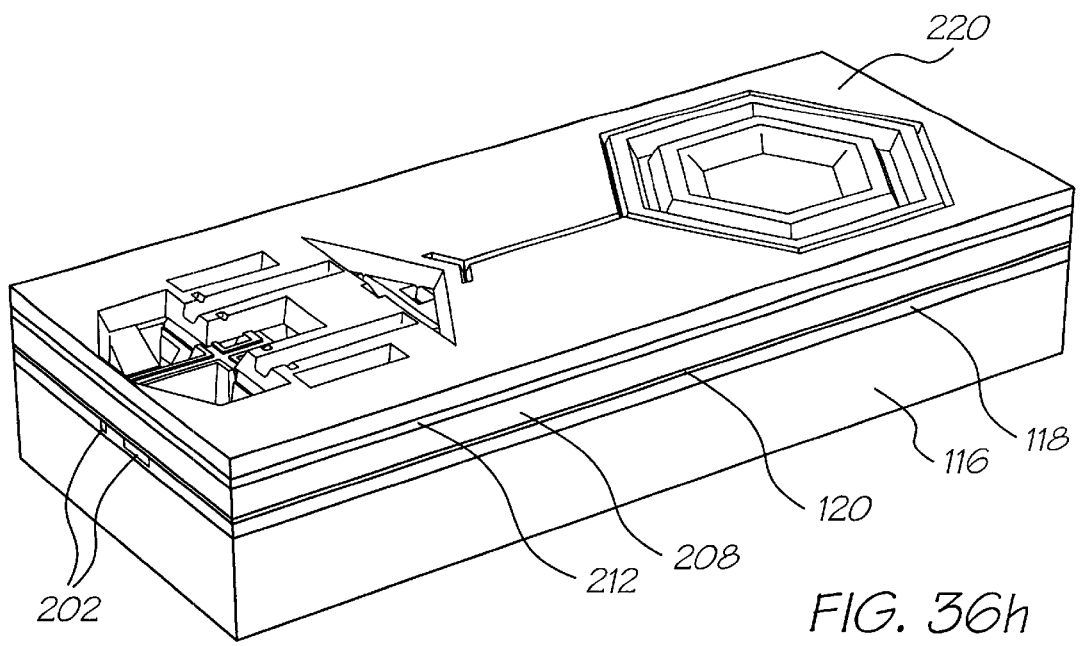
Figure 37H:
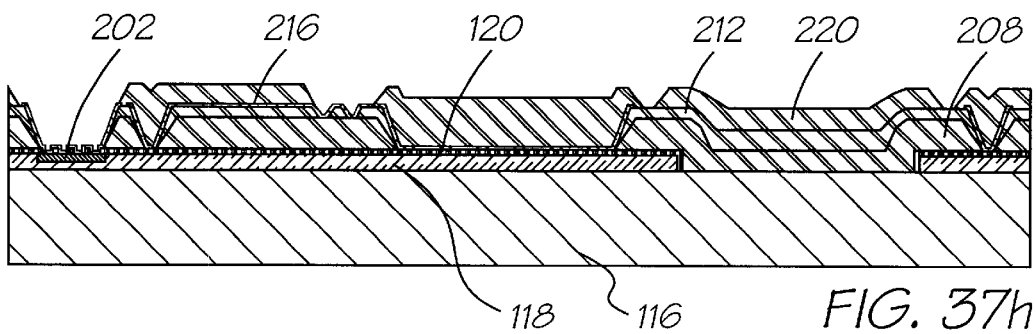
Figure 38G:
Figure 36I:
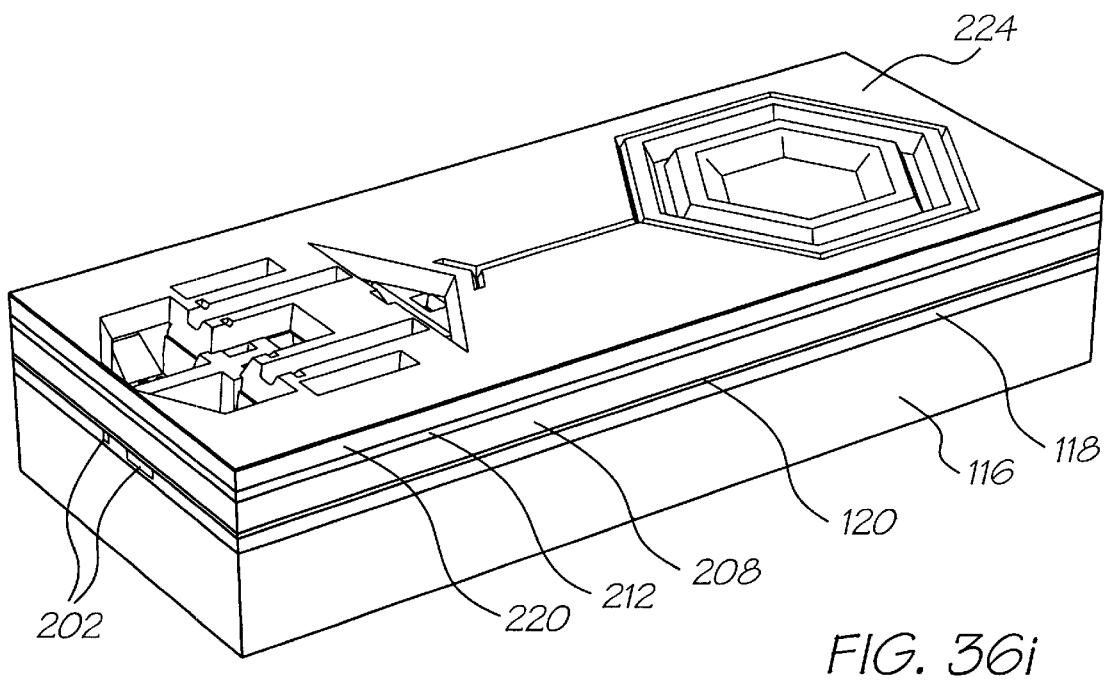
Figure 37I:
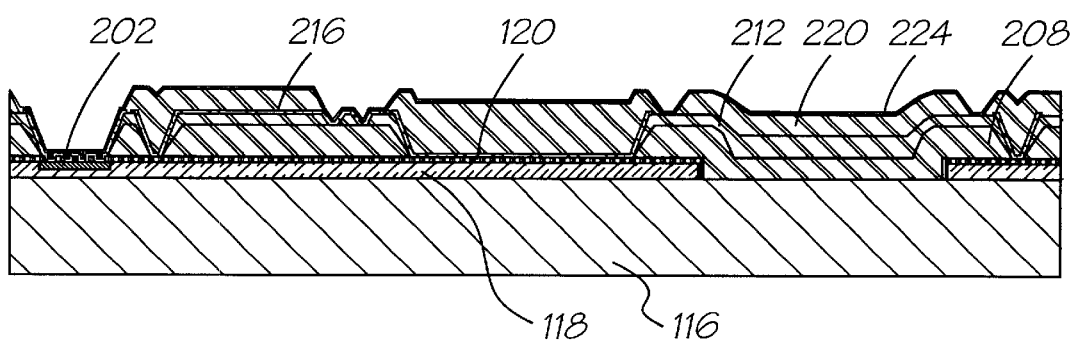
Figure 36J:
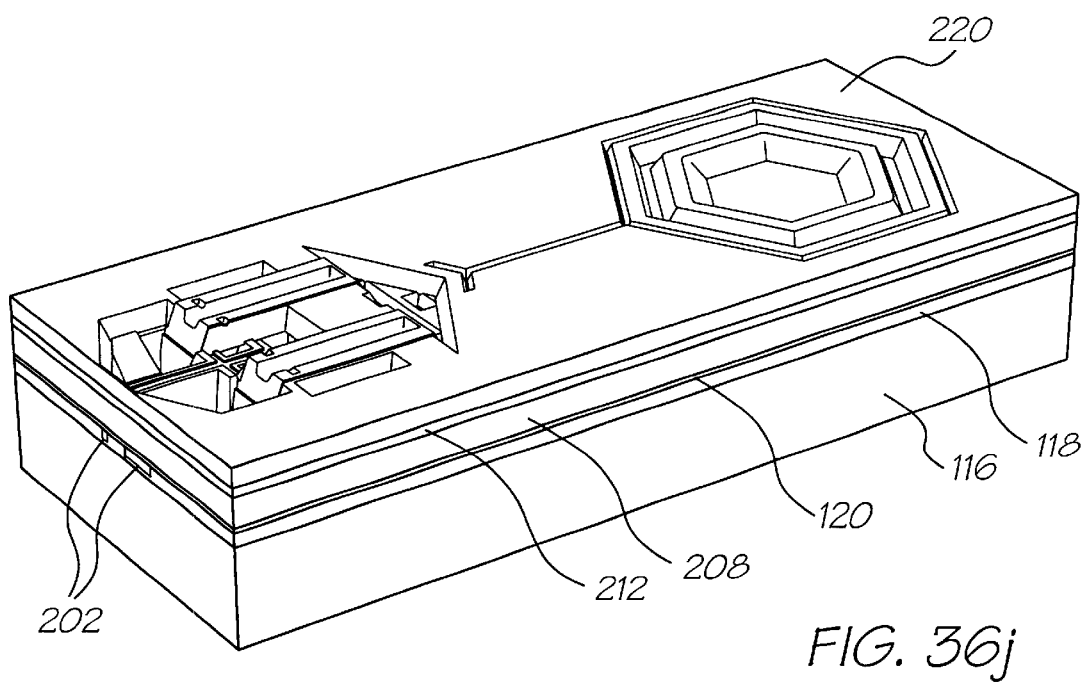
Figure 37J:
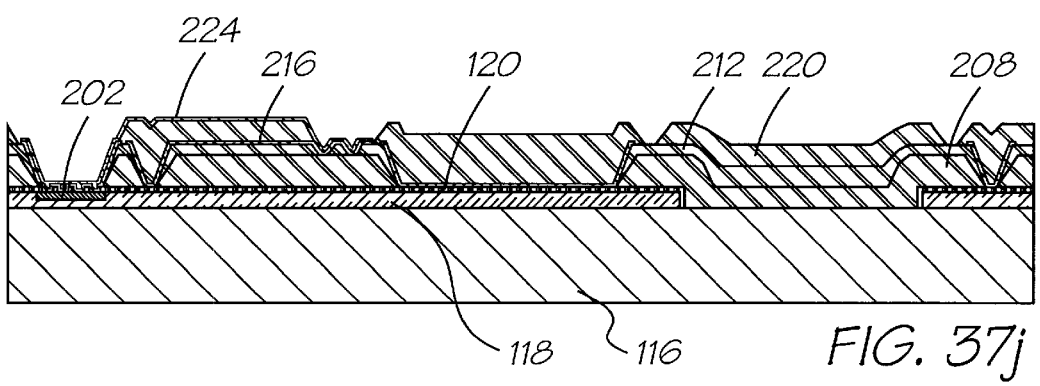
Figure 38H:
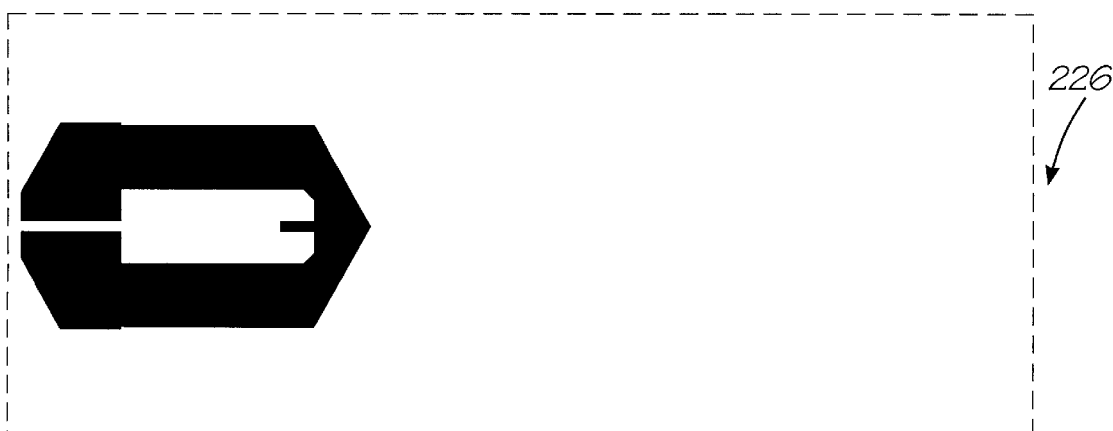
Figure 36K:
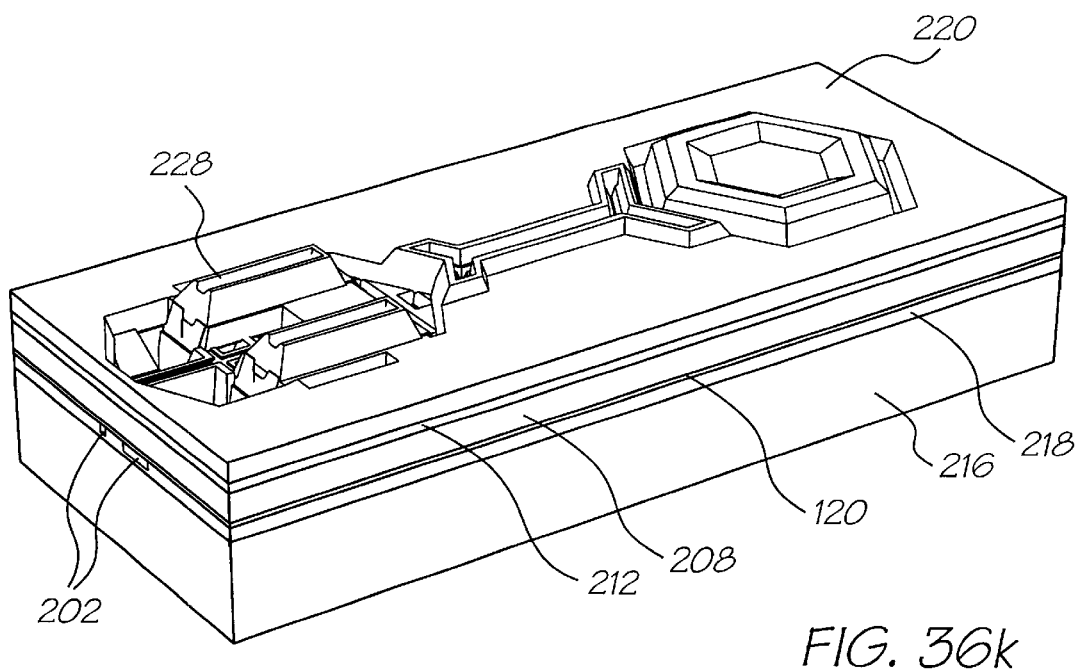
Figure 37K:
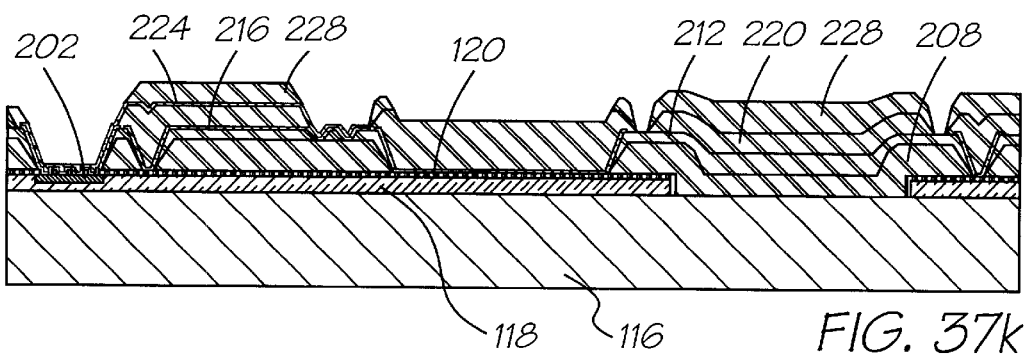
Figure 38I:
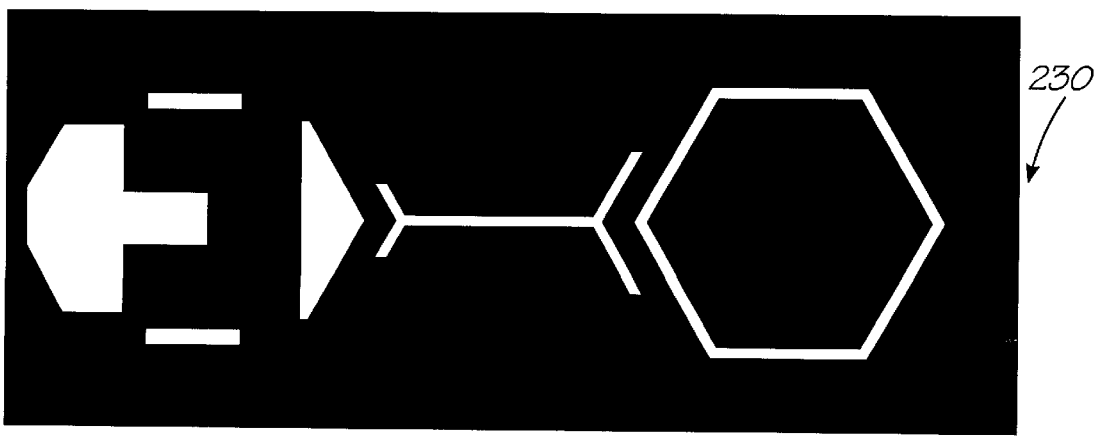
Figure 36I:
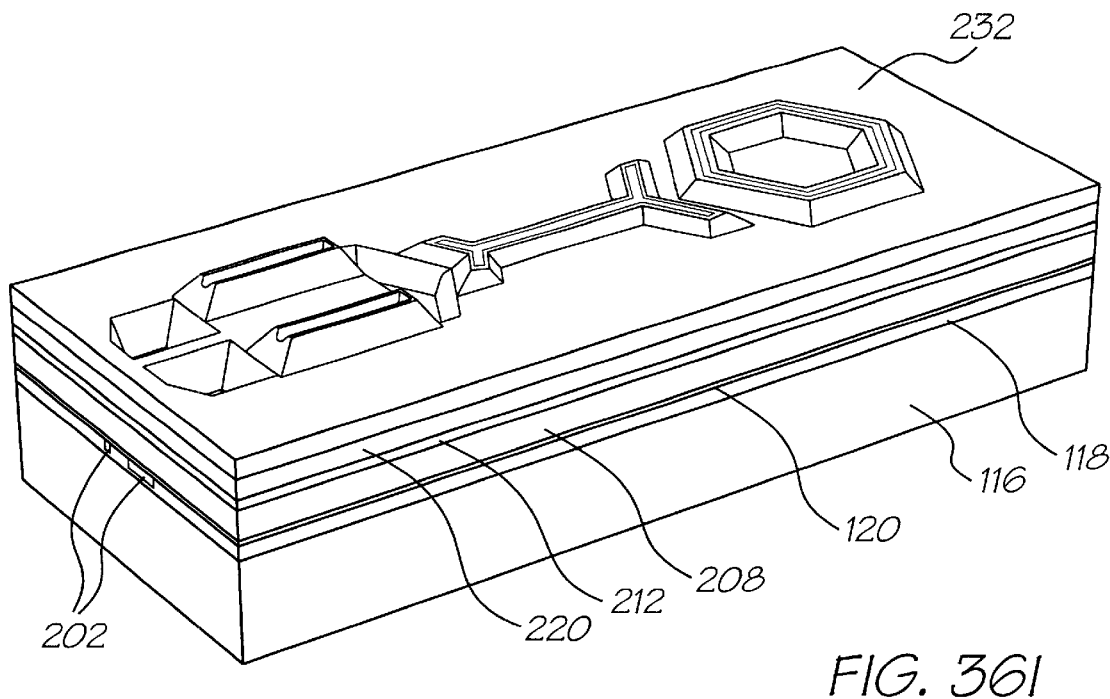
Figure 37I:
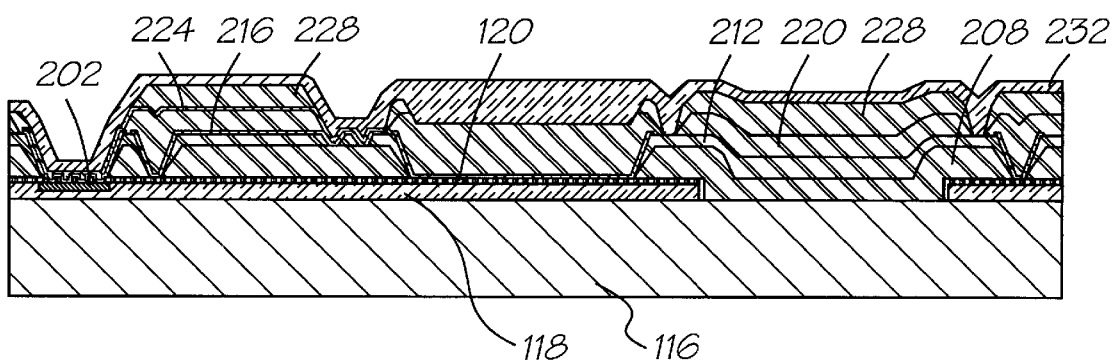
Figure 36M:
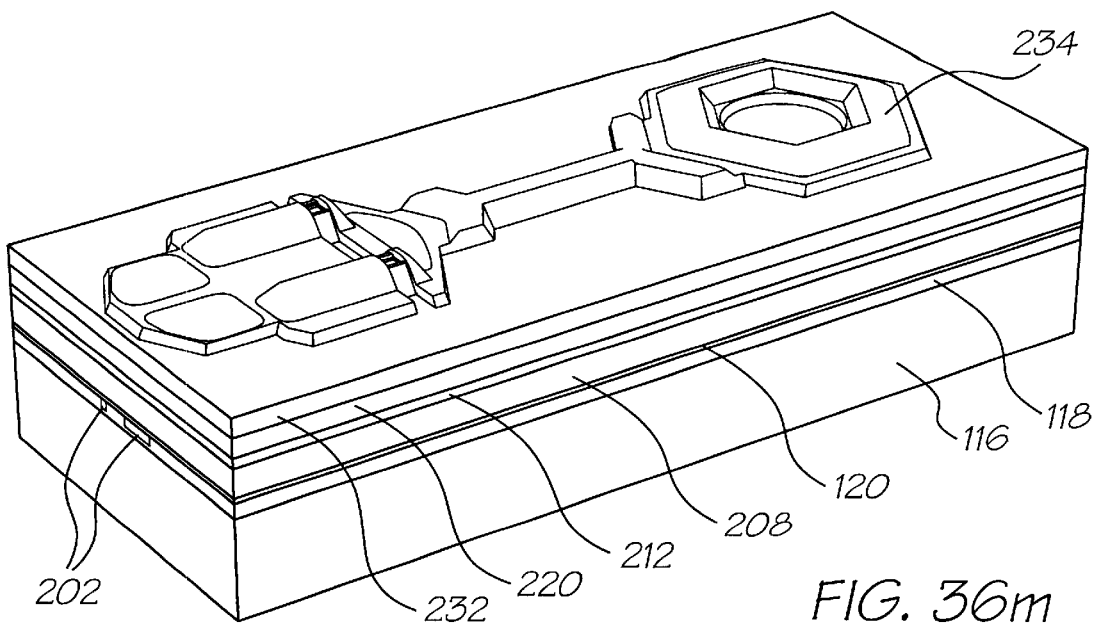
Figure 37M:
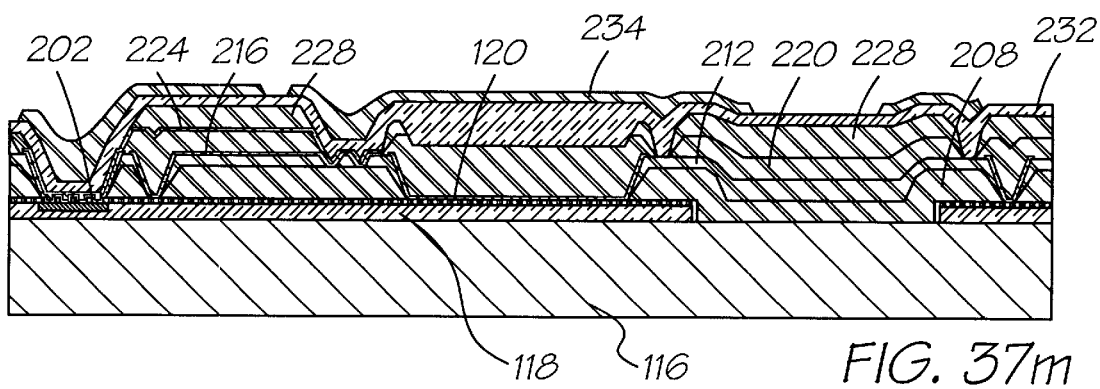
Figure 38J:
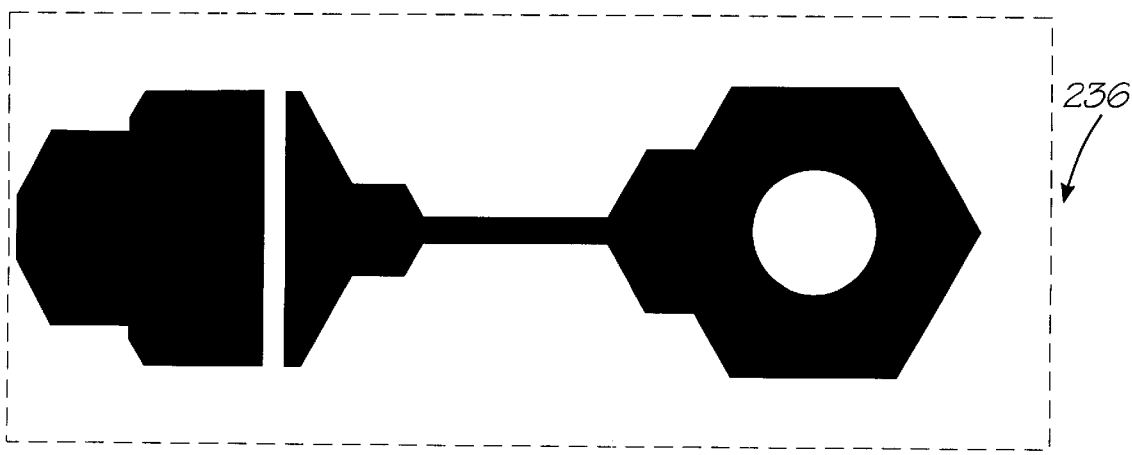
Figure 36N:
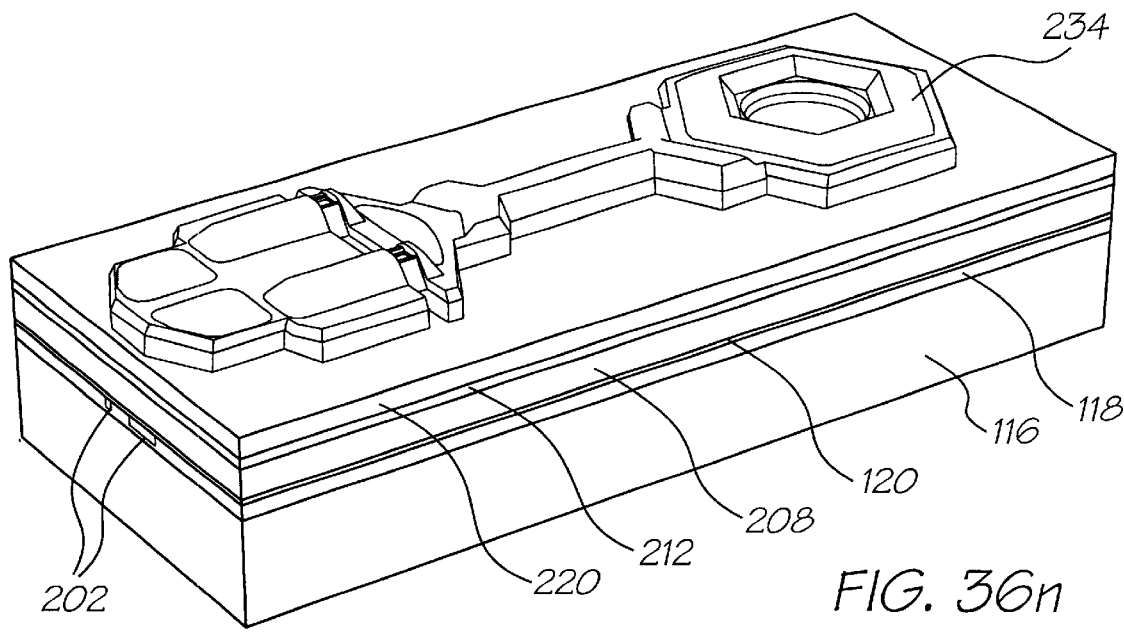
Figure 37N:
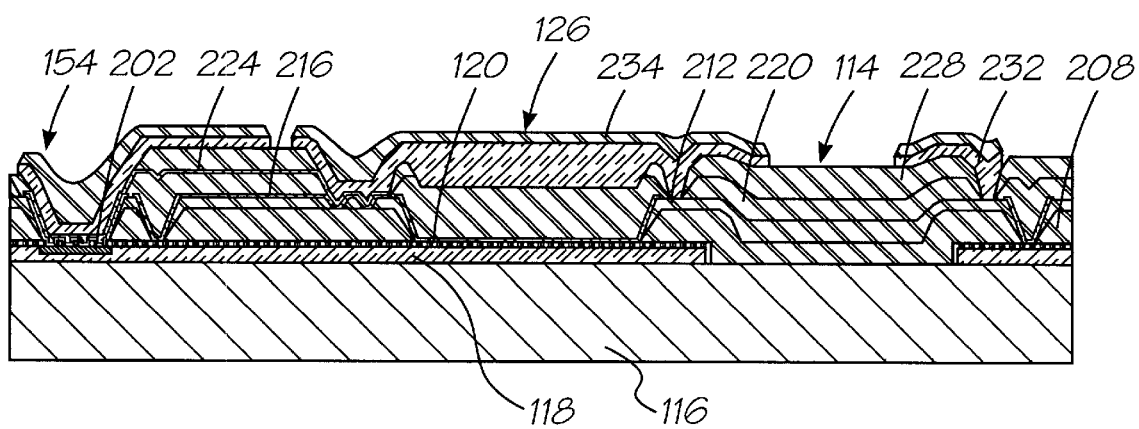
Figure 36O:
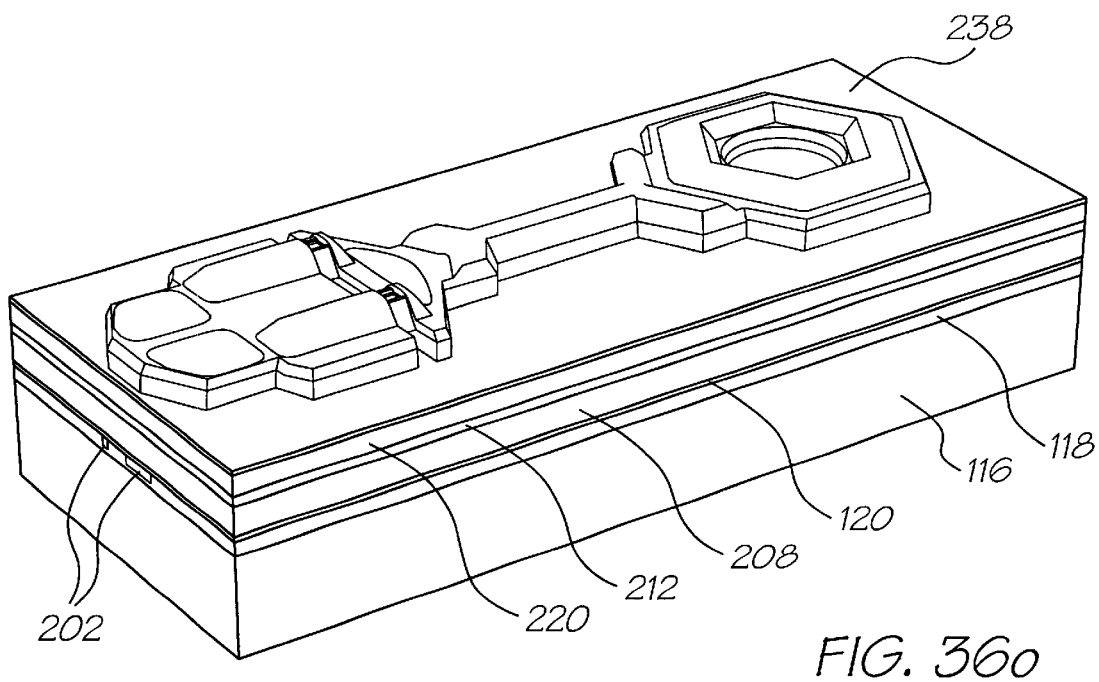
Figure 37O:
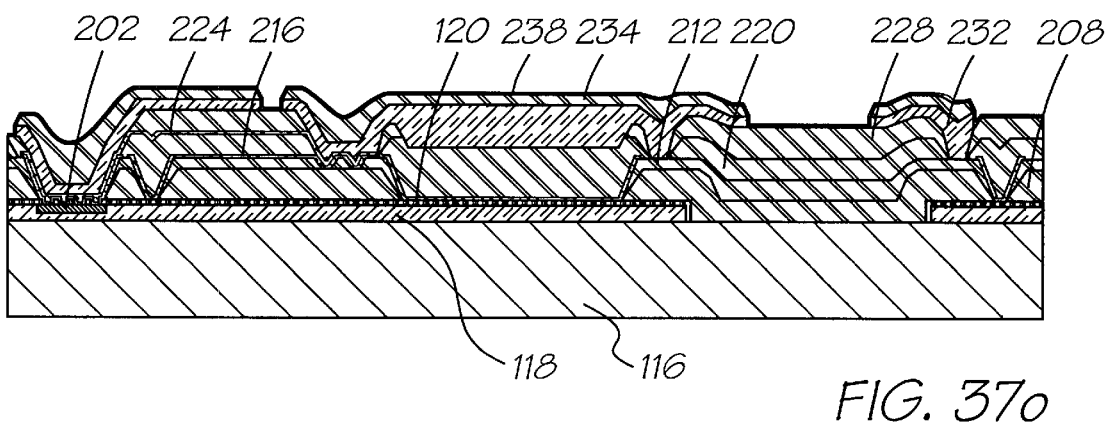

In the next step, shown in FIG. 36e of the drawings, a second sacrificial layer 212 is applied. The layer 212 is either 2 $\mu$m of photo-sensitive polyimide which is spun on or approximately 1.3 $\mu$m of high temperature resist. The layer 212 is softbaked and exposed to mask 214. After exposure to the mask 214, the layer 212 is developed. In the case of the layer 212 being polyimide, the layer 212 is hardbaked at 400° C. for approximately one hour. Where the layer 212 is resist, it is hardbaked at greater than 300° C. for approximately one hour.

A 0.2 micron multi-layer metal layer 216 is then deposited. Part of this layer 216 forms the passive beam 160 of the actuator 128.

The layer 216 is formed by sputtering 1,000 Å of titanium nitride (TiN) at around 300° C. followed by sputtering 50 Å of tantalum nitride. (TaN). A further 1,000 Å of TiN is sputtered on followed by 50 Å of TaN and a further 1,000 Å of TiN.

Other materials which can be used instead of TiN are $TiB_2$, $MoSi_2$ or (Ti, Al)N.

The layer 216 is then exposed to mask 218, developed and plasma etched down to the layer 212 whereafter resist, applied for the layer 216, is wet stripped taking care not to remove the cured layers 208 or 212.

A third sacrificial layer 220 is applied by spinning, on 4 $\mu$m of photo-sensitive polyimide or approximately 2.6 $\mu$m high temperature resist. The layer 220 is softbaked whereafter it is exposed to mask 222. The exposed layer is then developed followed by hardbaking. In the case of polyimide, the layer 220 is hardbaked at 400° C. for approximately one hour or at greater than 300° C. where the layer 220 comprises resist.

A second multi-layer metal layer 224 is applied to the layer 220. The constituents of the layer 224 are the same as the layer 216 and are applied in the same manner. It will be appreciated that both layers 216 and 224 are electrically conductive layers.

The layer 224 is exposed to mask 226 and is then developed. The layer 224 is plasma etched down to the polyimide or resist layer 220 whereafter resist applied for the layer 224 is wet stripped taking care not to remove the cured layers 208, 212 or 220. It will be noted that the remaining part of the layer 224 defines the active beam 158 of the actuator 128.

A fourth sacrificial layer 228 is applied by spinning on 4 $\mu$m of photo-sensitive polyimide or approximately 2.6 $\mu$m of high temperature resist. The layer 228 is softbaked, exposed to the mask 230 and is then developed to leave the island portions as shown in FIG. 9k of the drawings. The remaining portions of the layer 228 are hardbaked at 400° C. for approximately one hour in the case of polyimide or at greater than 300° C. for resist.

As shown in FIG. 36l of the drawing a high Young's modulus dielectric layer 232 is deposited. The layer 232 is constituted by approximately 1 $\mu$m of silicon nitride or aluminum oxide. The layer 232 is deposited at a temperature below the hardbaked temperature of the sacrificial layers 208, 212, 220, 228. The primary characteristics required for this dielectric layer 232 are a high elastic modulus, chemical inertness and good adhesion to TiN.

A fifth sacrificial layer 234 is applied by spinning on 2 $\mu$m of photo-sensitive polyimide or approximately 1.3 $\mu$m of high temperature resist. The layer 234 is softbaked, exposed to mask 236 and developed. The remaining portion of the layer 234 is then hardbaked at 400° C. for one hour in the case of the polyimide or at greater than 300° C. for the resist.

The dielectric layer 232 is plasma etched down to the sacrificial layer 228 taking care not to remove any of the sacrificial layer 234.

This step defines the nozzle opening 124, the lever arm 126 and the anchor 154 of the nozzle assembly 110.

A high Young's modulus dielectric layer 238 is deposited. This layer 238 is formed by depositing 0.2 $\mu$m of silicon nitride or aluminum nitride at a temperature below the hardbaked temperature of the sacrificial layers 208, 212, 220 and 228.

Figure 36P:
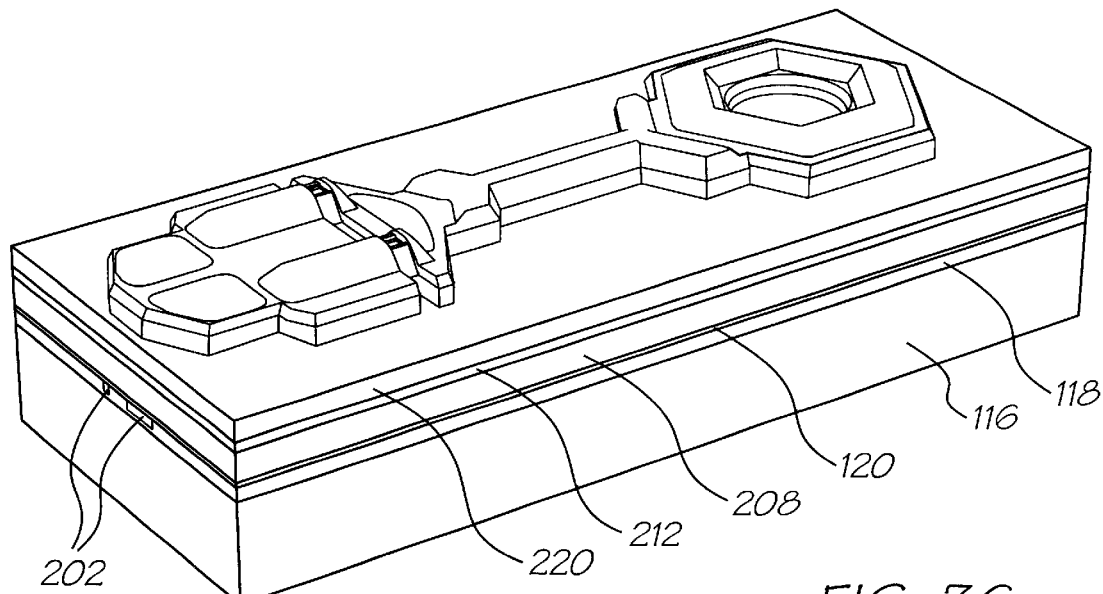
Figure 37P:
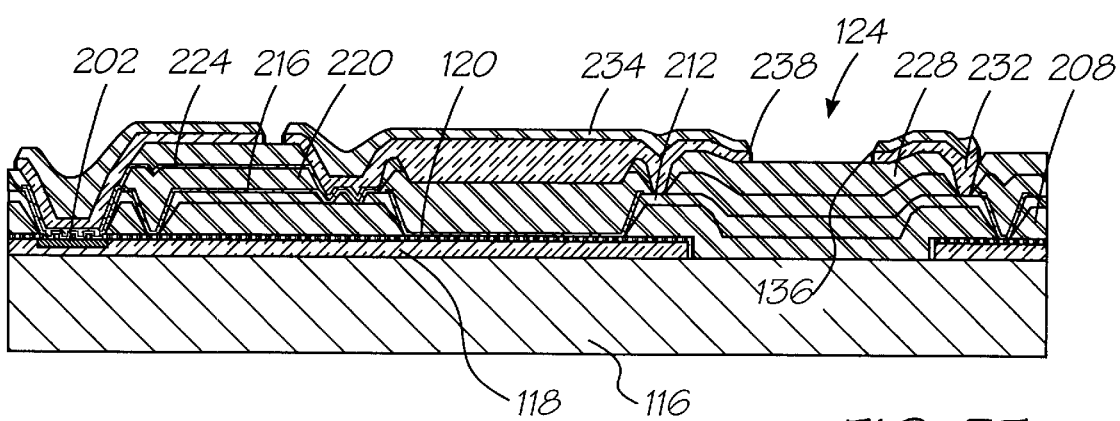
Figure 36Q:
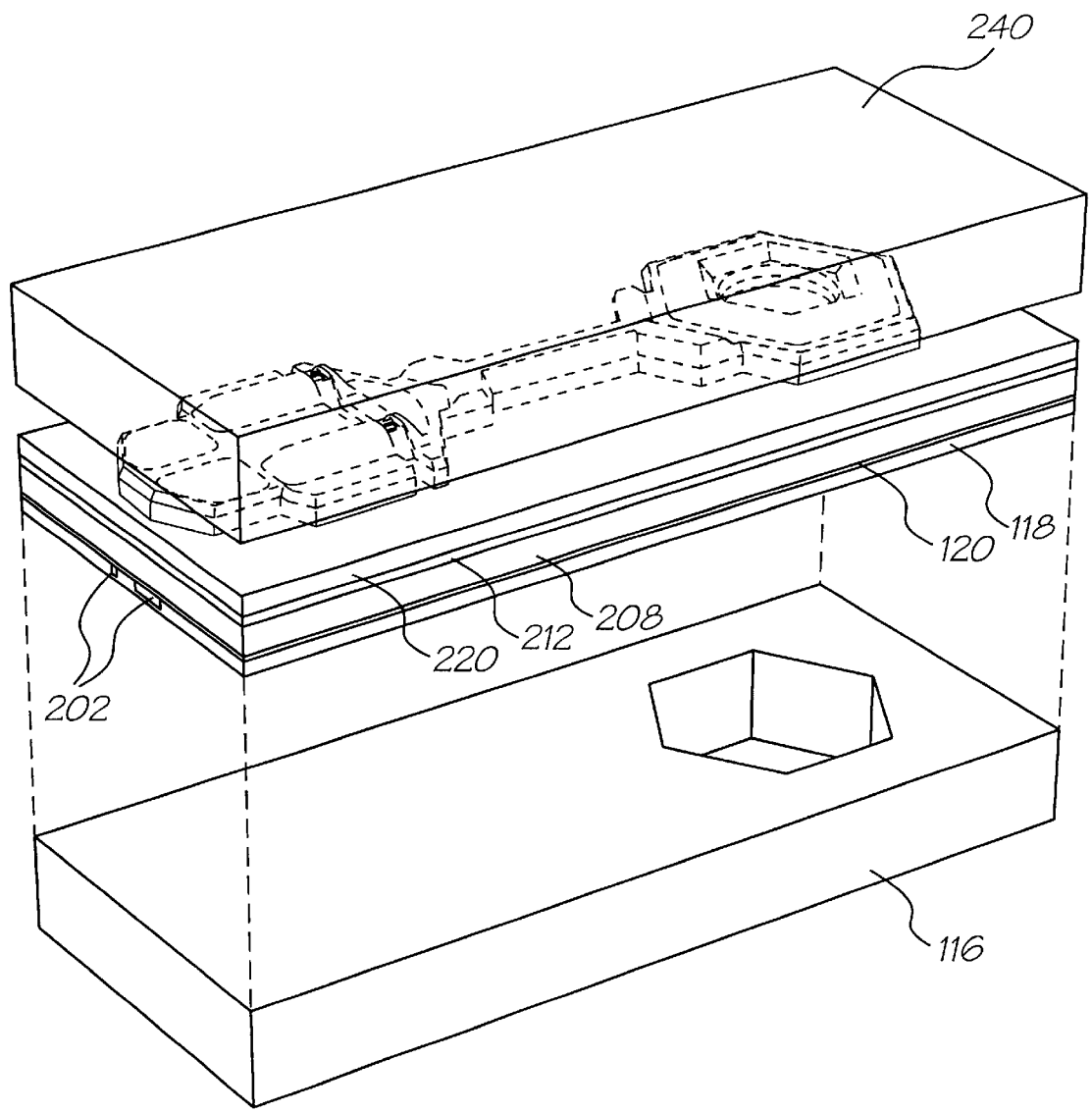
Figure 37Q:
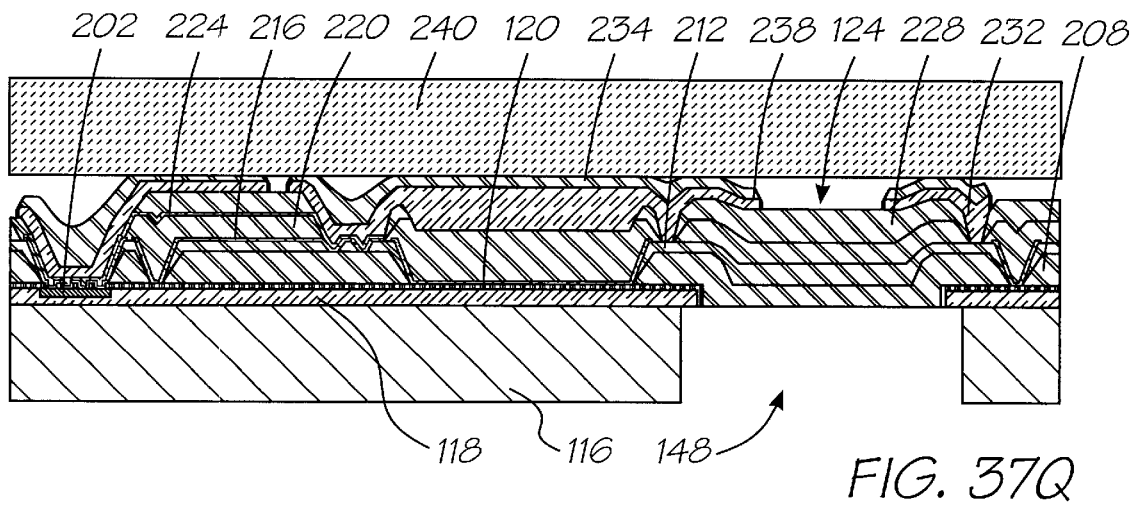
Figure 38K:
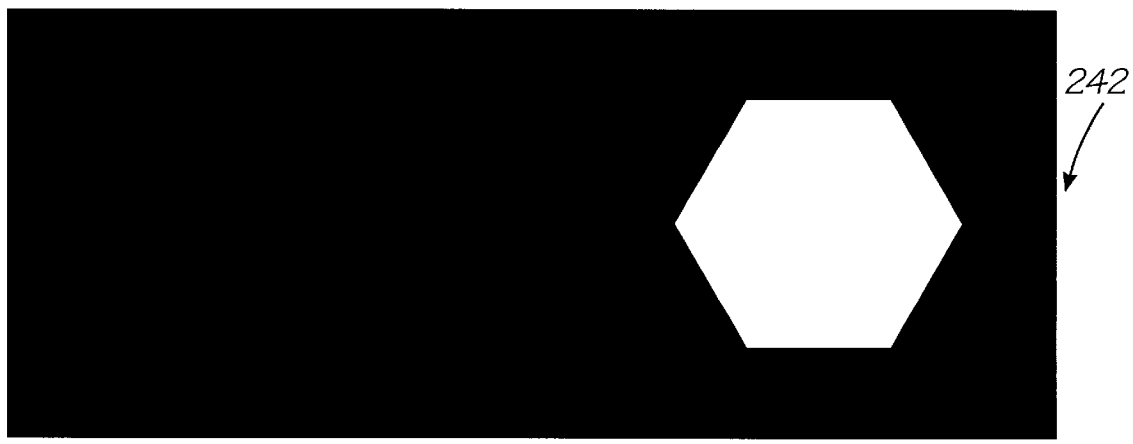

Then, as shown in FIG. 36p of the drawings, the layer 238 is anisotropically plasma etched to a depth of 0.35 microns. This etch is intended to clear the dielectric from all of the surface except the side walls of the dielectric layer 232 and the sacrificial layer 234. This step creates the nozzle rim 136 around the nozzle opening 124 which "pins" the meniscus of ink, as described above.

An ultraviolet (UV) release tape 240 is applied. 4 $\mu$m of resist is spun on to a rear of the silicon wafer 116. The wafer 116 is exposed to mask 242 to back etch the wafer 116 to define the ink inlet channel 148. The resist is then stripped from the wafer 116.

Figure 36R:
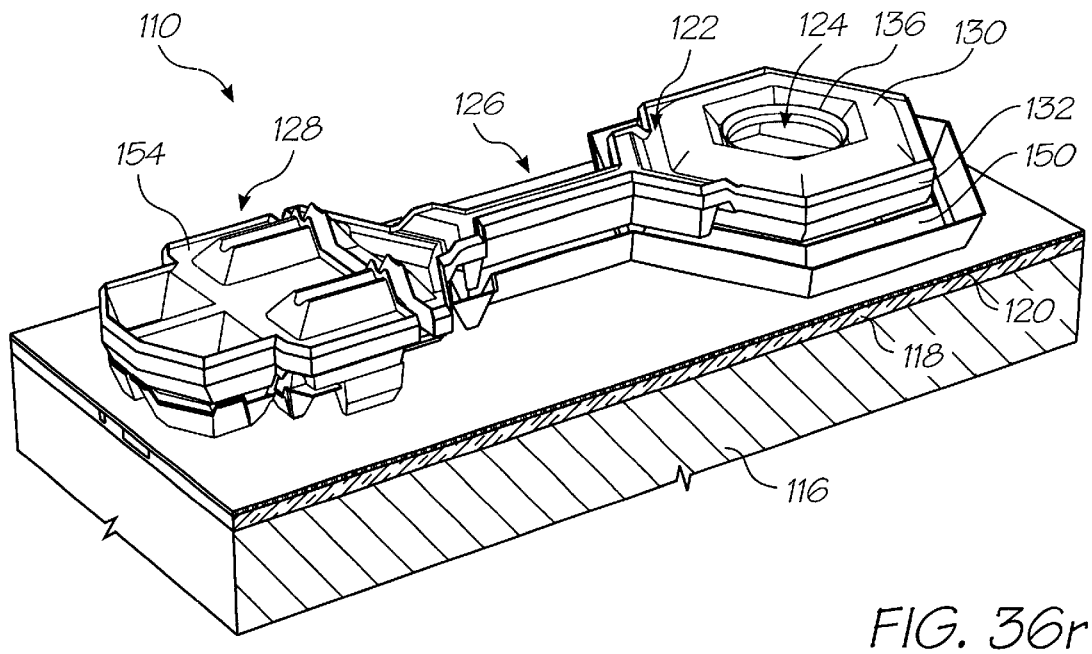
Figure 37R:
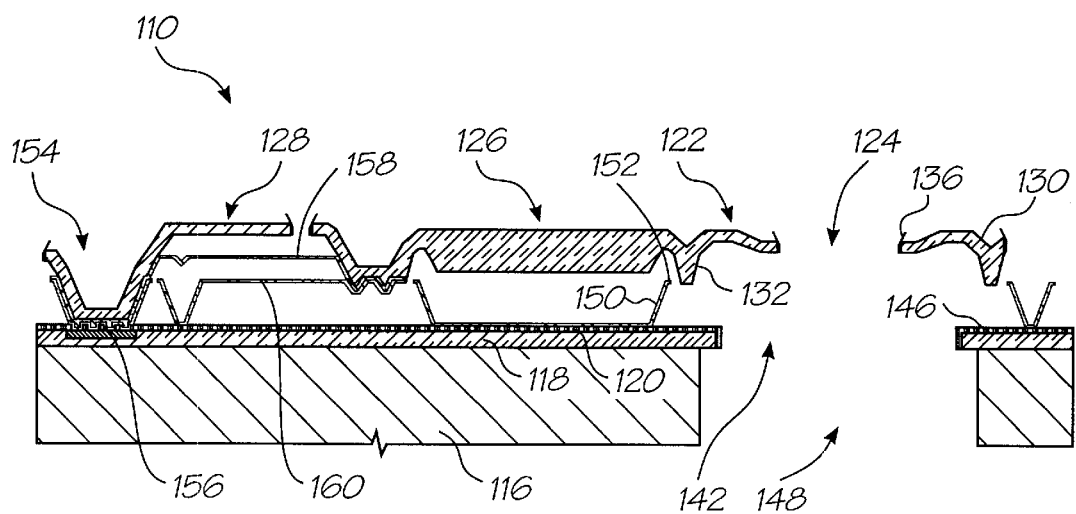
Figure 39A:
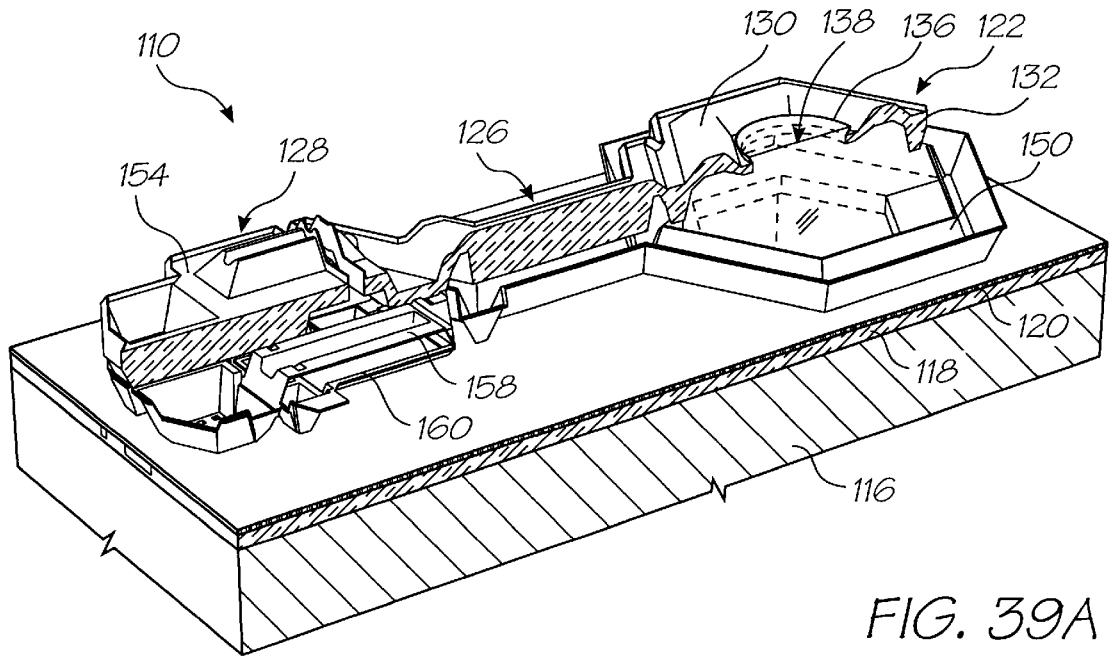
FIGS. 39a to 39c show three dimensional views of an operation of the nozzle assembly manufactured according to the method of FIGS. 36 and 37.
Figure 40A:
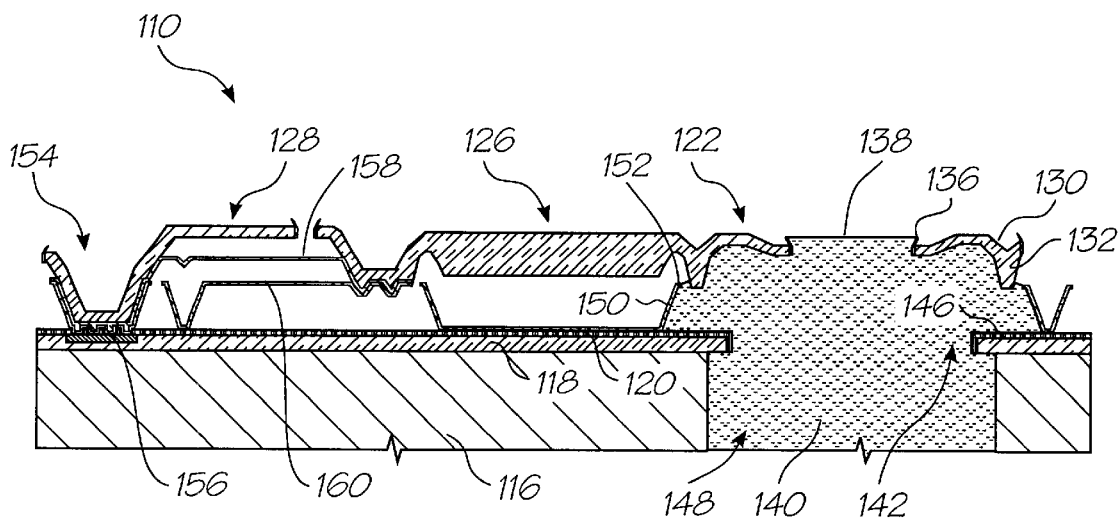
FIGS. 40a to 40c show sectional side views of an operation of the nozzle assembly manufactured according to the method of FIGS. 36 and 37.
Figure 39B:
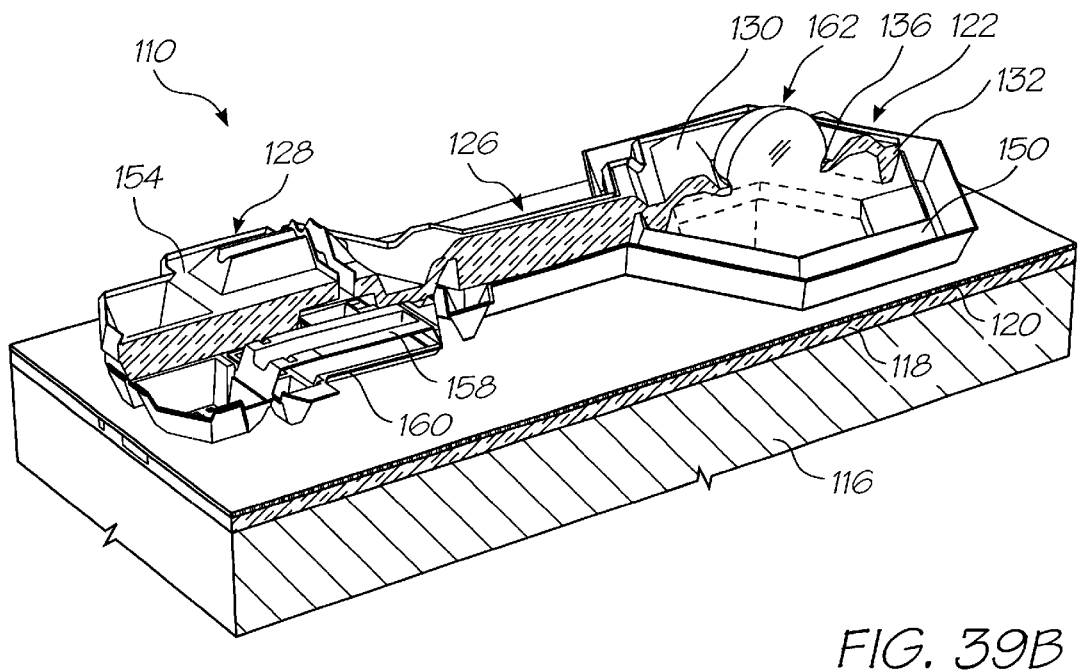
Figure 40B:
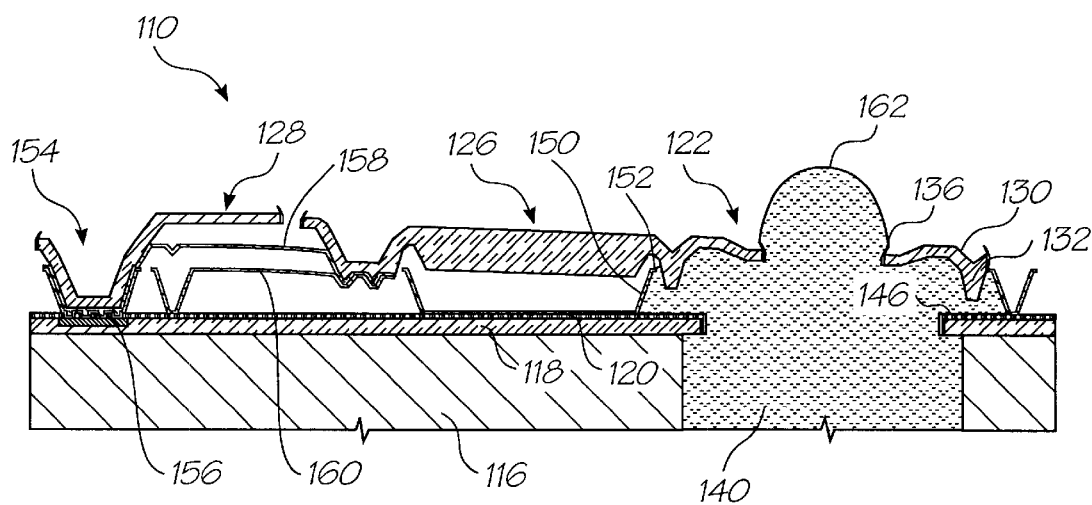
Figure 39C:
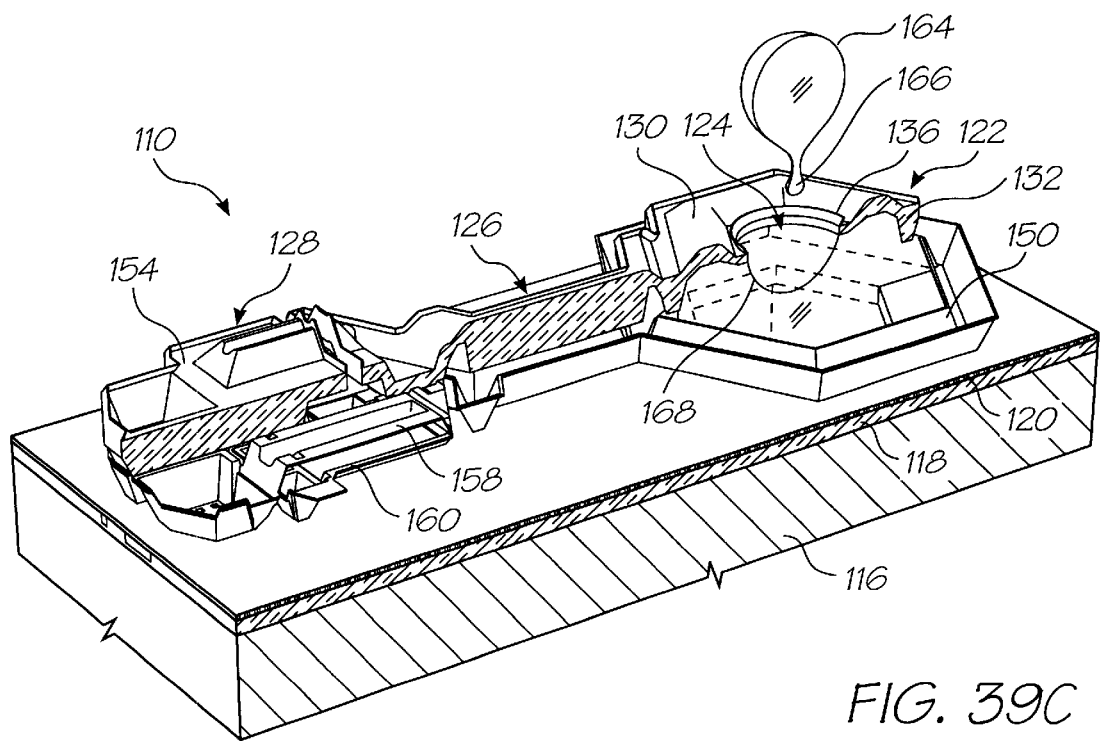
Figure 40C:
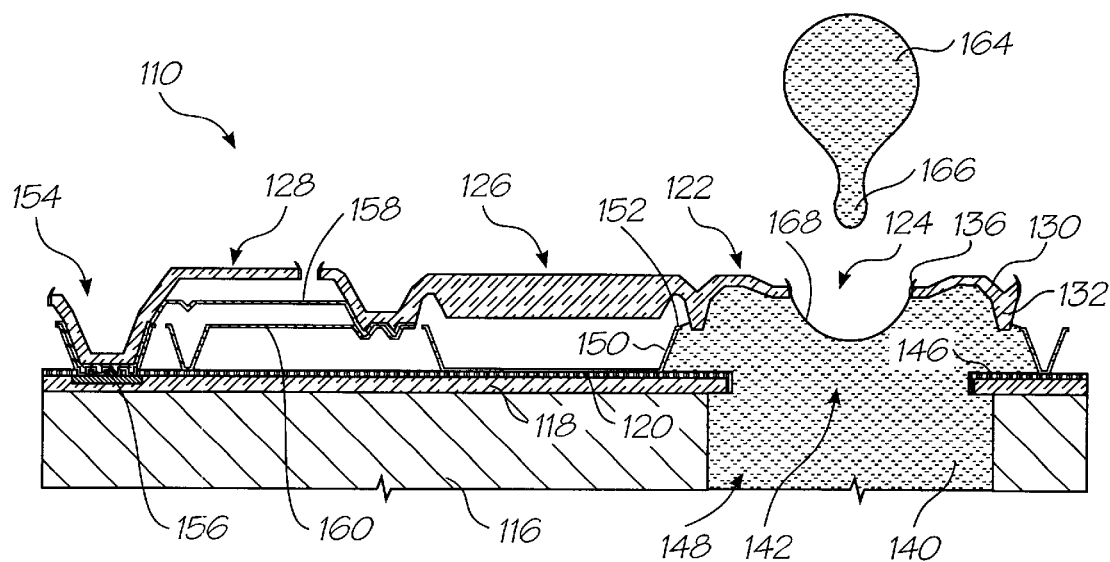

A further UV release tape (not shown) is applied to a rear of the wafer 16 and the tape 240 is removed. The sacrificial layers 208, 212, 220, 228 and 234 are stripped in oxygen plasma to provide the final nozzle assembly 110 as shown in FIGS. 36r and 37r of the drawings. For ease of reference, the reference numerals illustrated in these two drawings are the same as those in FIG. 29 of the drawings to indicate the relevant parts of the nozzle assembly 110. FIGS. 39 and 40 show the operation of the nozzle assembly 110, manufactured in accordance with the process described above with reference to FIGS. 36 and 37, and these figures correspond to FIGS. 29 to 32 of the drawings.

The presently disclosed ink jet printing technology is potentially suited to a wide range of printing system including: color and monochrome office printers, short run digital printers, high speed digital printers, offset press supplemental printers, low cost scanning printers high speed page width printers, notebook computers with in built page width printers, portable color and monochrome printers, color and monochrome copiers, color and monochrome facsimile machines, combined printer, facsimile and copying machines, label printers, large format plotters, photograph copiers, printers for digital photographic "minilabs", video printers, portable printers for PDAs, wallpaper printers, indoor sign printers, billboard printers, fabric printers, camera printers and fault tolerant commercial printer arrays.

The fully formed printhead being able to be utilized in a wide range of printing systems.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

I claim:

1. An ink jet nozzle assembly including a nozzle chamber containing ink to be ejected and a fluidic seal comprising a meniscus formed by said ink between two solid surfaces of said assembly that move relative to one another when the assembly is activated in use, and wherein at least one of said surfaces has a thin lip adjacent said fluidic seal to hinder wicking of said ink along said at least one surface.

2. An assembly according to claim 1 wherein said lip is less than or equal to about 1 μm thick.

3. An ink jet nozzle assembly including:

a nozzle chamber having an inlet in fluid communication with an ink reservoir and a nozzle in fluid communication with a surrounding atmosphere;

the chamber including a fixed portion, a movable portion and a clearance space therebetween, relative movement between the fixed portion and the movable portion in an ejection phase reducing an effective volume of the chamber, and alternate relative movement in a refill phase enlarging the effective volume of the chamber;

the clearance space containing an ink/air interface, surface tension in ink across a meniscus at the interface forming a fluidic seal between the chamber and the atmosphere; wherein:

the clearance space, the nozzle and the inlet are dimensioned relative to one another such that ink is ejected preferentially form the chamber through the nozzle in droplet form in the ejection phase, and ink is alternately drawn preferentially into the chamber from the reservoir through the inlet in the refill phase without said fluidic seal breaking.

4. An assembly according to claim 3 wherein the chamber incorporates a rim extending outwardly adjacent at least a portion of the fluidic seal and is disposed to minimise wicking of ink from the chamber across the seal.

5. An assembly according to claim 4 wherein a lower section of the rim includes a ledge portion overhanging a recess adapted to collect any residual ink wicking across the seal.

6. An assembly according to claim 3 wherein the movable portion includes the nozzle and the fixed portion is mounted on a substrate.

7. An assembly according to claim 6 wherein said rim extends substantially around a periphery of the fluidic seal, immediately adjacent the clearance space.

8. An assembly according to claim 3 wherein the fixed portion includes the nozzle mounted on a substrate and the movable portion includes an actuator.

9. An assembly according to claim 3 wherein a largest distance between the fixed portion and the movable portion across the clearance space is less than approximately 5 μm.

10. An assembly according to claim 9 wherein said distance is less than approximately 3 μm.

11. An assembly according to claim 10 wherein said distance is less than approximately 1 μm.

12. An assembly according to claim 3 including an outwardly protruding lip extending around the nozzle to minimise wicking of ink across an outer surface of the nozzle chamber.

13. An assembly according to claim 3 wherein at least one surface adjacent the clearance space includes an hydrophobic coating to enhance performance of the fluidic seal.

14. An assembly according to claim 13 wherein the hydrophobic coating is formed substantially from polytetrafluoroethylene (PTFE).

15. An assembly according to claim 3 wherein the ink jet nozzle assembly is manufactured using micro-electromechanical-systems (MEMS) techniques.

* * * * *